(12) United States Patent
Mora et al.

(10) Patent No.: US 11,058,194 B2
(45) Date of Patent: Jul. 13, 2021

(54) INTERPOSABLE MAGNETICALLY COUPLED DEVICES

(71) Applicant: 1LSS Inc., Canyon County, CA (US)

(72) Inventors: Fernando Mora, Reseda, CA (US); Alejandro Baca, North Hollywood, CA (US); Mydul Ronny Islam, Van Nuys, CA (US)

(73) Assignee: 1Lss, Inc, Los Angeles, CA (US)

( * ) Notice: Subject to any disclaimer, the term of this patent is extended or adjusted under 35 U.S.C. 154(b) by 0 days.

(21) Appl. No.: 16/583,168

(22) Filed: Sep. 25, 2019

(65) Prior Publication Data

US 2020/0098498 A1    Mar. 26, 2020

Related U.S. Application Data

(60) Provisional application No. 62/736,379, filed on Sep. 25, 2018.

(51) Int. Cl.
| | |
|---|---|
| *A45C 1/06* | (2006.01) |
| *A45F 5/00* | (2006.01) |
| *F16M 13/00* | (2006.01) |
| *H04M 1/04* | (2006.01) |
| *B60R 11/02* | (2006.01) |
| *H01F 7/02* | (2006.01) |
| *B60R 11/00* | (2006.01) |

(52) U.S. Cl.
CPC ............... *A45C 1/06* (2013.01); *A45F 5/00* (2013.01); *B60R 11/0241* (2013.01); *F16M 13/005* (2013.01); *H01F 7/0252* (2013.01); *H04M 1/04* (2013.01); *A45C 2001/067* (2013.01); *A45F 2200/0516* (2013.01); *B60R 2011/007* (2013.01)

(58) Field of Classification Search
USPC ........................................ 455/575.8
See application file for complete search history.

(56) References Cited

U.S. PATENT DOCUMENTS

| | | | |
|---|---|---|---|
| 525,097 A | 8/1894 | Flint | |
| 9,033,384 B2 | 5/2015 | Potter et al. | |
| 9,300,346 B2 | 3/2016 | Hirsch | |
| 9,397,719 B1 | 7/2016 | Schmidt | |
| 9,531,424 B1 | 12/2016 | Tucker | |
| 9,568,950 B2 * | 2/2017 | Christie, II | F16M 13/02 |
| 9,692,863 B2 * | 6/2017 | Xie | H04M 1/11 |

(Continued)

FOREIGN PATENT DOCUMENTS

AU    2019100586 A4    7/2019

*Primary Examiner* — Maria El-Zoobi
(74) *Attorney, Agent, or Firm* — Thomas Coester Intellectual Property

(57) ABSTRACT

A mobile device accessory system including a first accessory device having a first front side and a first back side. The first accessory device has a first plurality of alternating polarity magnets on the first front side and a second plurality of alternating polarity magnets on the first back side. A second accessory device having a second front side and a second back side, the second accessory device having a third plurality of alternating polarity magnets on the second front side and a fourth plurality of alternating polarity magnets on the second back side. The first accessory device is arranged to magnetically couple to a device-side attachment associated with a mobile device and is interposed between the device-side attachment and the second accessory device.

21 Claims, 61 Drawing Sheets

(56) References Cited

U.S. PATENT DOCUMENTS

| | | | |
|---|---|---|---|
| 9,706,829 B2 | 7/2017 | Tilney | |
| 9,800,283 B2* | 10/2017 | Schmidt | F16M 13/00 |
| 10,117,505 B1* | 11/2018 | Alvarez | A45F 5/10 |
| 2014/0128132 A1 | 5/2014 | Cox, III | |
| 2015/0122852 A1 | 5/2015 | Feng | |
| 2016/0045019 A1 | 2/2016 | Srey | |
| 2016/0072933 A1* | 3/2016 | Cox, III | G06F 1/1656 |
| | | | 455/575.8 |
| 2016/0286944 A1 | 10/2016 | Snyder | |
| 2016/0352380 A1* | 12/2016 | Kovacs | H04M 1/04 |
| 2017/0019513 A1* | 1/2017 | Slaby | H04M 1/0283 |
| 2017/0354229 A1* | 12/2017 | Berkley | A45C 13/005 |
| 2018/0116383 A1 | 5/2018 | McGahey | |
| 2018/0153287 A1 | 6/2018 | William | |
| 2018/0168303 A1* | 6/2018 | Marks | G06F 1/1628 |
| 2019/0111855 A1 | 4/2019 | Aloe et al. | |
| 2020/0127694 A1 | 4/2020 | Lim | |
| 2020/0329133 A1* | 10/2020 | Surani | A45C 11/00 |

* cited by examiner

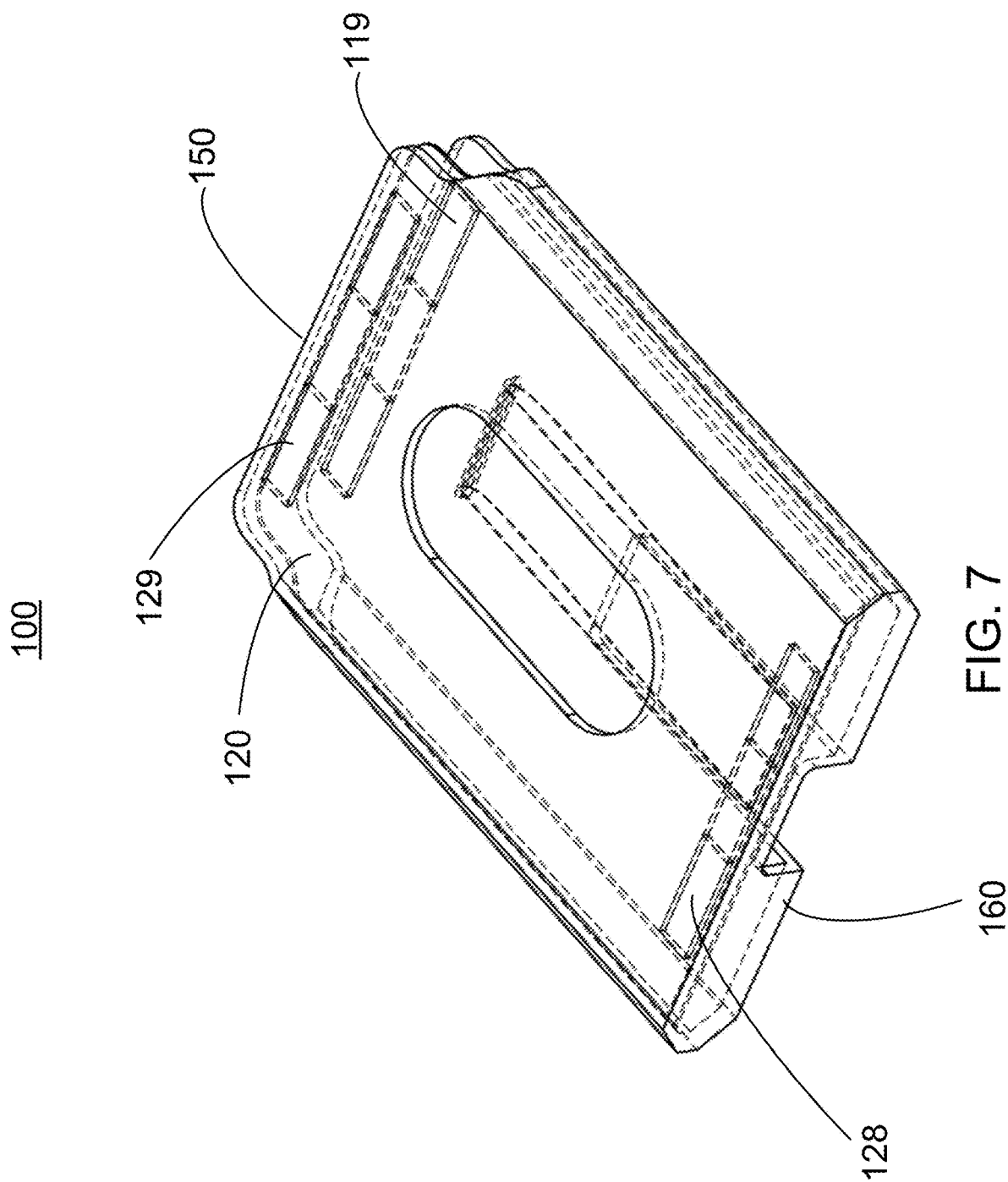

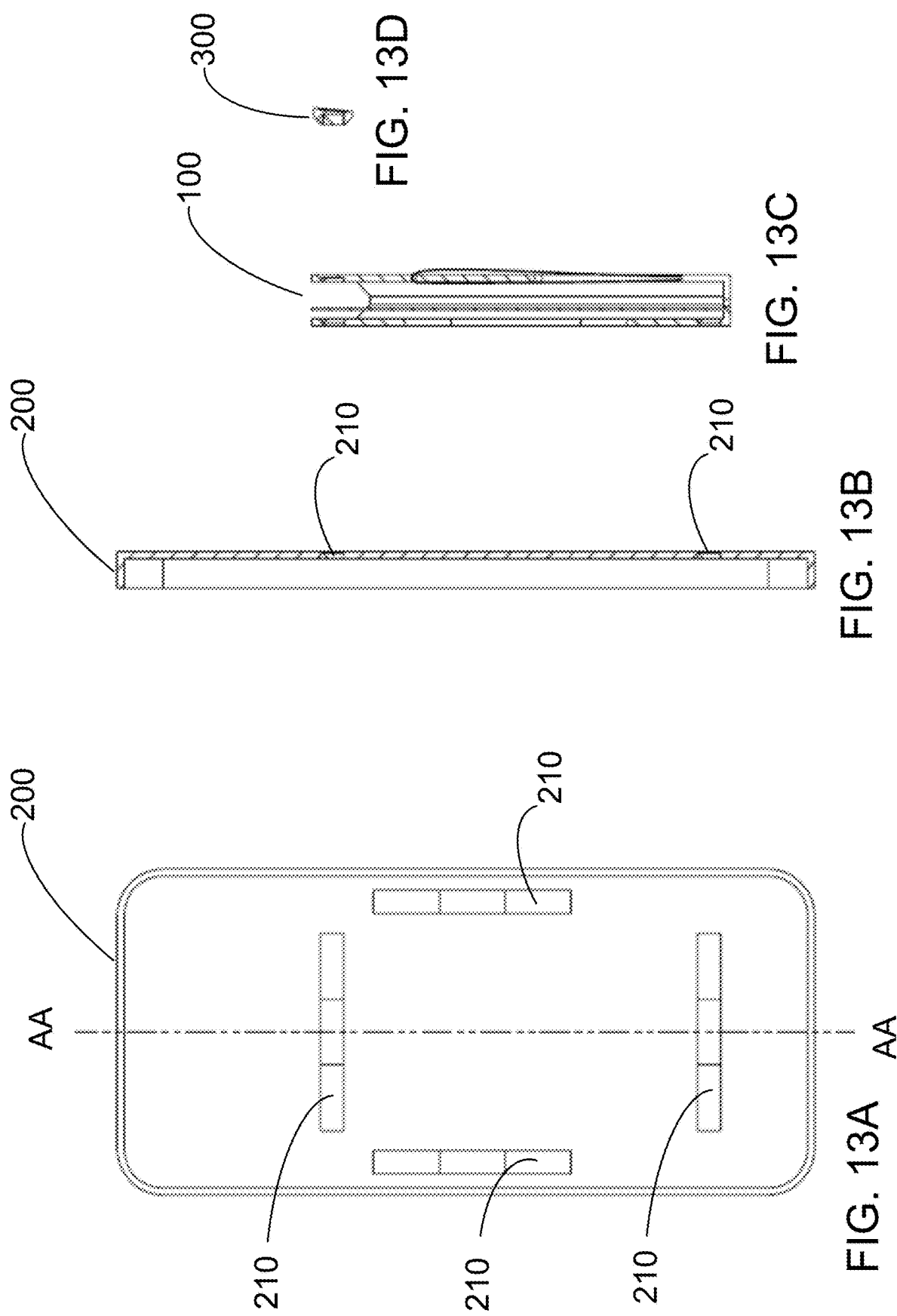

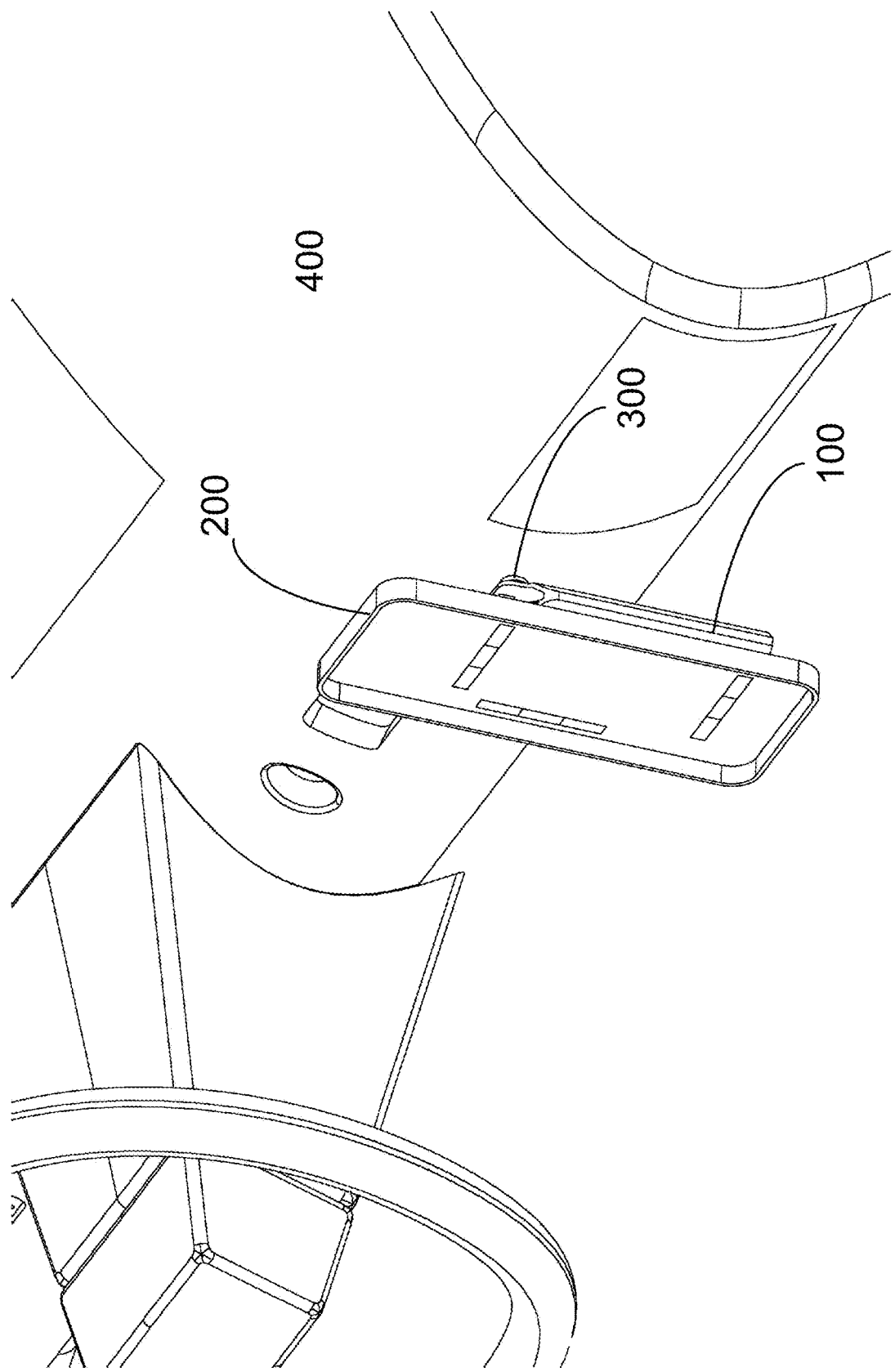

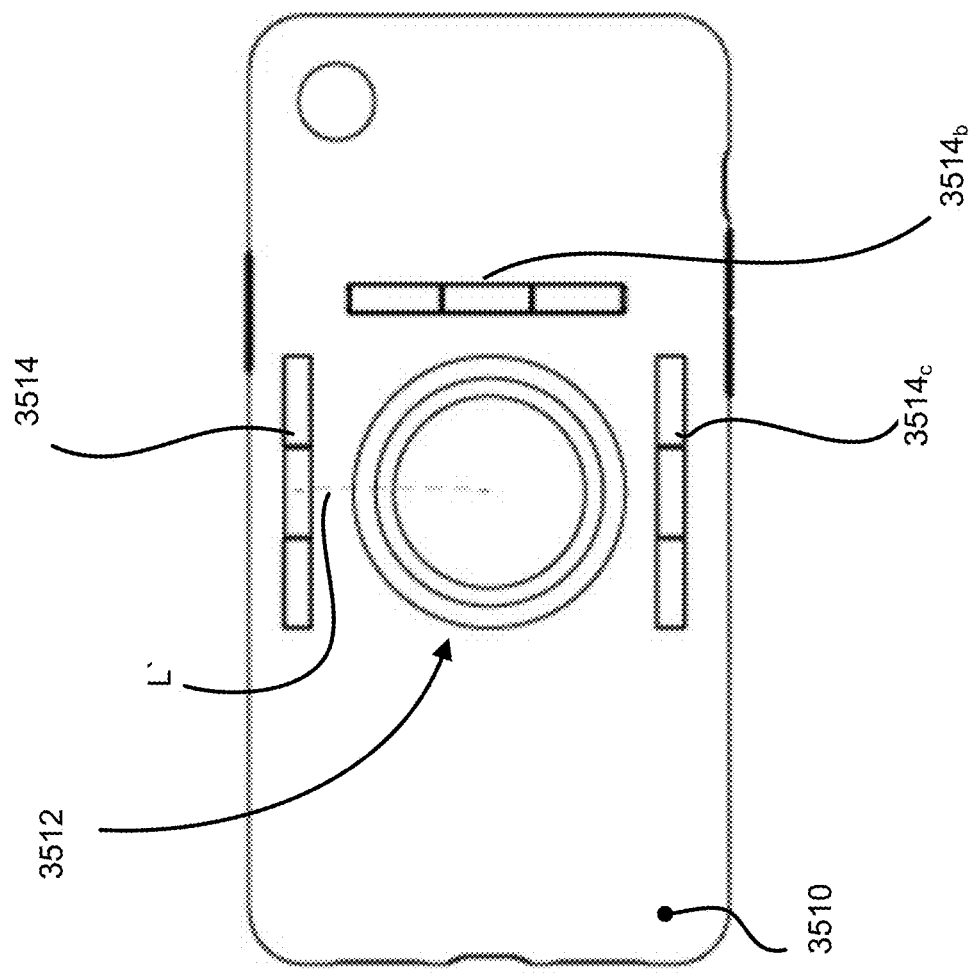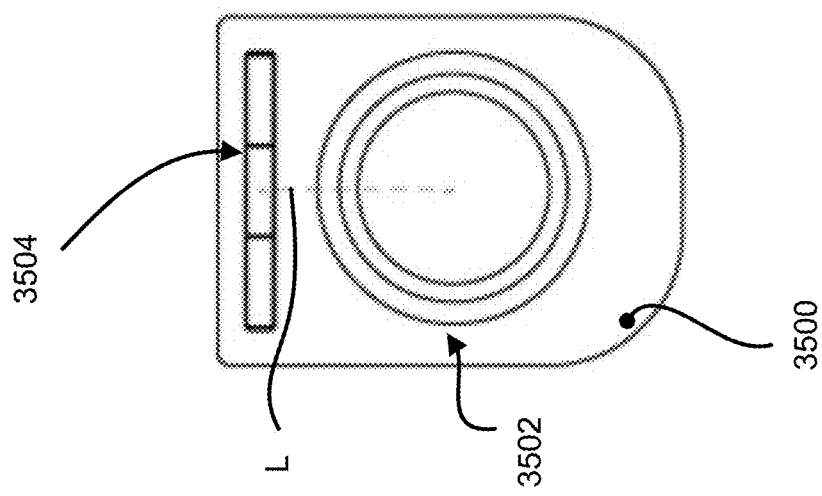
FIG. 35

FIG 43A

| N | S | N | S | N |
|---|---|---|---|---|
| N | S | N | S | N |

FIG 43B

| N | S | N | S | N |
|---|---|---|---|---|
| S | N | S | N | S |

FIG 43C

| N | N | S | N | N |
|---|---|---|---|---|
| S | S | N | S | S |

FIG 43D

| S | N | S | N | S |
|---|---|---|---|---|
| S | S | N | S | S |

FIG 43E

| S | N | S | N |
|---|---|---|---|

FIG 43F

| S | N | N | S |
|---|---|---|---|

FIG 43G

| S | N | S | N |
|---|---|---|---|

FIG 43H

| S | N | S |
|---|---|---|

FIG 43I

| S | N |
|---|---|

INTERPOSABLE MAGNETICALLY COUPLED DEVICES

CROSS-REFERENCE TO RELATED APPLICATIONS

This application claims the benefit of priority under 35 U.S.C. § 119(e) of U.S. Provisional Patent Application No. 62/736,379, entitled INTERPOSABLE MAGNETICALLY COUPLED DEVICES, filed on Sep. 25, 2018, the content of which is incorporated herein by reference in its entirety for all purposes. This application is related to U.S. patent application Ser. No. 14/288,243, entitled "LOW PROFILE MAGNETIC MOUNT FOR ELECTRONIC DISPLAY DEVICES," filed May 27, 2014, and to U.S. patent application Ser. No. 15/059,163, entitled "SELF-ALIGNING, MULTI-SURFACE MAGNETIC MOUNT FOR ELECTRONIC DISPLAY DEVICES," filed Mar. 2, 2016 the disclosures of each which are incorporated herein by reference in its entirety for all purposes.

BACKGROUND

Cell phones are an essential part of many people's lives and frequently carried by people throughout the day. Cell phones can provide navigation, entertainment, and function as a camera in addition to their primary purpose as a telecommunications device. Like cell phones, wallets are an integral part of daily life. Wallets come in a variety of sizes and configurations for organizing and securing credit cards, cash, checks, identification, photos, and other possessions.

A cell phone and wallet are the two important items that people carry with them throughout their day. These items can get buried in one's purse, fall between the seats of a vehicle, and otherwise become displaced. When driving, it is important to have a cell phone at the ready in case navigation is required without having to search for it. Also it is sometimes necessary to have one's wallet close by to pay tolls or swipe a badge to enter a parking garage. In addition, a battery pack or wireless charger may be needed for recharging of the cell phone and plug-in charging is unavailable. Thus, a need exists to better arrange one's cell phone, wallet and other related accessories.

SUMMARY

The embodiments described herein relate generally to mobile electronic display device accessories and mounts and, more specifically, to a mounting system that can be used to easily mount and unmount mobile electronic display devices and related accessories to each other and to various surfaces in various stacked and other configurations and in various orientations (e.g., landscape and portrait). Such accessories may include, for example, wallets, battery packs, wireless chargers, kickstands, finger loops and combinations thereof. In particular, the embodiments described herein utilize magnetic coupling to facilitate rapid mounting and unmounting of such accessories to and from mobile electronic display devices.

In one aspect the disclosure relates to a mobile device accessory including an accessory device having a surface. An arrangement of magnets of alternating polarity are included within the accessory device or attached to the surface. The arrangement of magnets are magnetically coupleable to a device-side attachment including a plurality of magnets. The device-side attachment may be attached to a mobile device or part of a protective case for the mobile device. The plurality of magnets may include a first plurality of magnets arranged in a first direction and a second plurality of magnets arranged in a second direction, thereby enabling the accessory device to be disposed in different orientations when magnetically coupled to the device-side attachment. When the device-side attachment is part of a protective case for a mobile device, the different orientations may include a portrait orientation and a landscape orientation relative to the mobile device.

The disclosure is also directed to a mobile device accessory system including a first accessory device having a first front side and a first back side. The first accessory device includes a first plurality of alternating polarity magnets on the first front side and a second plurality of alternating polarity magnets on the first back side. A second accessory device has a second front side and a second back side, the second accessory device having a third plurality of alternating polarity magnets on the second front side and a fourth plurality of alternating polarity magnets on the second back side. The first accessory device is magnetically coupled to a device-side attachment associated with a mobile device and is interposed between the device-side attachment and the second accessory device. The second plurality of alternating polarity magnets may be aligned with and magnetically coupled to the third plurality of alternating polarity magnets.

In addition, the second accessory device may be interposed between the first accessory device and a surface-side attachment including a fifth plurality of alternating polarity magnets. In this case the fourth plurality of alternating polarity magnets are magnetically coupled to the fifth plurality of alternating polarity magnets.

In another aspect the disclosure pertains to a system including a first plurality of alternating plurality magnets attached to a protective case for a mobile device. A first accessory device has a first front side and a first back side, the first accessory device having a second plurality of alternating polarity magnets on the first front side and a third plurality of alternating polarity magnets on the first back side. The second plurality of alternating polarity magnets are magnetically coupled to the first plurality of alternating polarity magnets. A second accessory device has a second front side and a second back side, the second accessory device having a fourth plurality of alternating polarity magnets on the second front side and a fifth plurality of alternating polarity magnets on the second back side. The fourth plurality of alternating polarity magnets are magnetically coupled to the third plurality of alternating polarity magnets.

The system may further include a third accessory device having a third front side and a third back side. The third accessory device includes a sixth plurality of alternating polarity magnets on the third front side and a seventh plurality of alternating polarity magnets on the third back side. The sixth plurality of alternating polarity magnets are magnetically coupled to the fifth plurality of alternating polarity magnets. In one implementation the first accessory device, the second accessory device and the third accessary device are configured in a stack. In addition, the first accessory device, the second accessory device and the third accessary device are configured to be able to be moved to different positions in the stack.

In another aspect the disclosure relates to an accessory wallet for use with a mobile electronic device. The wallet includes a layered front section including a plurality of front layers. The wallet further includes a layered back section including a plurality of back layers wherein the layered front side and the layered back side are arranged to form a compartment. A plurality of magnets are disposed on at least one of the plurality of front layers and one of the plurality of back layers. This arrangement of magnets renders the wallet magnetically coupleable to at least one of an external object and an external surface.

The plurality of front layers of the wallet may include a front portion and a front support and the plurality of back layers may include a back portion and a back support. The plurality of front layers may further include a metallic front shield and the plurality of back layers may further include a metallic back shield. In this case the metallic front shield and the metallic back shield form opposing surfaces of the compartment.

The disclosure is further directed to a mounting system including a device-side attachment having a first plurality of magnets disposed in a protective cover for an electronic device. The mounting system further includes a wallet including a second plurality of magnets and a third plurality of magnets wherein at least one of the first plurality of magnets is arranged to attractively couple with at least one of the second plurality of magnets. A surface-side attachment includes a fourth plurality of magnets arranged to attractively couple to the third plurality of magnets.

The wallet may be configured with a layered front section and a layered back section arranged to form a compartment. The second plurality of magnets may be disposed within the layered front section and the third plurality of magnets may be disposed within the layered back section.

The disclosure further pertains to a system including a device-side attachment having a first plurality of magnets disposed in a protective cover for an electronic device. The system also includes a wallet having a layered front section, a layered back section and a second plurality of magnets where the layered front section and the layered back section form a compartment. The first plurality of magnets are arranged to attractively couple with the second plurality of magnets.

The mounting systems disclosed herein may include a surface-side attachment affixed to a surface including a nonmagnetic surface and device-side attachment coupled to the electronic display device as described in the above-referenced U.S. patent application Ser. No. 15/059,163. While it is recognized that the surface-side attachment can be affixed to a ferromagnetic surface, the present mounting system is especially suitable for nonmagnetic surfaces. In one implementation, a plurality of magnets is embedded within the surface-side attachment. Alternatively, a plurality of magnets may be directly attached to the nonmagnetic surface that is covered by a protective housing. In another implementation, the surface-side attachment is integrated into the nonmagnetic surface during its manufacture.

BRIEF DESCRIPTION OF THE DRAWINGS

FIGS. 6 and 7 are perspective, hidden views of a wallet including placement of magnets therein, according to embodiments.

FIG. 13A is a front view of an electronic display device case.

FIGS. 13B-13D are cross-sectional views of the electronic display device case of FIG. 13A, a wallet, and a magnetic surface-side attachment, respectively.

FIG. 18 is a perspective view of a wallet interposed between an electronic display device case and a magnetic surface-side attachment, according to an embodiment.

FIGS. 35 and 36 are partially transparent rear views of a battery pack with wireless charging and a protective cover for an electronic device.

FIGS. 43A to 43I depict examples of self-aligning arrangements of outwardly-facing magnet poles for use in device-side attachments and in surface-side attachments.

DETAILED DESCRIPTION

Figure 1:
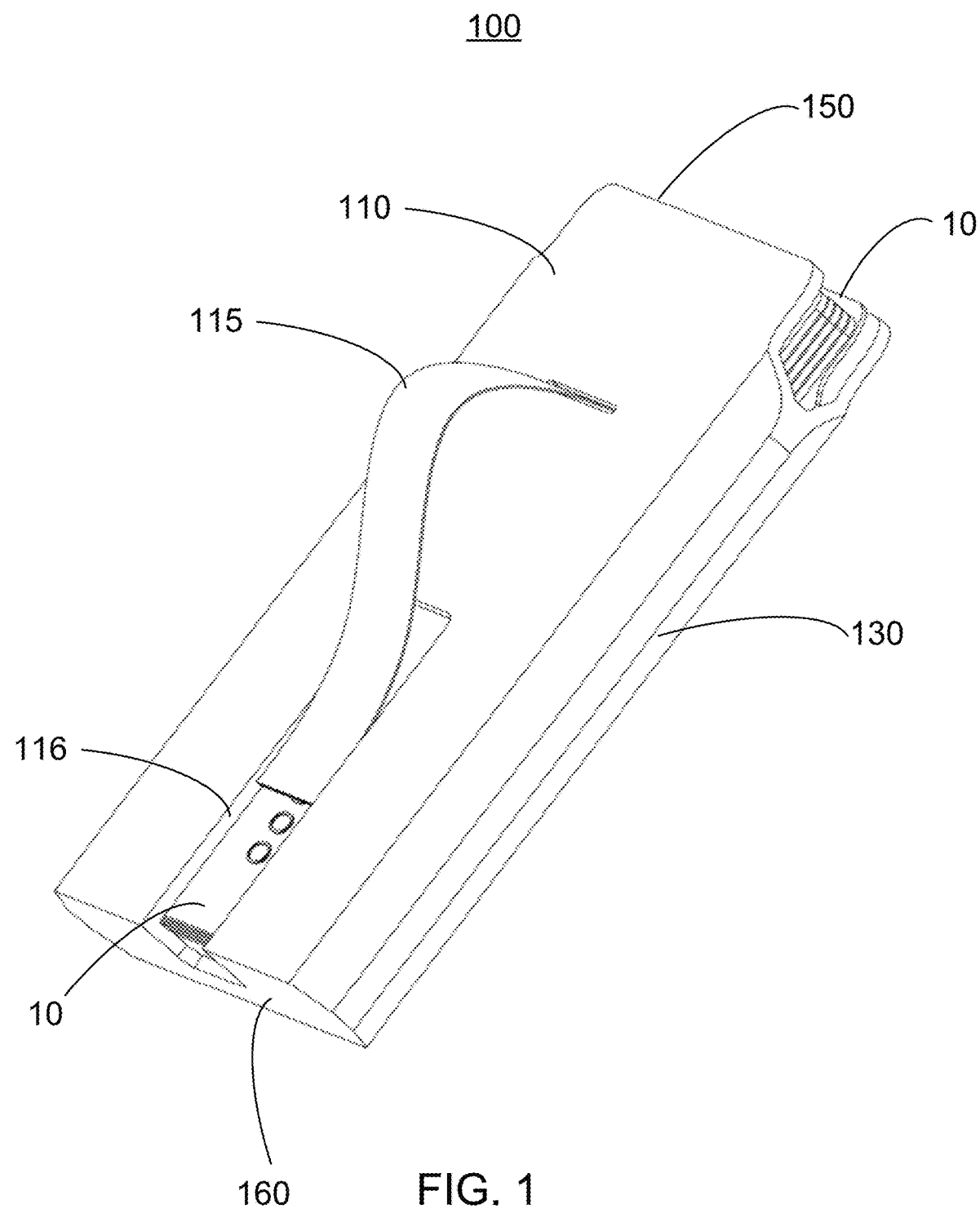
FIG. 1 is a perspective view of a wallet with extended loop, according to an embodiment.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, an "electronic display device" should be understood to mean any electronic device or any display device including cell phones, computer tablets, phablets, electronic organizers, personal digital assistant, navigation devices (GPS), radar detectors, garage door openers, remote controls, wireless microphones and/or speakers, cameras, video recorders, music players, controllers and microcomputers. While the mounting system described herein is intended for electronic display devices, it should be understood that the mounting system is suitable for any object of similar size and dimensions as an electronic display device.

As used herein in the specification and in the claims, a "wallet" should be understood to mean any apparatus for holding at least one of a credit card, cash, identification, a check, a badge, a picture, a key, a piece of paper, a coupon, business cards, and combinations thereof. While the wallet described herein is intended for containing the aforementioned items, it should be understood that a wallet is also suitable for containing any objects of similar size and dimensions as these items. While the wallet's contents are generally described as credit cards, it should be understood that a wallet can carry any number of the items identified above.

As used herein in the specification and in the claims, "outward" or "outwardly," should be understood to mean facing away from an object or surface, rather than facing toward an object or surface to which it is affixed. The outward faces of the attachments are designed to couple to each other and can have complementary physical features which interact with each other. When the device-side attachment is mounted to the surface-side attachment, the outward face of the surface-side attachment is coupled to the outward face of device-side attachment.

As used herein in the specification and in the claims, "front" and "back," should be understood to mean facing away toward or away from a user during interaction with the object. For example, a wallet may be held in a person's hand with a finger extended through the loop or finger strap, which is on the back side of the wallet, and the front side of the wallet faces the user.

Each embodiment in this specification is to be applied mutatis mutandis to every other embodiment unless expressly stated otherwise.

In some embodiments, a wallet is magnetically coupleable to a case configured to contain an electronic display device is described herein. In some embodiments, a wallet is magnetically coupleable to a magnetic mount configured to attach to a surface is described herein. In some embodiments, a wallet is interposable between electronic display device and a magnetic surface mount is described herein.

FIG. 1 is a perspective view of a wallet 100 with loop (finger strap) 115 in an extended position, according to an embodiment. Wallet 100 includes a back portion 110, left portion 130, top portion 150, and a bottom portion 160. Loop 115, also referred to as a finger strap, is shown in an extended position with a portion of a plurality of credit cards 10 visible through loop slot 116. Loop 115 provides a user with a secure grip on wallet 100.

In some embodiments, a Wallet 100 holds a plurality of credit cards 10 in an amount from 1 to 8 credit cards, in an amount of at least 2 credit cards, in an amount of at least 5 credit cards, in an amount from 3 to 10 credit cards, in an amount from 2 to 8 credit cards, in an amount from 3 to 8 credit cards, in an amount from 4 to 8 credit cards, and/or in an amount from 3 to 8 credit cards.

In some embodiments, a Wallet 100 has overall dimensions of 70 mm wide×90 mm tall, and 4 mm to 10 mm thick depending on credit cards 10 contained therein.

Figure 2:
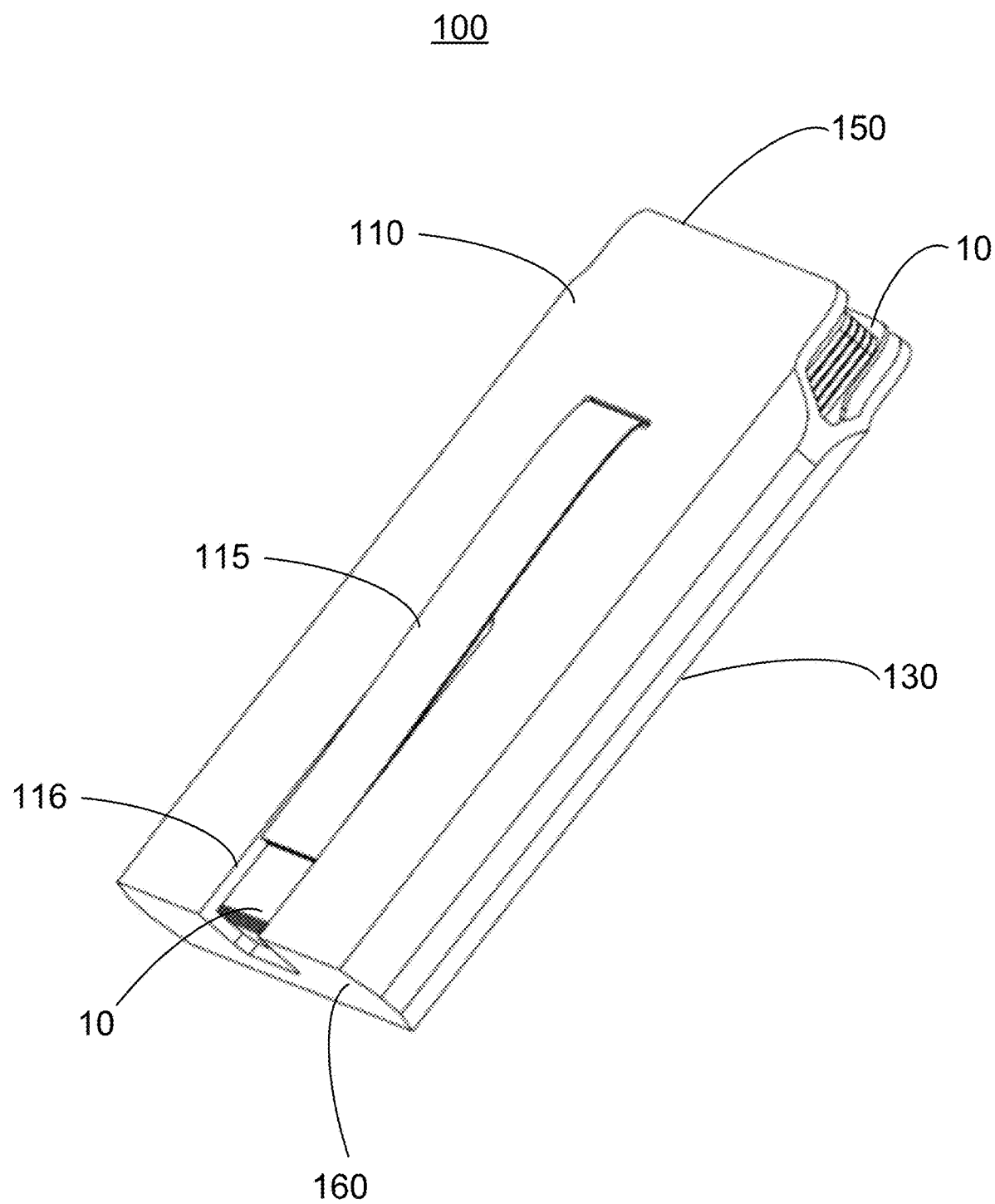
FIG. 2 is a perspective view of a wallet with retracted loop, according to an embodiment.

FIG. 2 is a perspective view of a wallet 100 with loop 115 in a retracted position, according to an embodiment. Loop 115 flattens to fit within loop slot 116. In some embodiments, loop slot 116 allows the loop 115 to flatten within loop slot 116 such that loop 115 is substantially flush with back portion 110 forming a substantially planer configuration. In some embodiments, loop slot 116 allows only a first portion of loop 115 to flatten within loop slot 116 such that a second portion of loop 115 protrudes from a plane defined by the back portion 110.

Figure 3:
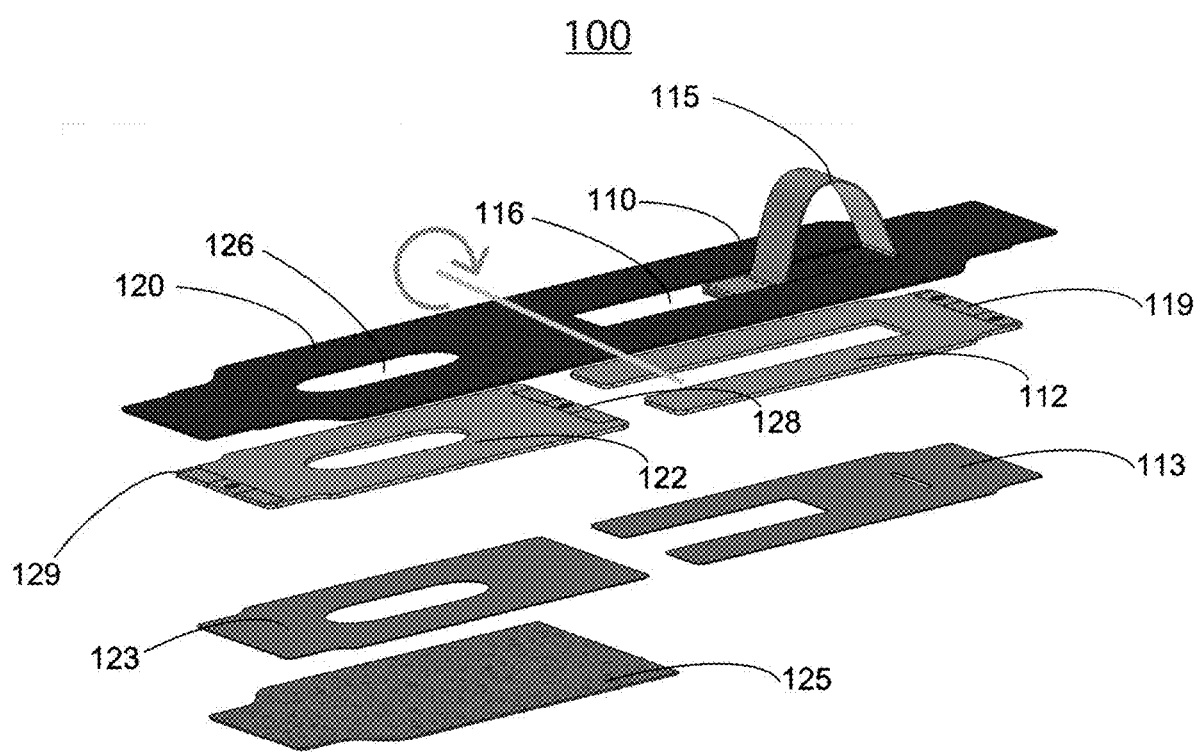
FIG. 3 is a perspective, exploded view of a wallet, according to an embodiment.

FIG. 3 is an perspective, exploded view of a wallet 100, according to an embodiment. Wallet 100 includes a back support 112 and a front support 122. Back support 112 and front support 122 can provide stiffness and rigidity to wallet 100. Back support 112 and front support 122 can also provide a substrate for attaching back-side magnets 119, and front-side bottom magnets 128 and front-side top magnets 129. Back shield 113 and front shield 123 protect magnetically sensitive credit cards from exposure to the magnetic fields created by back-side magnets 119, front-side bottom magnets 128, and front-side top magnets 129. Exemplary configurations of back-side magnets 119, front-side bottom magnets 128, and front-side top magnets 129 are disclosed in U.S. Publication No. 2016-0260532, and in particular the disclosure of the device-side attachments that provide self-alignment with surface-side attachments. To assemble wallet 100, back portion 110 and front portion 120 are folded about an axis to form a compartment for storing credit cards 10. An optional divider 125 separates a one compartment into two compartments. In some embodiments, wallet 100 includes one or more dividers. A divider is a useful means to separate the credit cards from the cash bills and other contents of the wallet 100.

Figure 4:
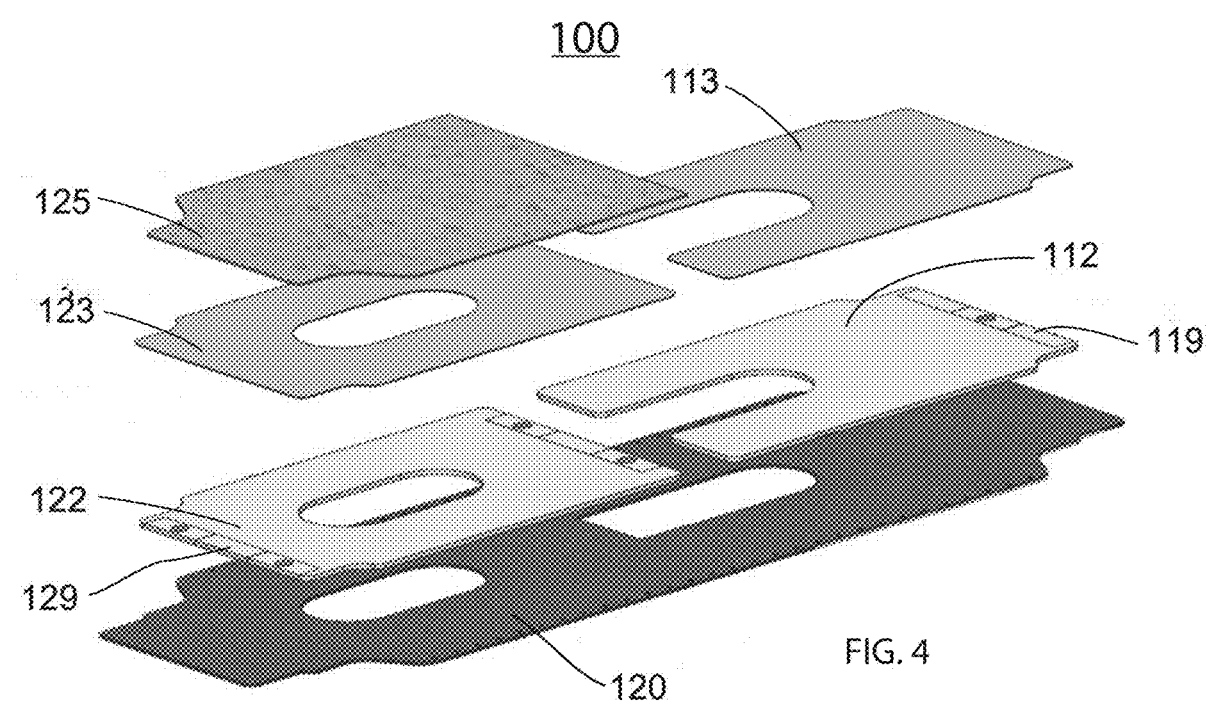
FIG. 4 is an exploded, perspective view of a wallet including exemplary materials of construction, according to an embodiment.

FIG. 4 is an exploded, perspective view of a wallet 100 including exemplary materials of construction, according to an embodiment. Divider 125 can be made from materials such as plastic, cardboard, paper, metal, composites, laminations, and combinations thereof. Back shield 113 and front shield 123 can be made from magnetic field blocking materials including metal, foil coated plastic, foil coated cardboard, carbon filled composites, and combinations thereof. Back support 112 and front support 122 can be made from materials such as plastic, cardboard, paper, metal, composites, laminations, and combinations thereof. Back portion 110 and front portion 120 can be made from a single substrate and folded together, or in other embodiments, back portion 110 and front portion 120 can be made from two or more pieces and joined together. Back portion 110 and front portion 120 can be made from materials such as plastic, leather, composites, laminations, fabric, synthetic material, and combinations thereof.

Figure 5:
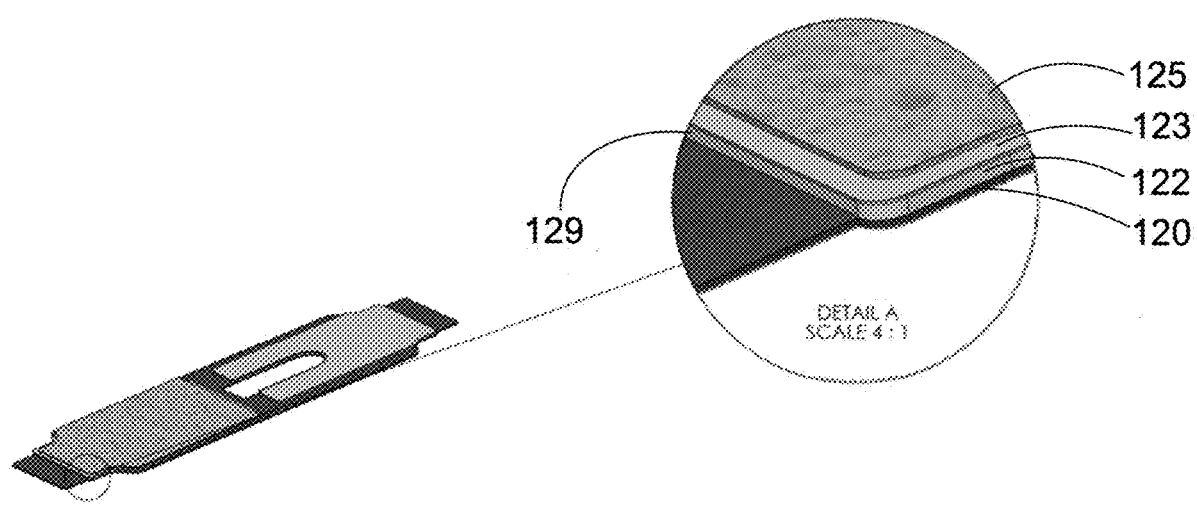
FIG. 5 is a perspective view of a partially assembled wallet including a detail of exemplary materials of construction, according to an embodiment.

FIG. 5 is a perspective view of a partially assembled wallet 100 including a detail of exemplary materials of construction, according to an embodiment. Components can be bonded together with adhesive.

Figure 6:
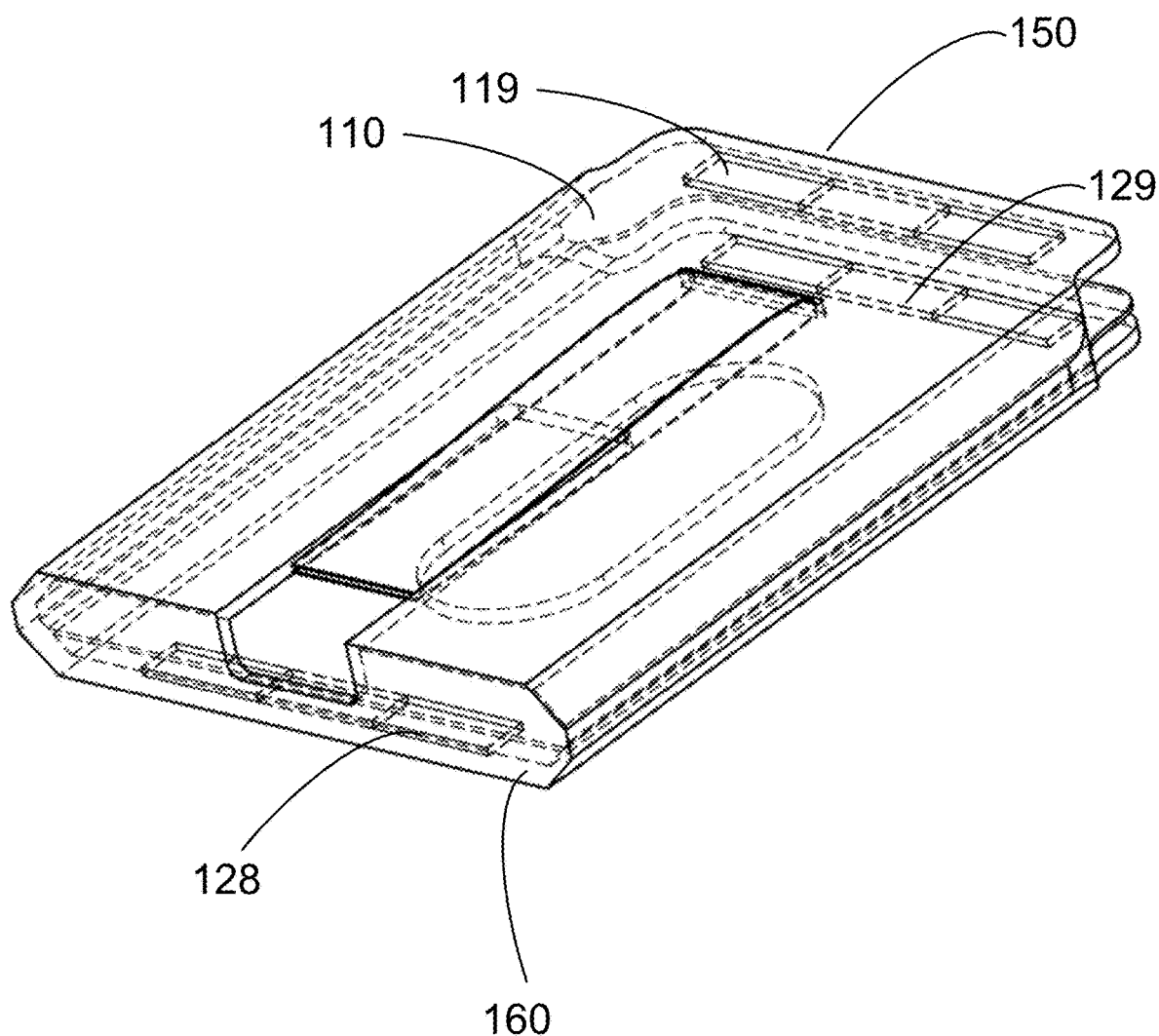

FIGS. 6 and 7 are perspective, hidden views of a wallet 100 including placement of magnets therein, according to embodiments. In FIG. 6, the back portion 110 is facing upwards, while in FIG. 7, the front portion 120 is facing upwards. In these embodiments, only the front side includes magnets. In other embodiments, both the front side and the back side include magnets.

Figure 8B:
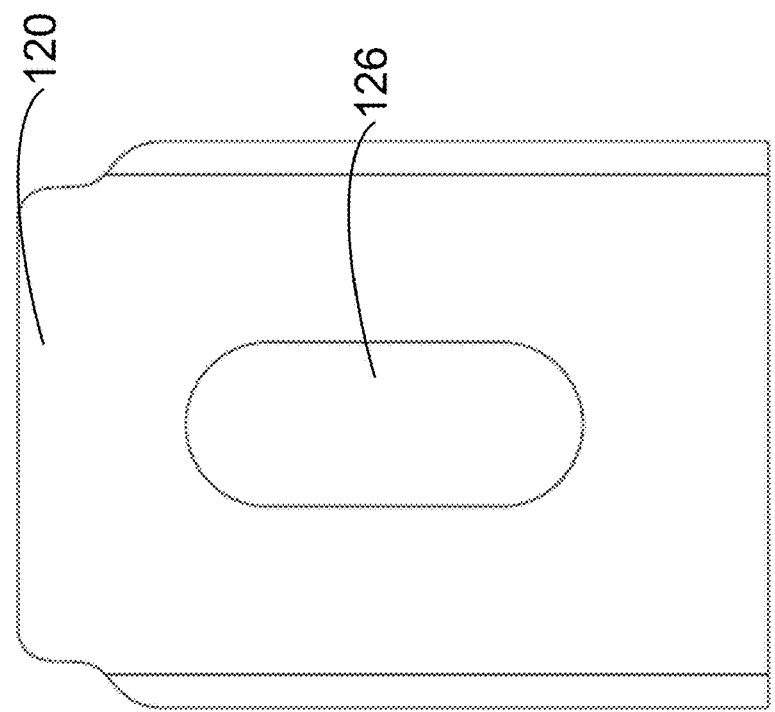
FIGS. 8A and 8B are views of a back portion and front portion of wallet, according to an embodiments.
Figure 8A:
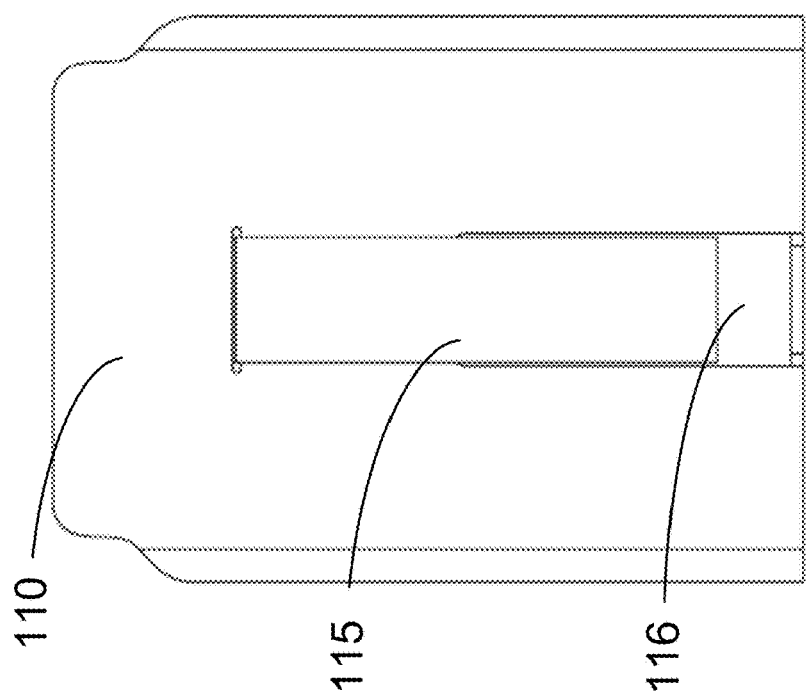

FIGS. 8A and 8B are views of a back portion and front portion of wallet, according to an embodiments. Wallet 100 includes a content removal slot 126 that facilitates the removal of credit cards 10. A user can place their finger through the content removal slot 126 and slide credit cards 10 through the top portion 150 of wallet 100. Content removal slot 126 also provides a window into the compartment of wallet 100 for visually inspecting its contents.

Figure 9:
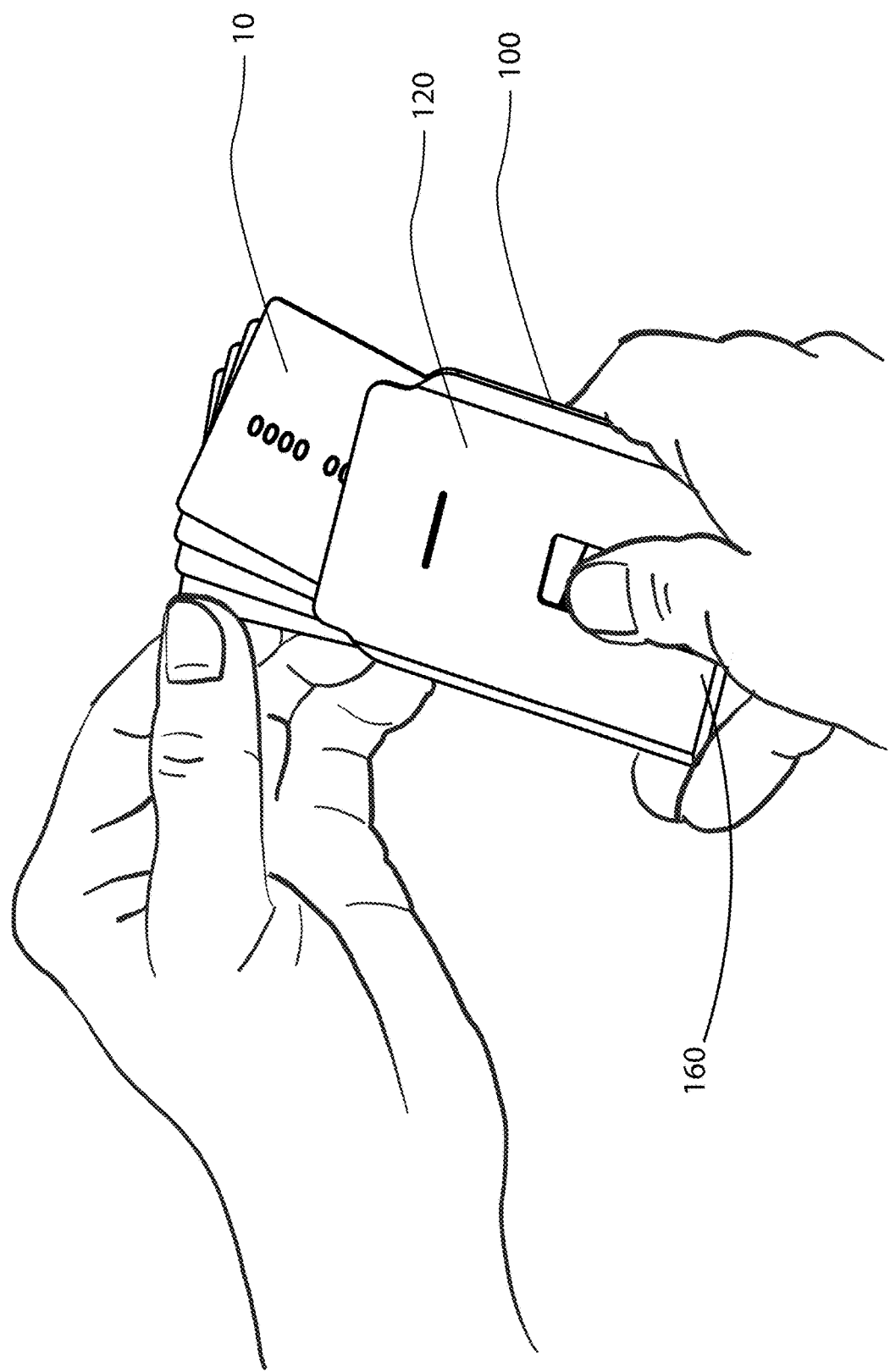
FIG. 9 is a view of a user holding a wallet, according to an embodiment.

FIG. 9 is a view of a user holding a wallet 100, according to an embodiment. Wallet 100 can hold a plurality of credit cards 10 in a compartment formed between front portion 120, back portion 110, bottom portion 160, top portion 150, left portion 130 and right portion 140.

Figure 10:
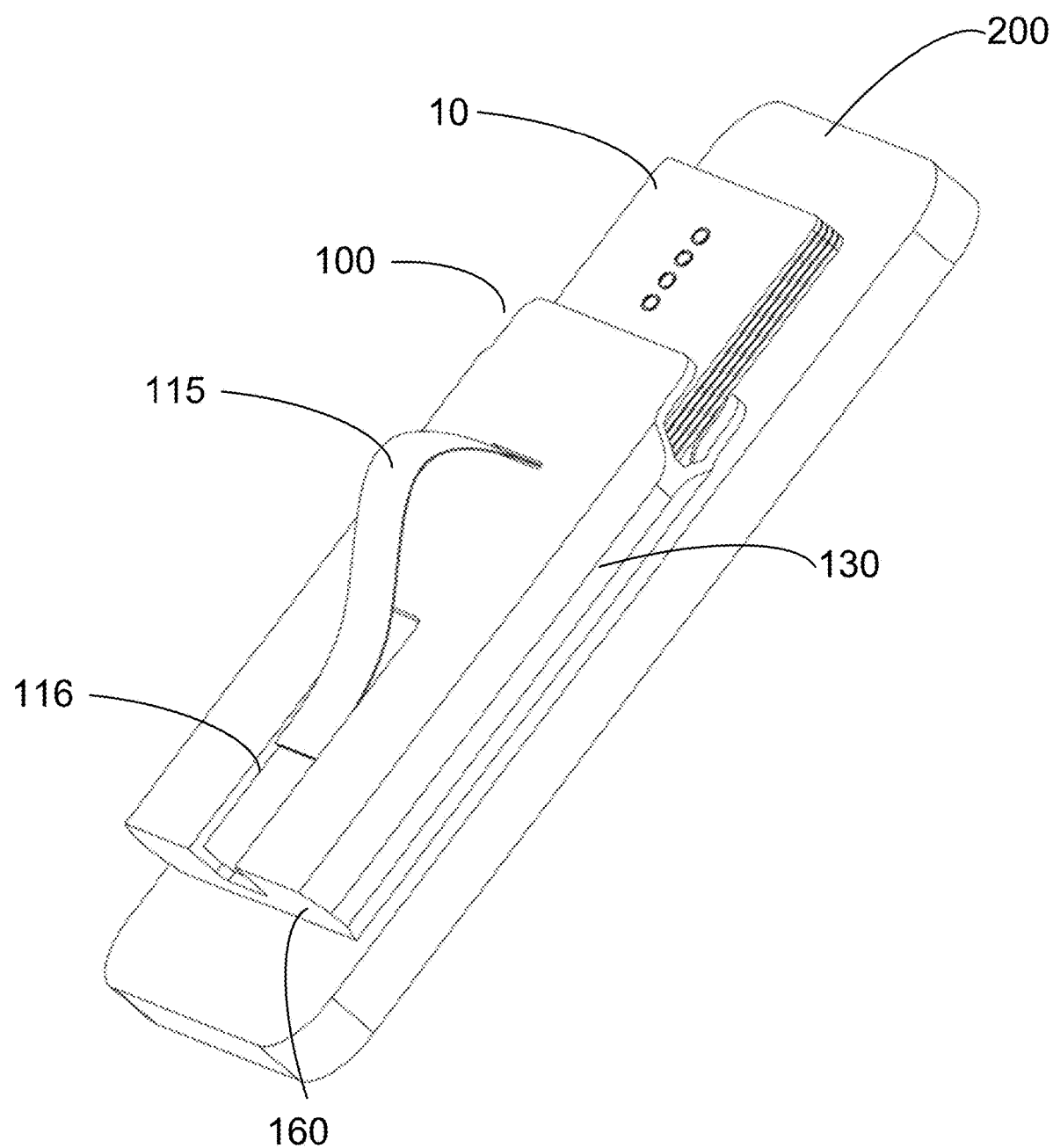
FIG. 10 is a perspective view of a wallet attached to an electronic display device case, according to an embodiment.

FIG. 10 is a perspective view of the wallet 100 as attached to an electronic display device case 200, according to an embodiment. The front portion 120 of wallet 100 is temporarily affixed to the back side of electronic display device case 200 by magnetic attraction between the magnets embedded in the wallet 100 and magnets embedded in the electronic display device case 200. Loop 115 allows a user to securely grip the wallet 100, which in turn also provides a secure grip on the electronic display device case 200. In this manner, loop 115 is removable from the back side of the electronic display device case 200 when wallet 100 is detached from the electronic display device case 200. Wallet 100 provides the added functionality of a convenient, removable grip that allows a user to easily use electronic display device 250. Loop 115 (along with wallet 100), are quickly and easily removed for wirelessly charging electronic display device 250. After wirelessly charging, Loop 115 (along with wallet 100), are quickly and easily attached to the electronic display device case 200.

In these embodiments, wallet 100 is configured and designed so that it can be used while attached to the electronic display device case 200.

Figure 11:
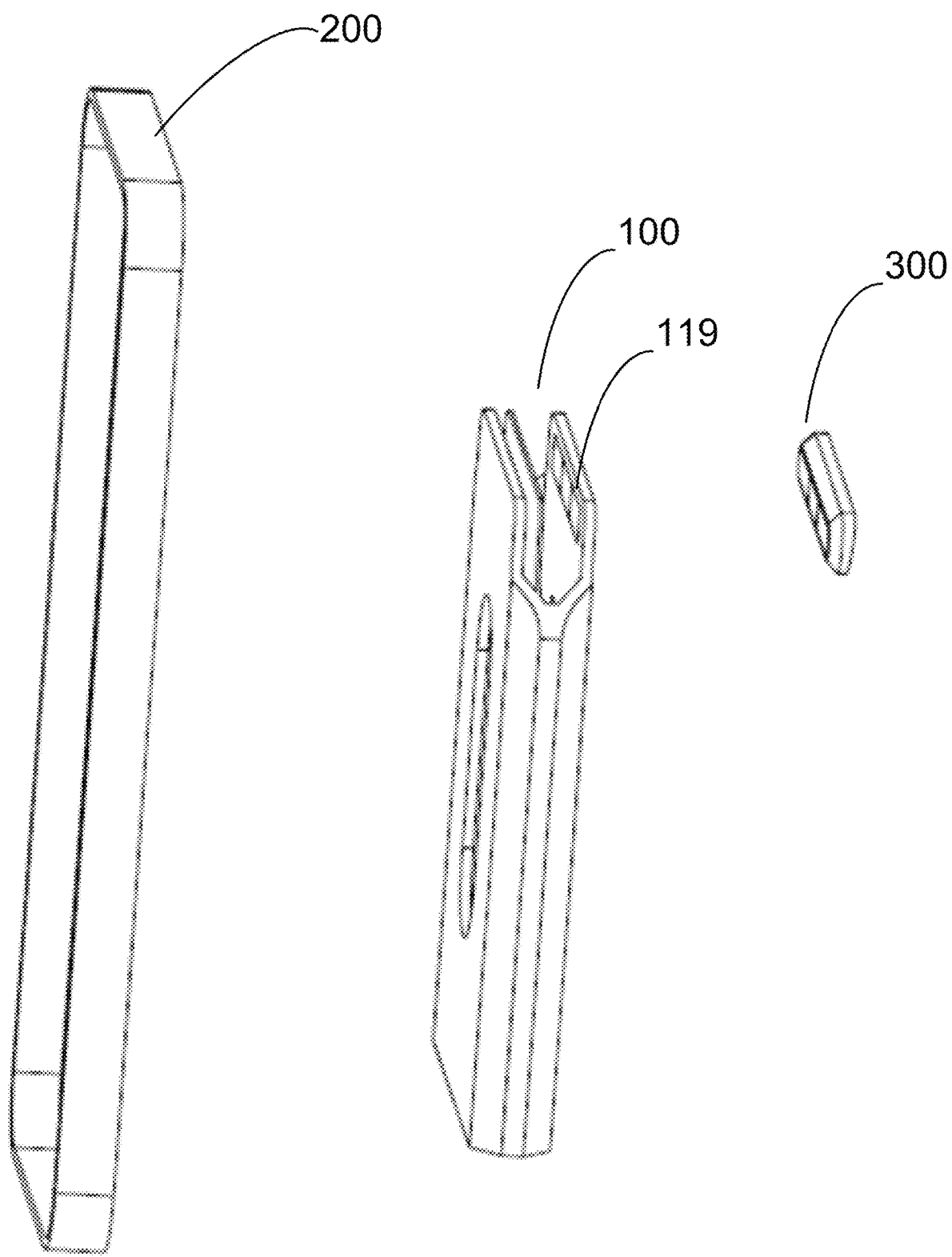
FIG. 11 is an exploded view of an electronic display device case, a wallet, and a magnetic surface-side attachment, according to an embodiment.

FIG. 11 is an exploded view of an electronic display device case 200, a wallet 100, and a magnetic surface-side attachment 300, according to an embodiment. The back side magnets 119 are configured to magnetically align and attach to surface-side attachment 300. The front-side top magnets 129 and front-side bottom magnets 128, in turn, are configured to magnetically align and attach to electronic display device case 200.

Figure 12:
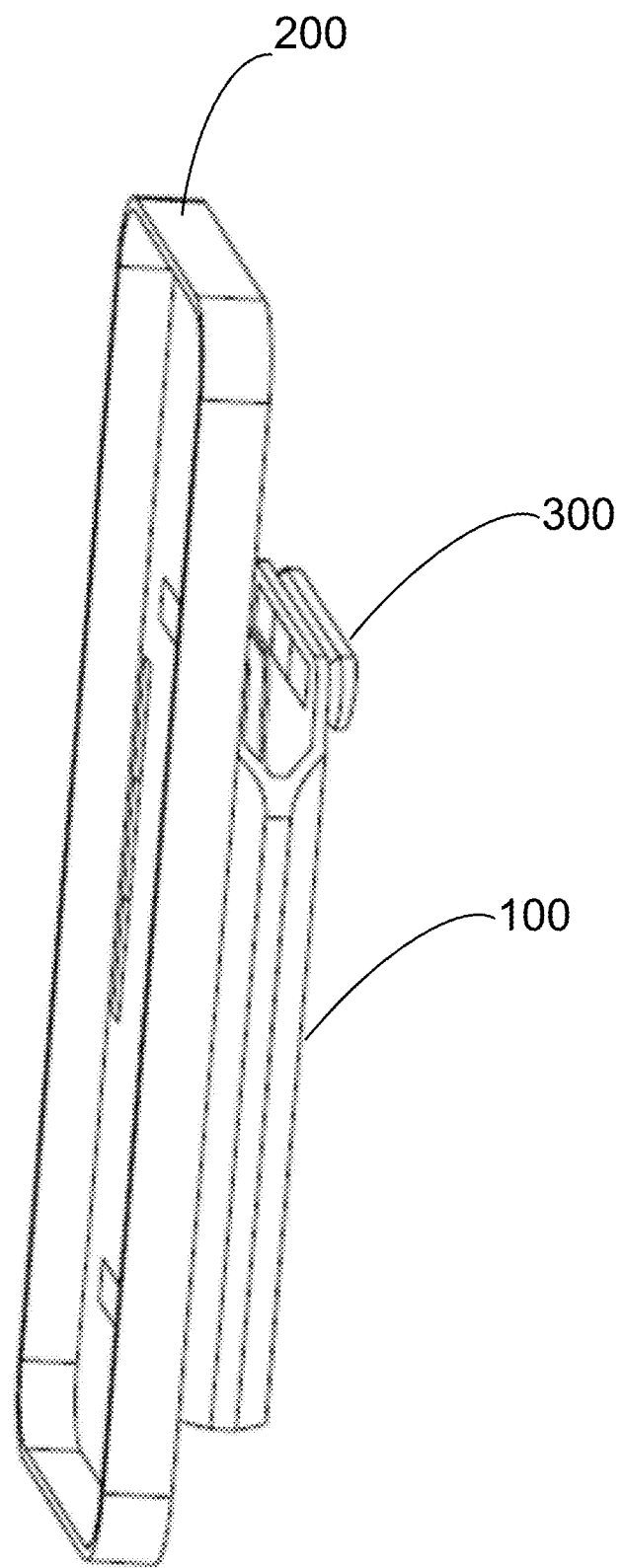
FIG. 12 is a view of a wallet interposed between an electronic display device case and a magnetic surface-side attachment, according to an embodiment.

FIG. 12 is a view of a wallet 100 interposed between an electronic display device case 200 and a magnetic surface-side attachment 300, according to an embodiment. In this manner, a single surface-side attachment 300 is able to securely hold both a wallet and an electronic display device case 200 (with electronic display device therein) at the same time.

FIG. 13A is a front view of an electronic display device case 200. FIGS. 13B-13D are cross-sectional views of the electronic display device case 200, a wallet 100, and a magnetic surface-side attachment 300, respectively. In FIG. 13A, electronic display device case 200 is bisected by line AA, and the relative positions of electronic display device case magnets (device-side attachments) 210 that are embedded within the electronic display device case 200 can be seen in the cross-sectional view of FIG. 13B. The cross-sectional view of wallet 100 also shows back-side magnets 119, front-side bottom magnets 128, and front-side top magnets 129 embedded within the back portion 110 and front portion 120, respectively.

Figure 14A:
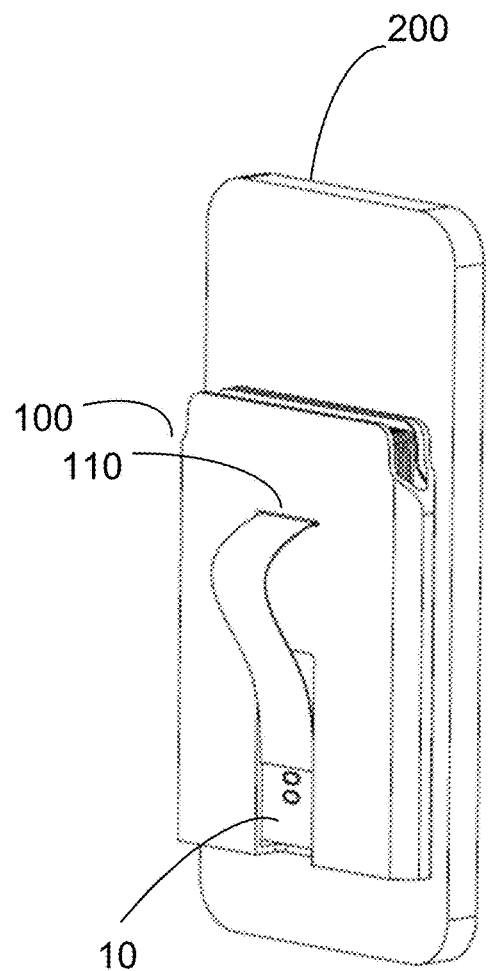
FIGS. 14A and 14B are views of a back portion of wallet attached to an electronic display device case, according to an embodiments.
Figure 14B:
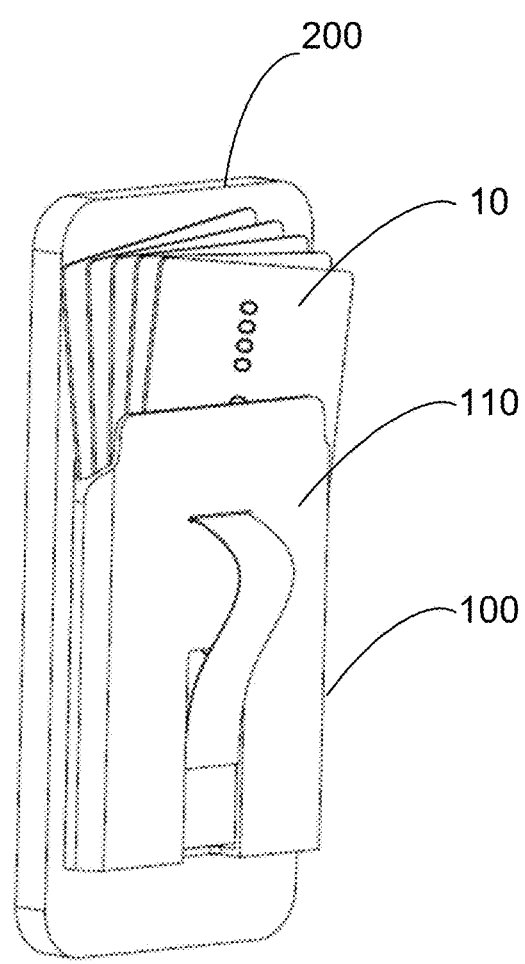

FIGS. 14A and 14B are views of a back portion 110 of wallet 100 attached to an electronic display device case 200, according to an embodiments.

Figures 15A, 15B:
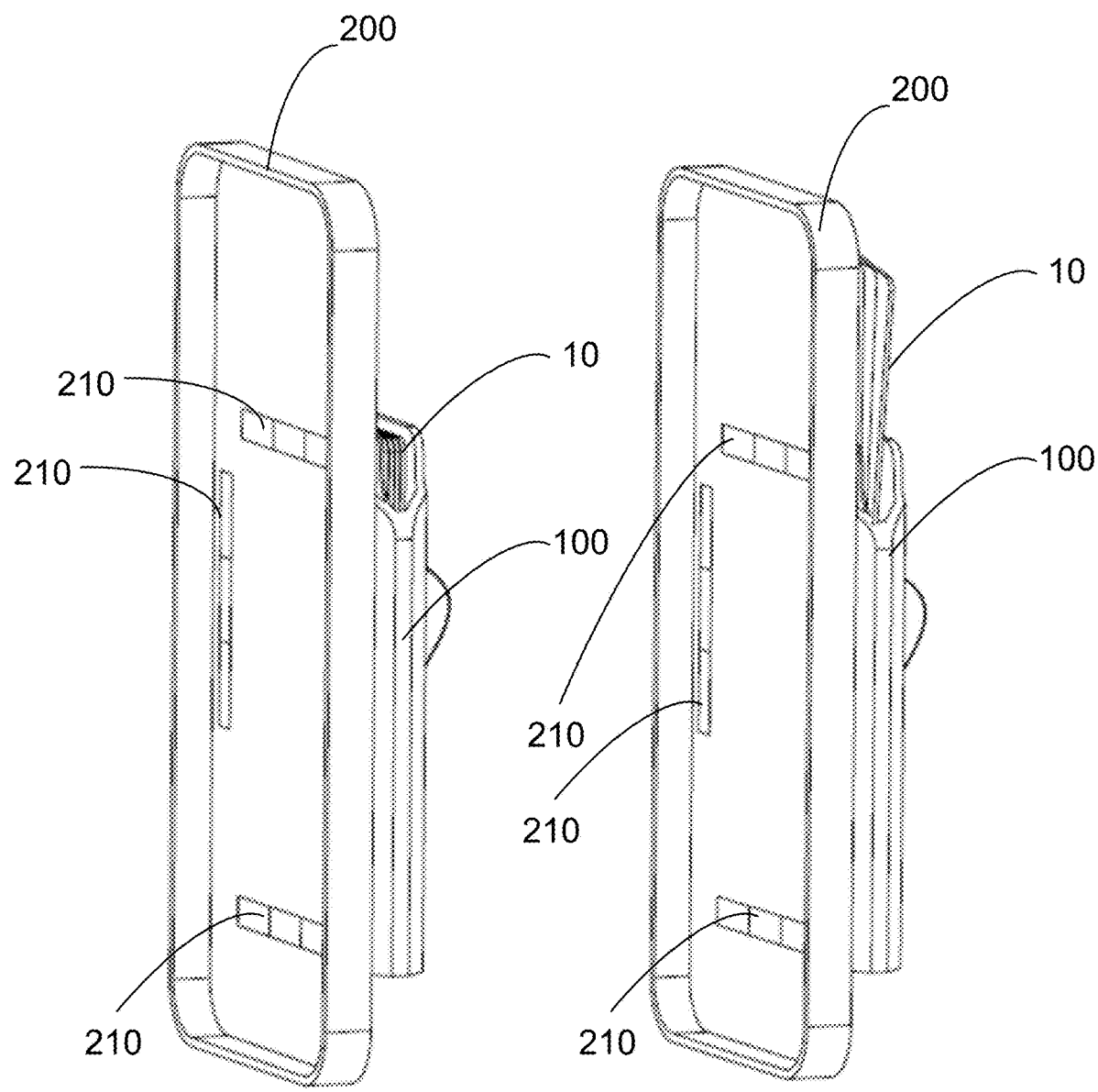
FIGS. 15A and 15B are views of a front portion an electronic display device case including electronic display device case magnets, according to an embodiments.

FIGS. 15A and 15B are views of a front portion 120 an electronic display device case 200 including electronic display device case magnets (device-side attachments) 210, according to an embodiments.

Figure 16A:
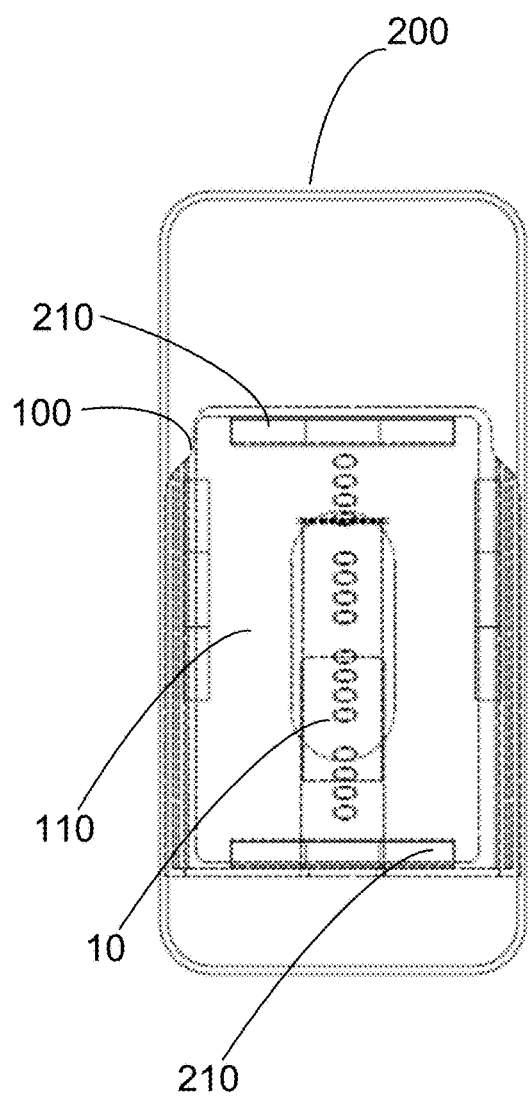
FIGS. 16A and 16B are hidden views of a back portion of wallet attached to an electronic display device case showing exemplary positions of electronic display device case magnets, according to an embodiments.
Figure 16B:
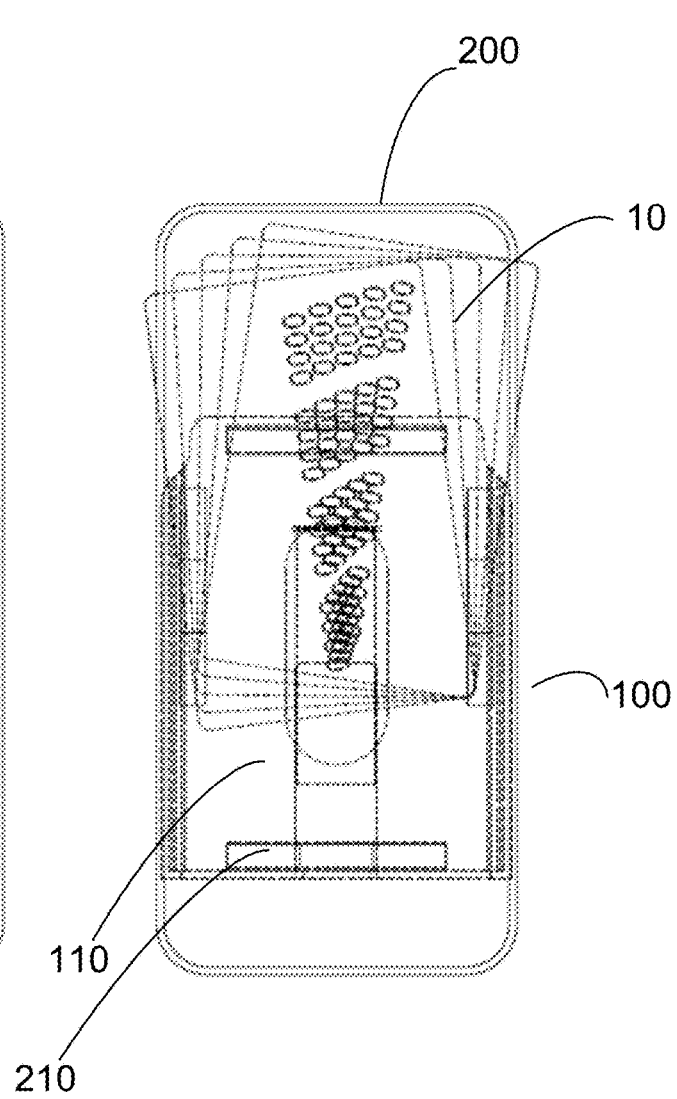

FIGS. 16A and 16B are hidden views of a back portion 110 of wallet 100 attached to an electronic display device case 200 showing exemplary positions of electronic display device case magnets (device-side attachments) 210, according to an embodiments.

Figure 17A:
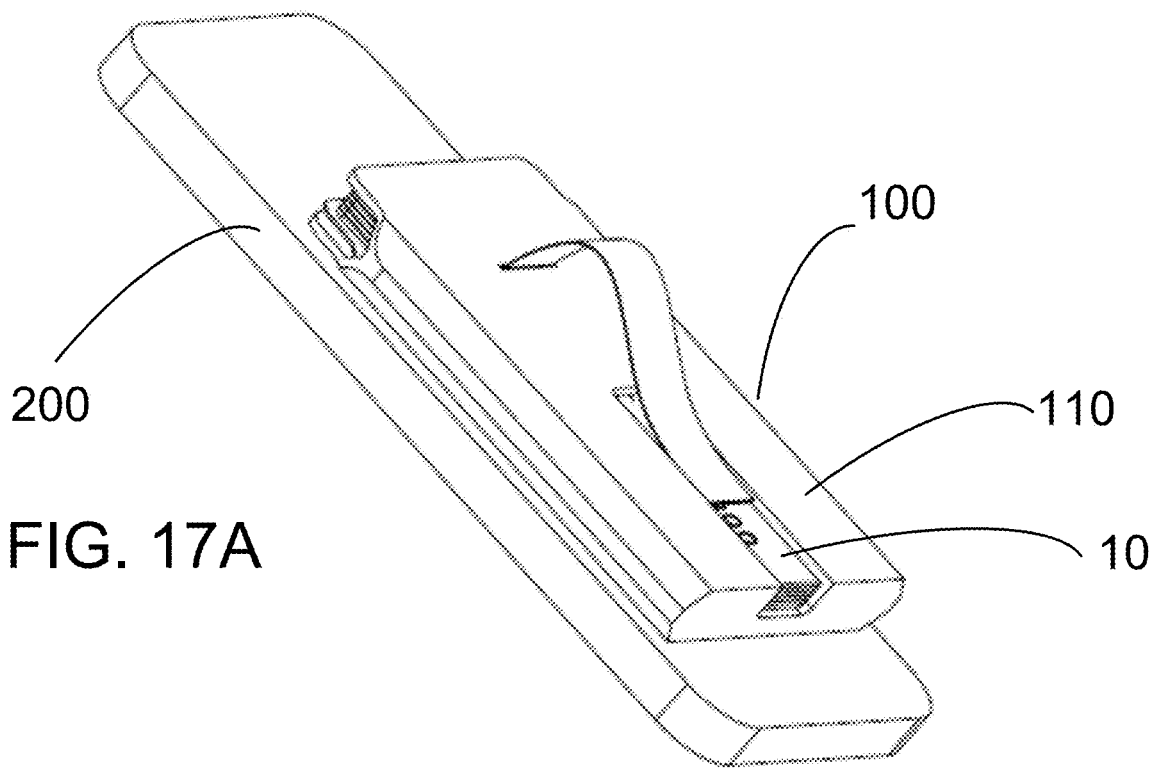
FIGS. 17A and 17B are views of a back portion of wallet attached to an electronic display device case, according to an embodiments.
Figure 17B:
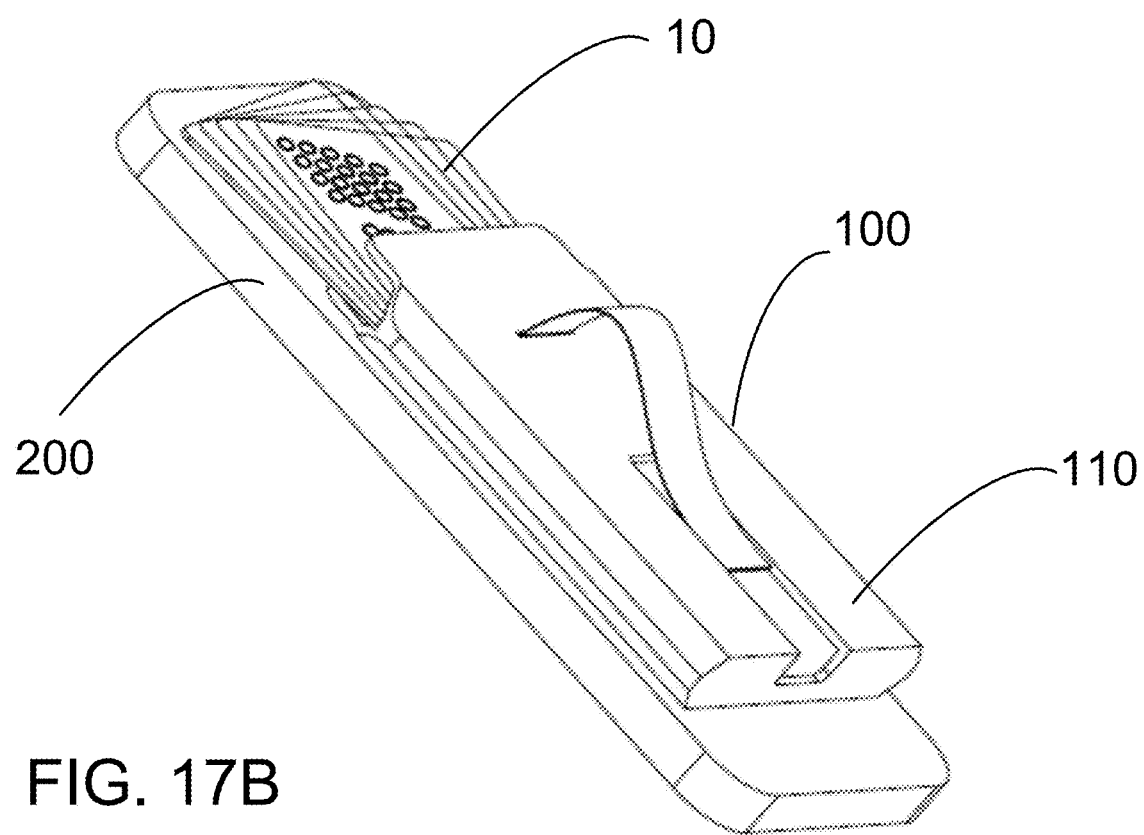

FIGS. 17A and 17B are views of a back portion 110 of wallet 100 attached to an electronic display device case 200, according to an embodiments.

FIG. 18 is a perspective view of a wallet 100 interposed between an electronic display device case 200 and a magnetic surface-side attachment 300, according to an embodiment. In this embodiment, the surface-side attachment 300 is affixed to a vehicle dash or dashboard 400. In this manner, an electronic display device 250 and wallet 100 are at an arm's reach for a driver of the vehicle. Another advantage is that a single surface-side attachment 300 can be used to mount two items (i.e. a cell phone and wallet). In some embodiments, the electronic display device 250 mounted to wallet 100 is in a portrait orientation. In some embodiments, the electronic display device 250 mounted to wallet 100 is in a landscape orientation.

Figure 19:
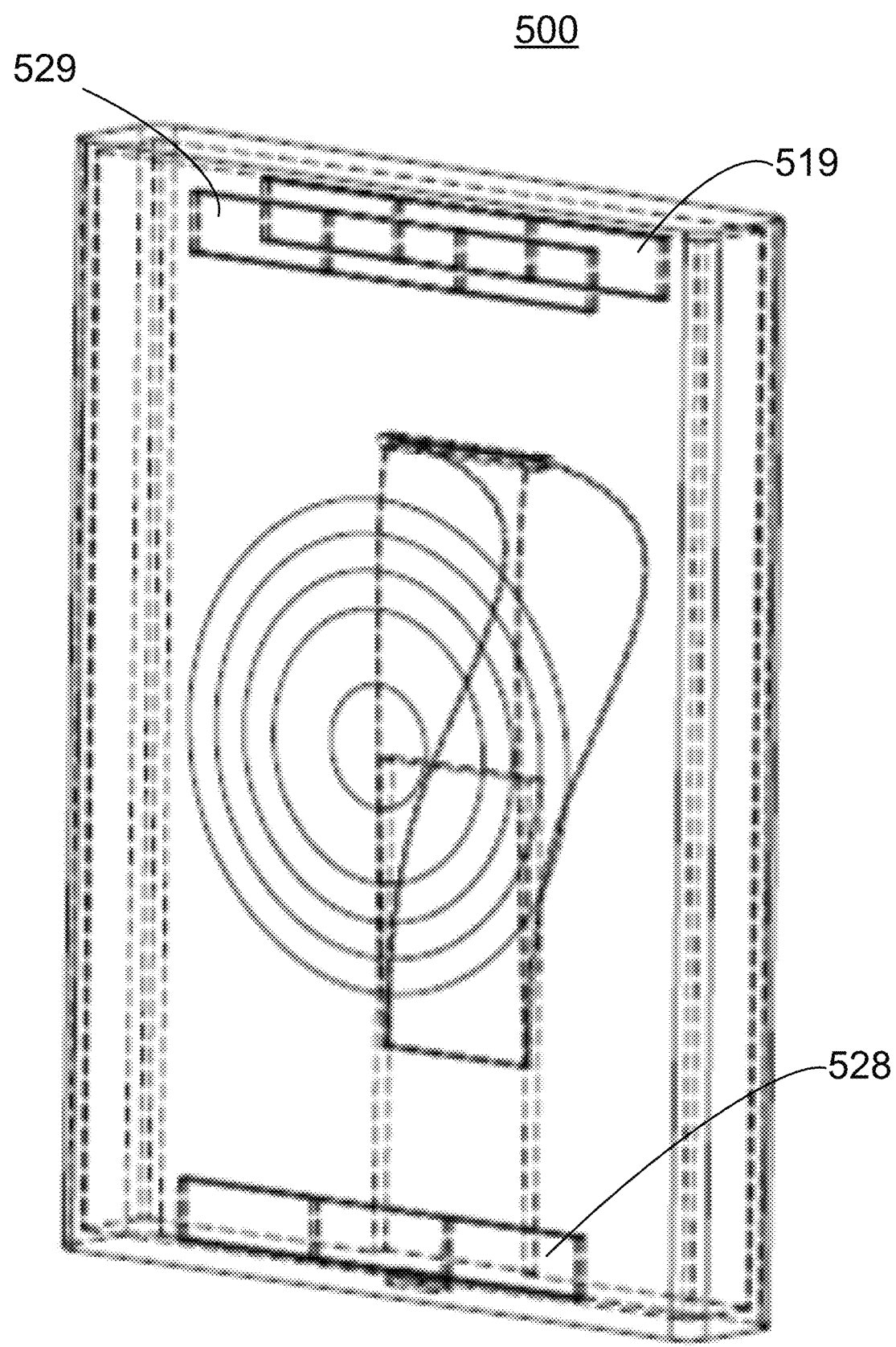
FIG. 19 is a perspective view of a charging device, according to an embodiment.

FIG. 19 is a perspective view of a charging device 500, according to an embodiment. Charging device 500 can have a configuration similar to wallet 100 meaning that it can have similar physical dimensions as well as the placement of the front-side bottom magnets 528, front-side top magnets 529, and back-side magnets 519. Charging device 500 can be a wireless charging device that transmits energy through an electronic display device case 200 and into electronic display device 250 to recharge its battery. Charging device 500 can be a battery pack that wirelessly transmits energy through an electronic display device case 200 and into electronic display device 250 to recharge its battery. In some embodiments, charging device 500 is a battery pack only. In some embodiments, charging device 500 is wireless charging device only. In some embodiments, charging device 500 is both a battery pack and a wireless charging device together.

Figure 20:
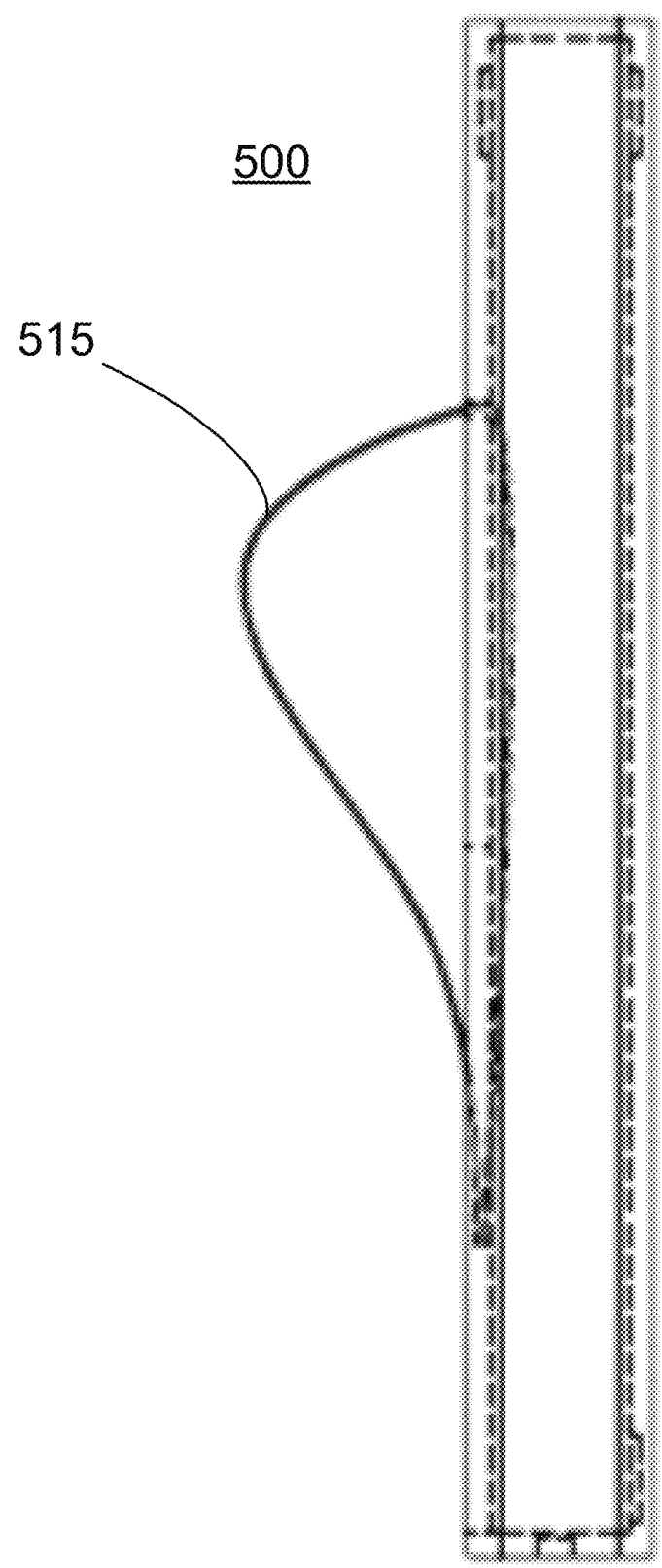
FIG. 20 is a side view of a charging device with extended loop, according to an embodiment.

FIG. 20 is a side view of a charging device 500 with loop 515 shown in an extended position, according to an embodiment.

Figure 21:
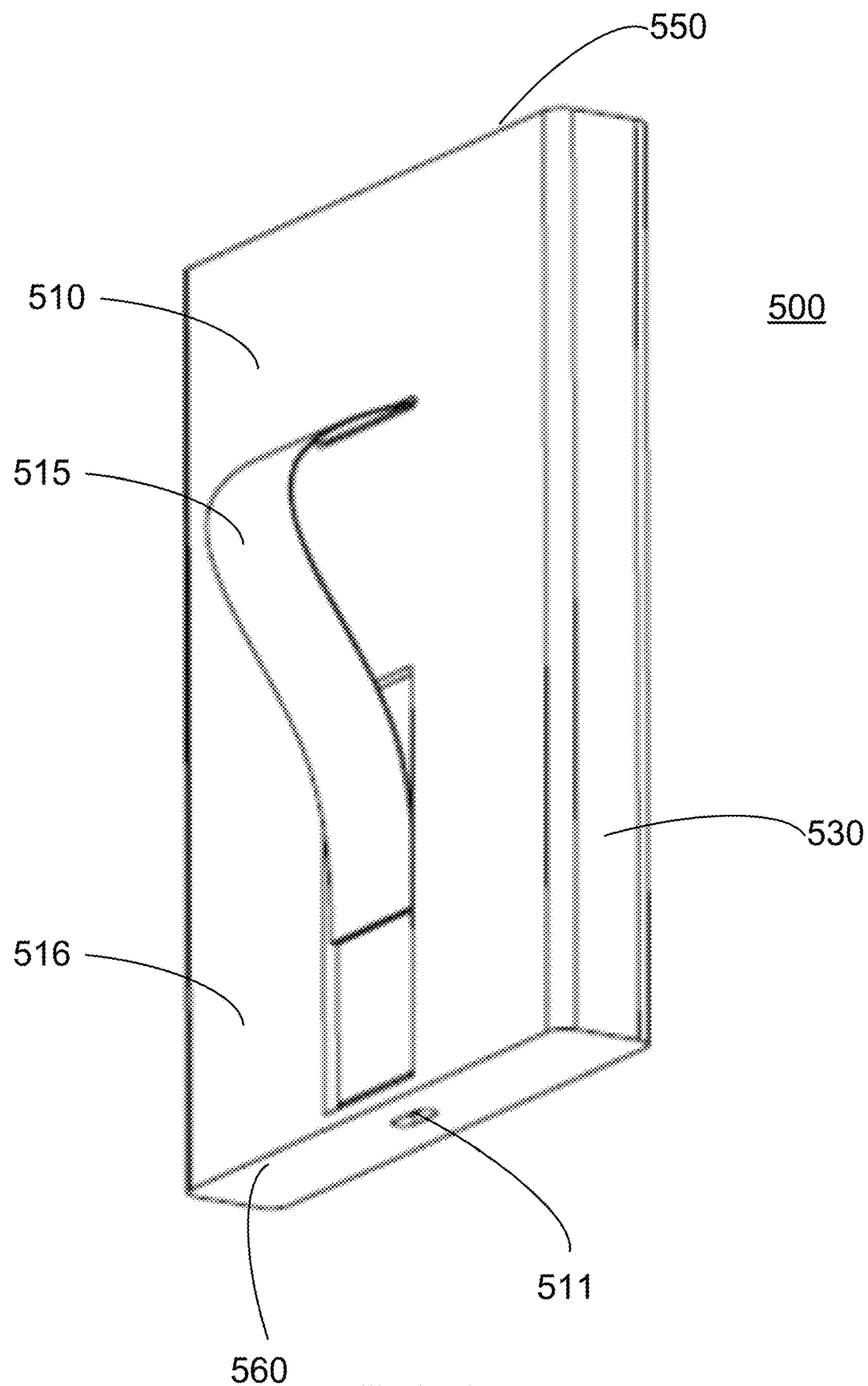
FIG. 21 is a perspective view of a charging device including power port, according to an embodiment.

FIG. 21 is a perspective view of a charging device 500 including power port 511, according to an embodiment. Charging device 500 can be externally powered through power port 511. For example, power port 511 can be a USB connector that receive a cable that electrically couples charging device 500 to a power supply such as a vehicle battery or power outlet.

In other embodiments, charging device 500 can be a battery pack that transfers an electrical charge to an electronic display device 250 through a cable connected to power port 511. In this manner, the charging device 500 has a wired connection to electrically charge the electronic display device 250.

Figure 22:
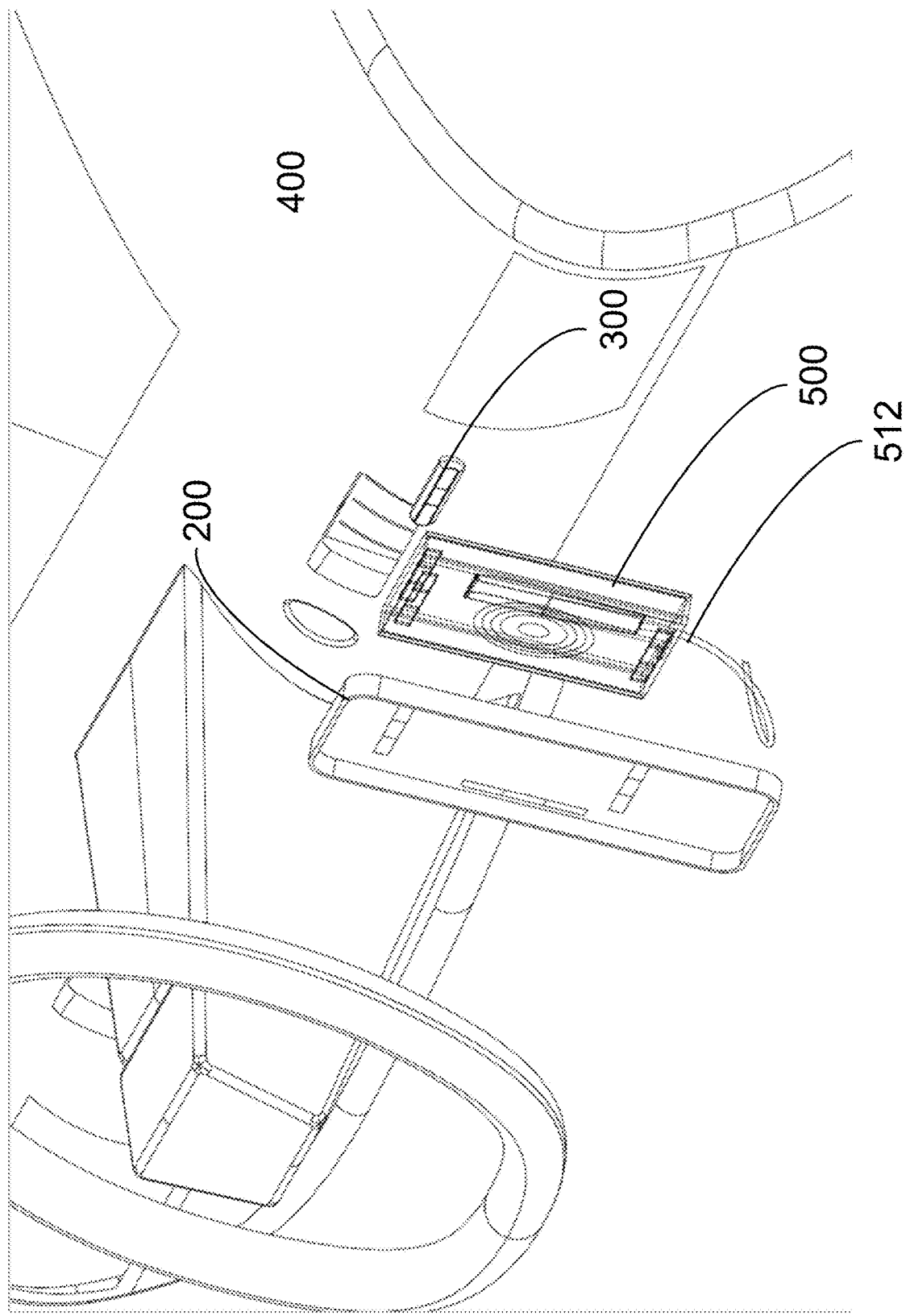
FIG. 22 is an exploded, perspective view of an electronic display device case, a charging device, and a magnetic surface-side attachment attached to a vehicle dash, according to an embodiment.

FIG. 22 is an exploded, perspective view of an electronic display device case 200, a charging device 500, and a magnetic surface-side attachment 300 attached to a vehicle dashboard 400, according to an embodiment. Charging device 500 is magnetically coupled to the back side of electronic display device case 200 and wirelessly charges electronic display device 250. Power cable 512 is attached to power port 511. In embodiments, power cable 512 electrically couples charging device 500 to a power source. In embodiments, power cable 512 electrically couples charging device 500 to an electronic display device 250. The concentric circles shown on charging device 500 represents a wireless charging pad, according to some embodiments.

Figure 23:
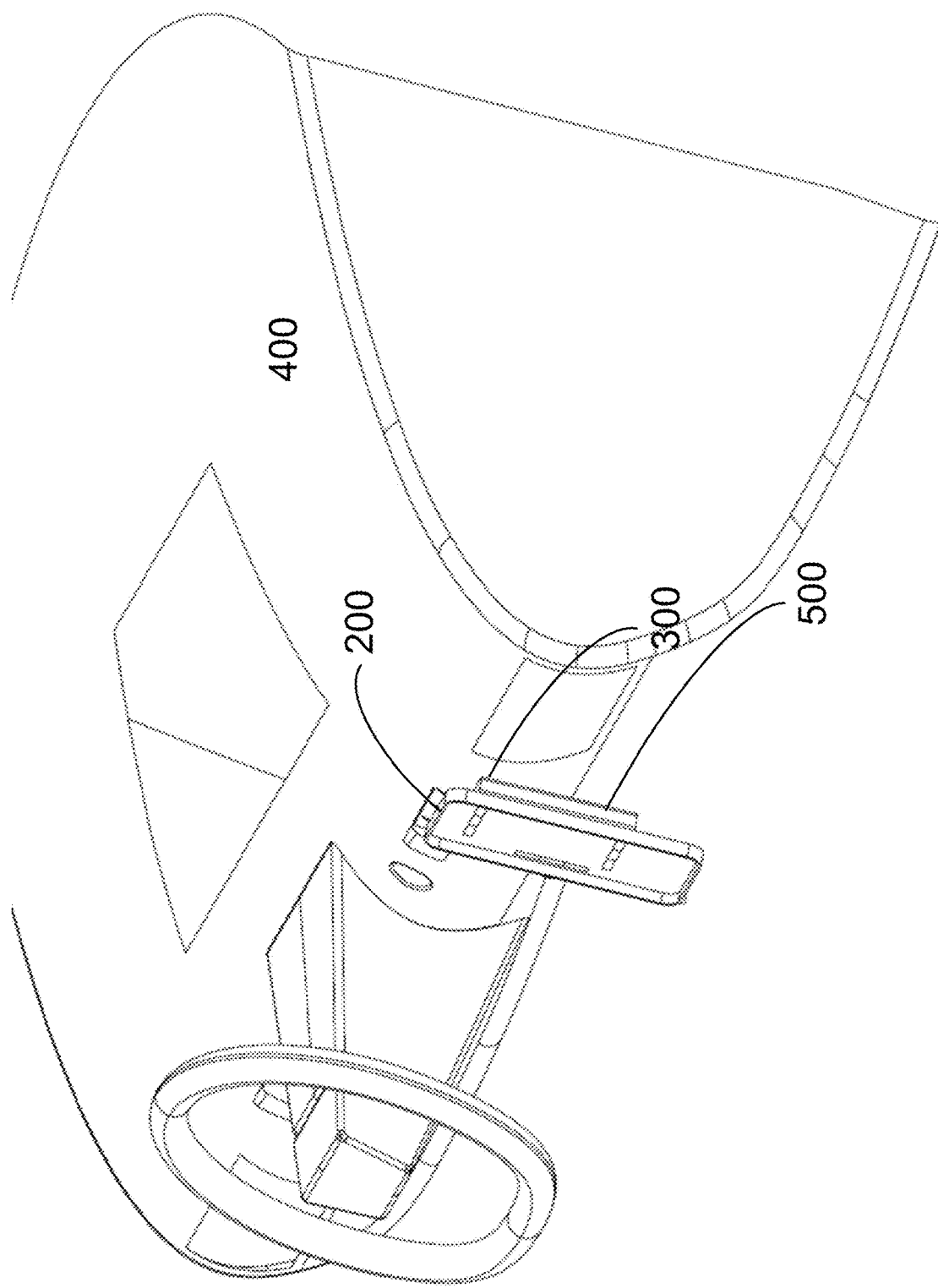
FIG. 23 is a perspective view of an electronic display device case, a charging device, and a magnetic surface-side attachment attached to a vehicle dash, according to an embodiment.

FIG. 23 is a perspective view of a charging device 500 interposed between an electronic display device case 200 and a magnetic surface-side attachment 300 that is affixed to a vehicle dashboard 400, according to an embodiment. It should be noted and appreciated that one or more charging devices 500 and/or wallets can be interposed between an electronic display device case 200 and a magnetic surface-side attachment 300. In this manner, multiple devices can be stacked one on top of each other.

Figure 24:
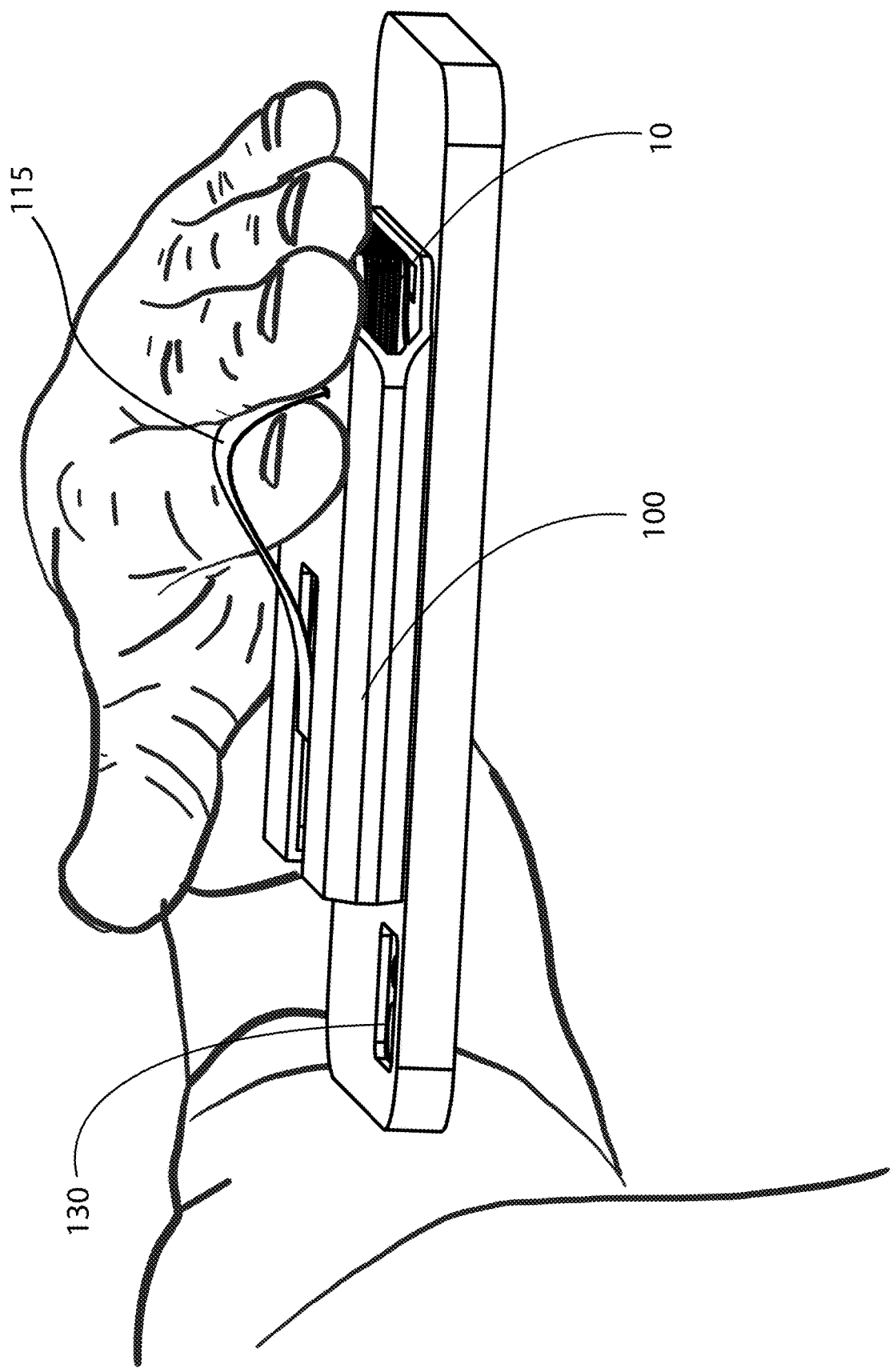
FIG. 24 is a view of a user holding a wallet using the loop, according to an embodiment.

FIG. 24 is a view of a user holding a wallet 100 using the loop 115, according to an embodiment. Wallet 100 contains a plurality of credit cards 10 and is magnetically attracted to one or more device-side attachments directly adhered to an electronic display device 250. In this embodiment, no electronic display case is used.

FIGS. 25-28 are perspective views of a wallet 100 functioning as a kickstand to prop up electronic display device case 200, according to embodiments. The front-side top magnets 129 are attracted and coupled to electronic display device case magnets 210, however, front-side bottom magnets 128 are positioned a distance apart from the electronic display device case 200. In this manner, the wallet 100 form an upside down "V" shape with the electronic display device case 200 and functions as a kickstand. The friction between the bottom of electronic display device case 200 and a horizontal surface, and the bottom portion 160 of wallet 100 and a horizontal surface help retain the kickstand configuration. Charging device 500 has similar functionality to wallet 100 and can function as a kickstand. In some embodiments, charging device 500 is a battery pack and functions as a kickstand.

Figure 25:
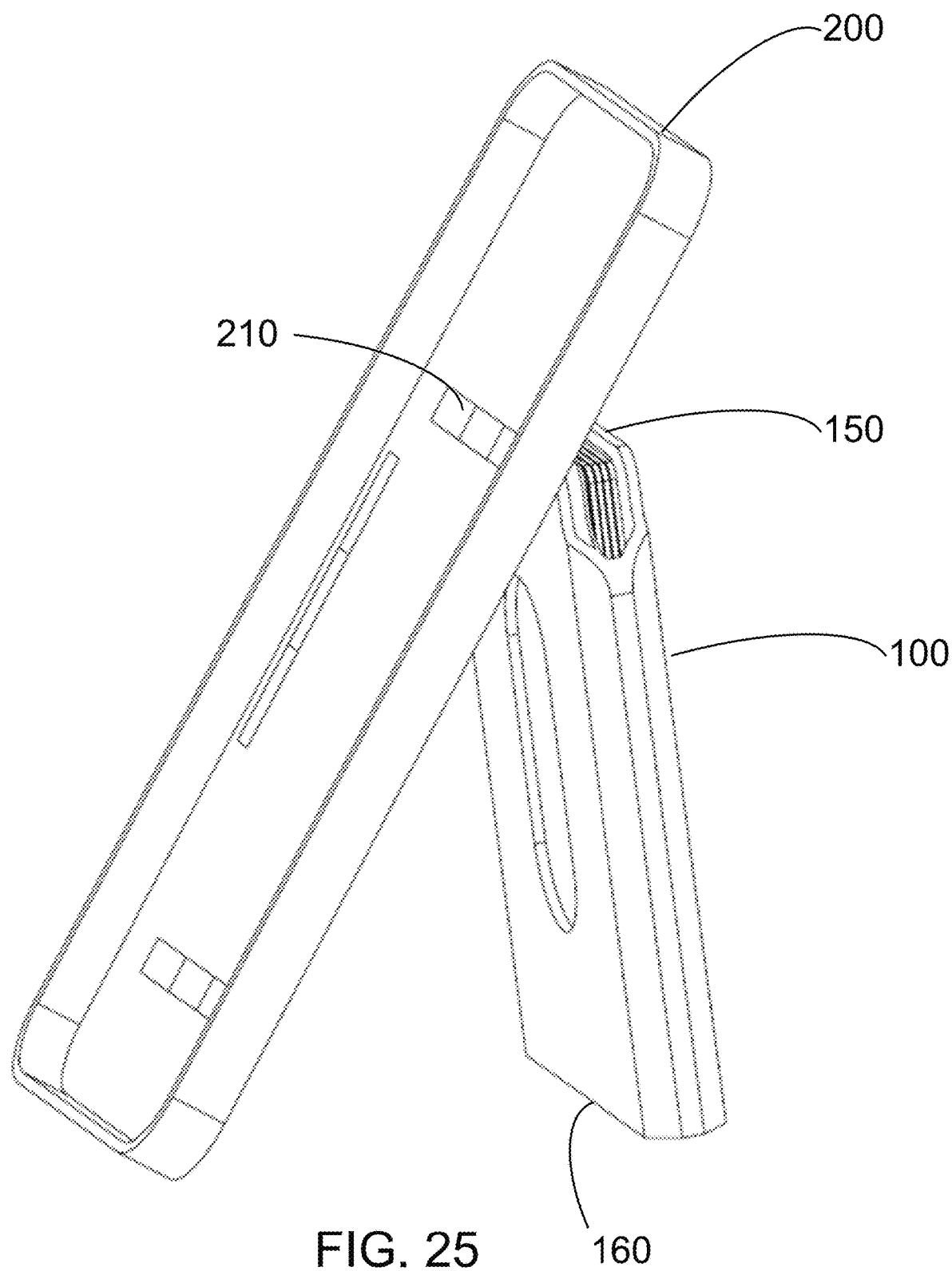
FIGS. 25-28 are perspective views of a wallet functioning as a kickstand, according to embodiments.
Figure 26:
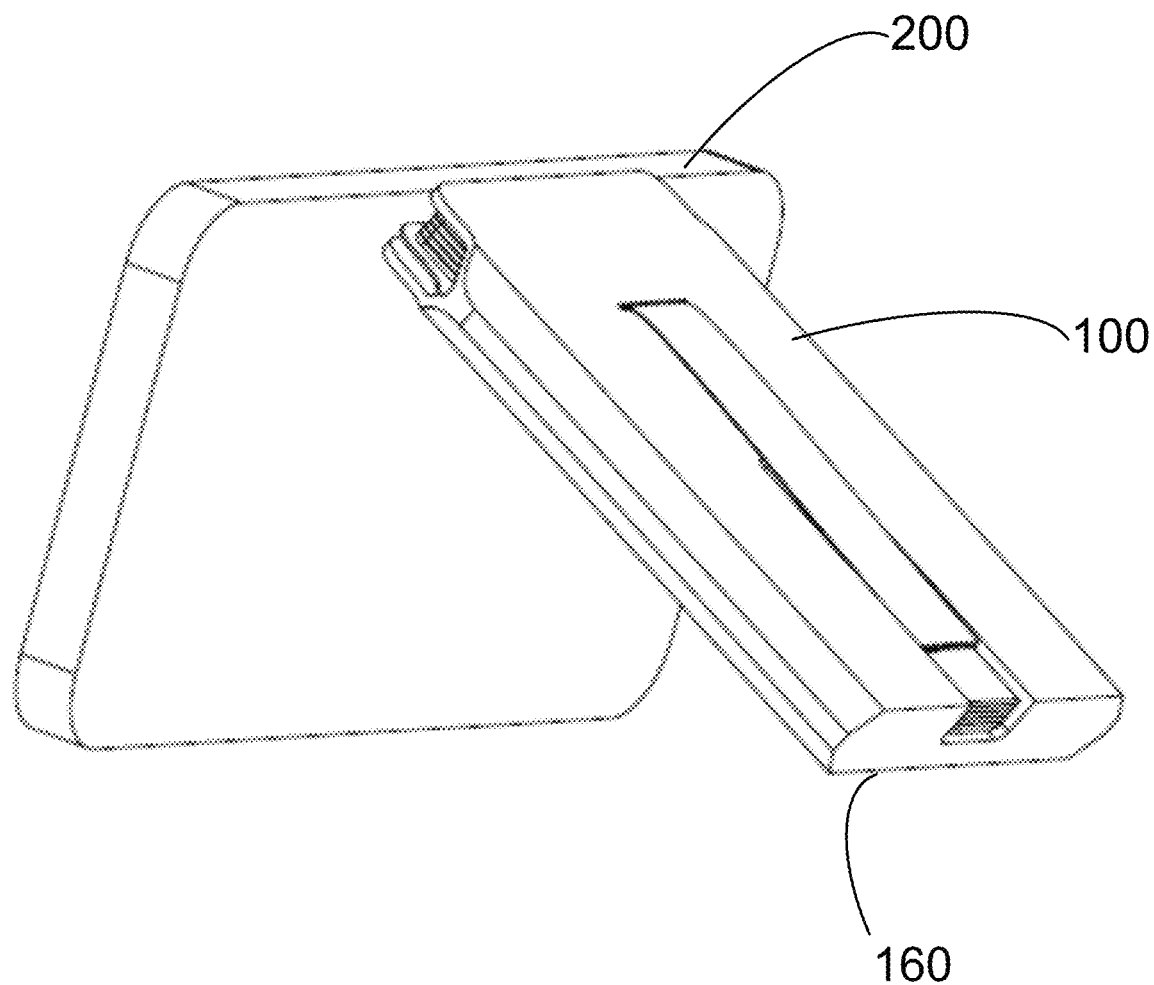
Figure 27:
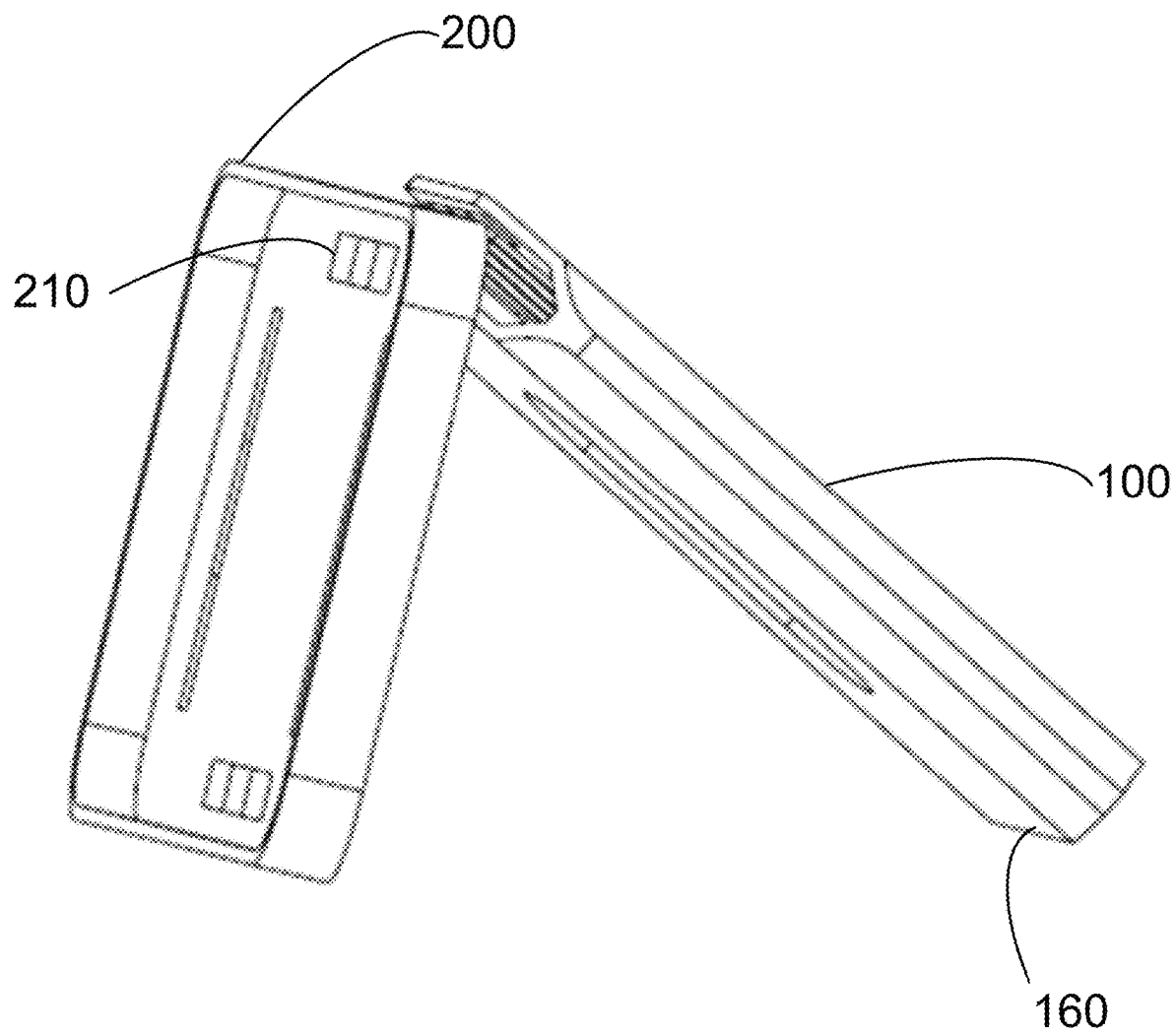
Figure 28:
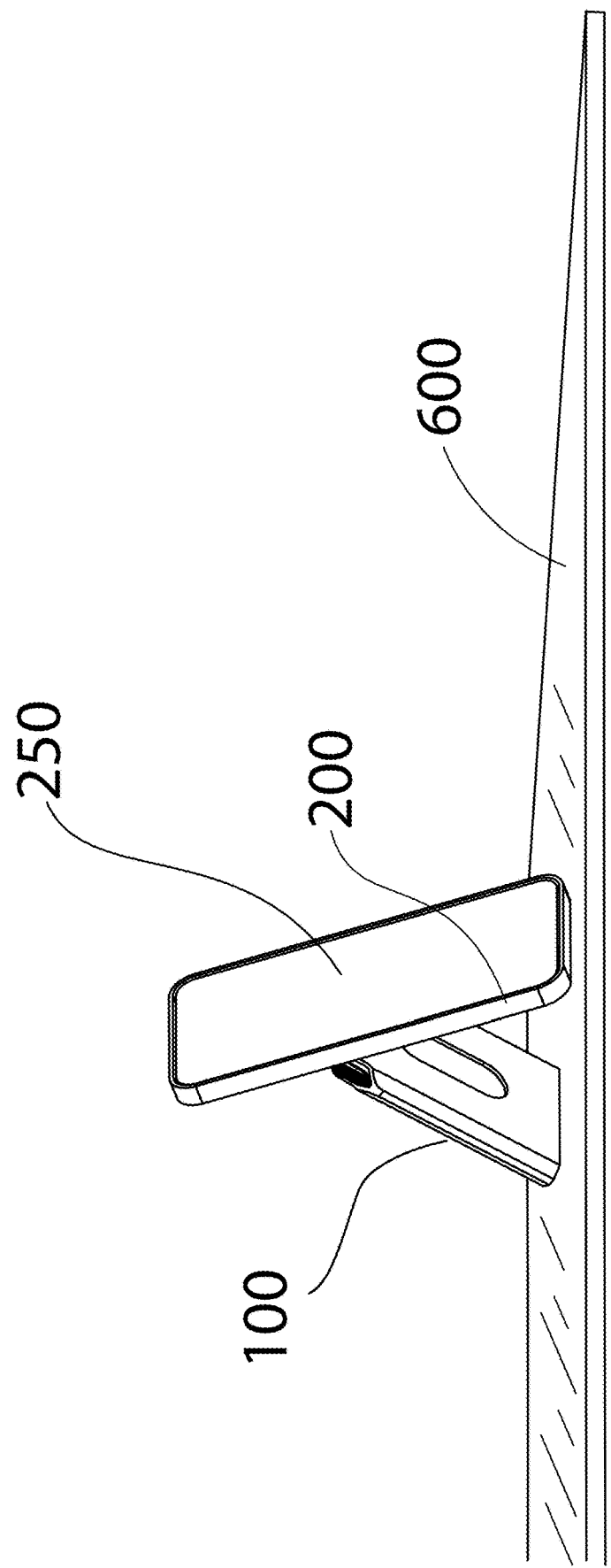
Figure 29:
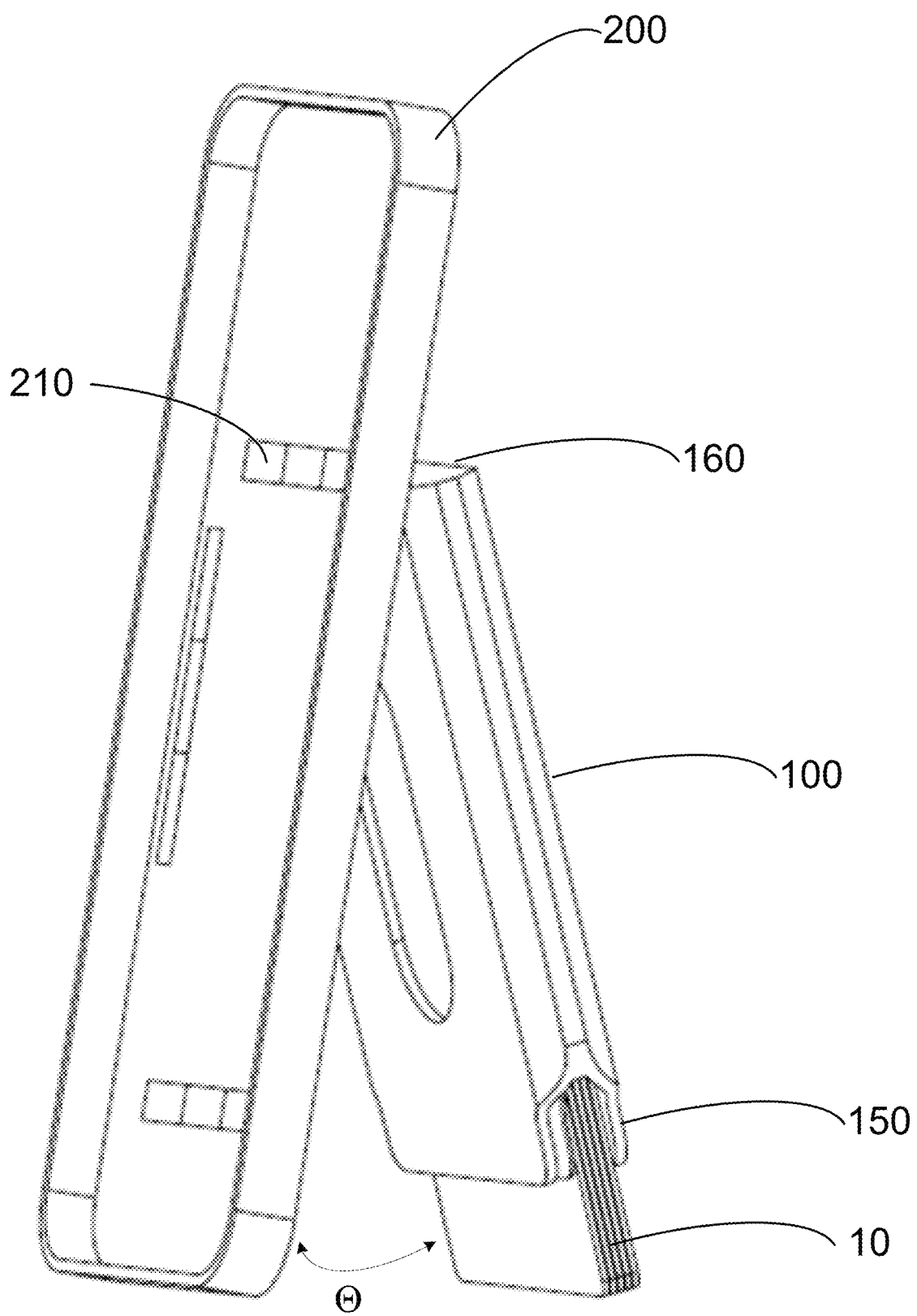
FIGS. 29-32 are perspective views of a wallet functioning as an adjustable kickstand, according to embodiments.
Figure 30:
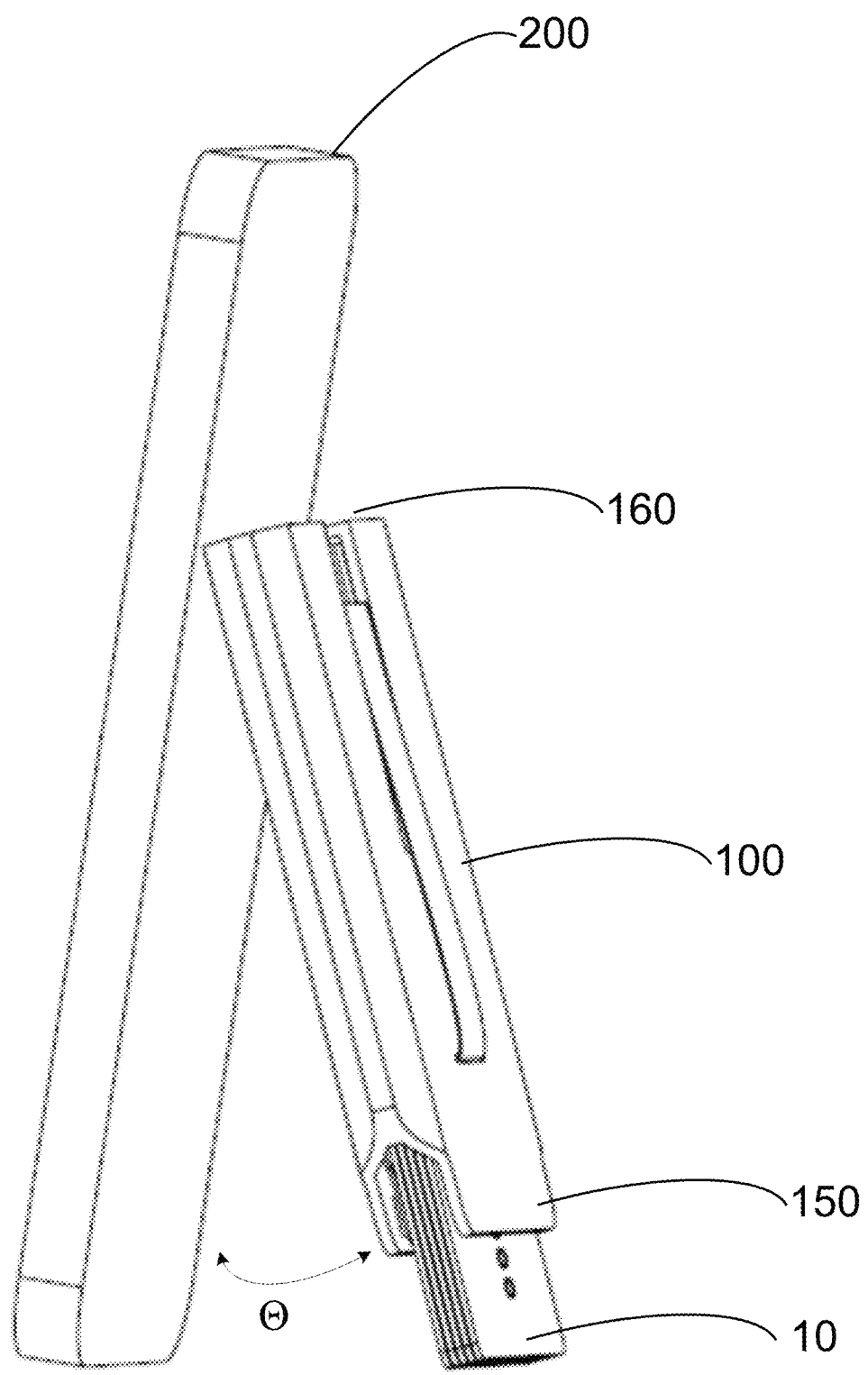
Figure 31:
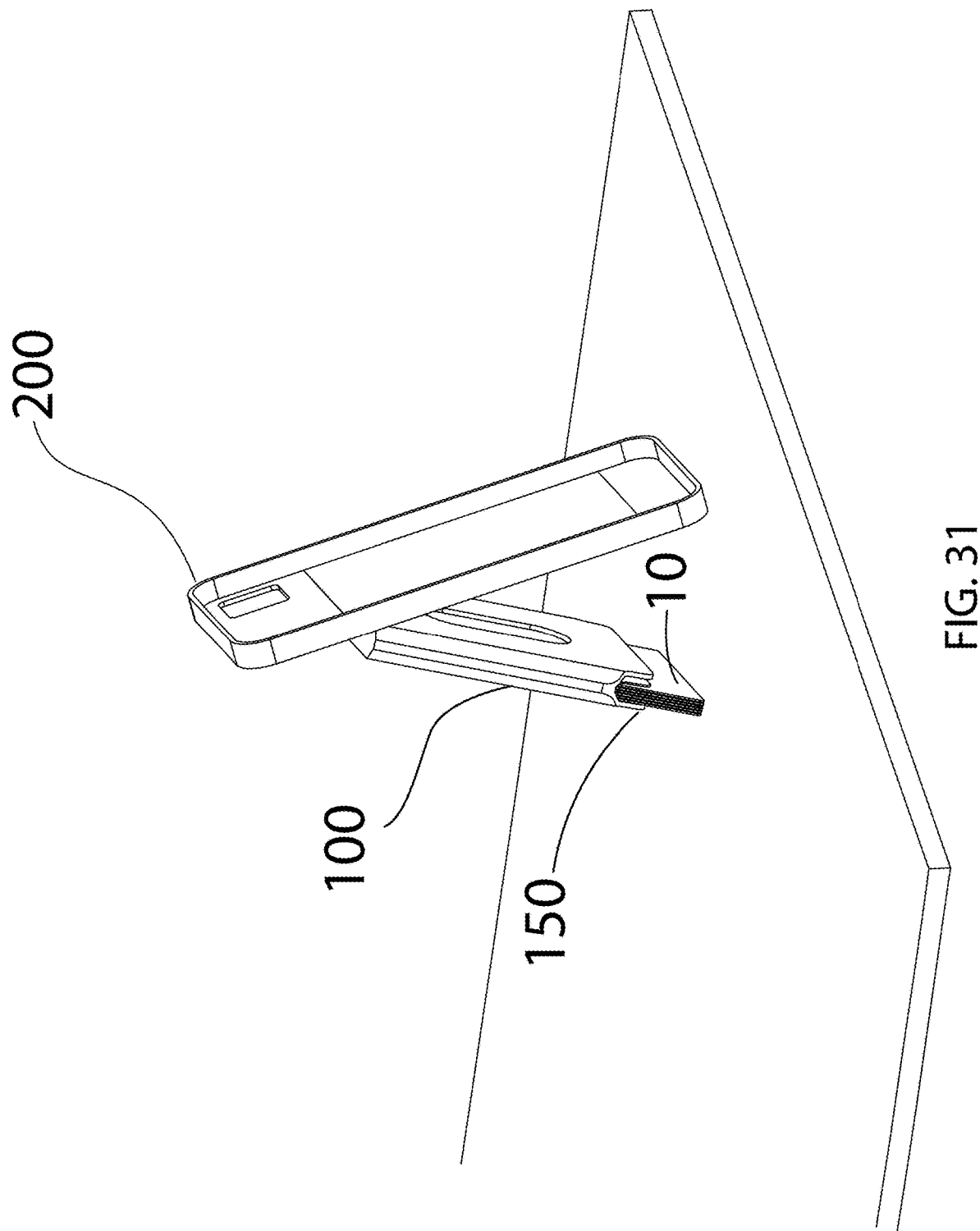
Figure 32:
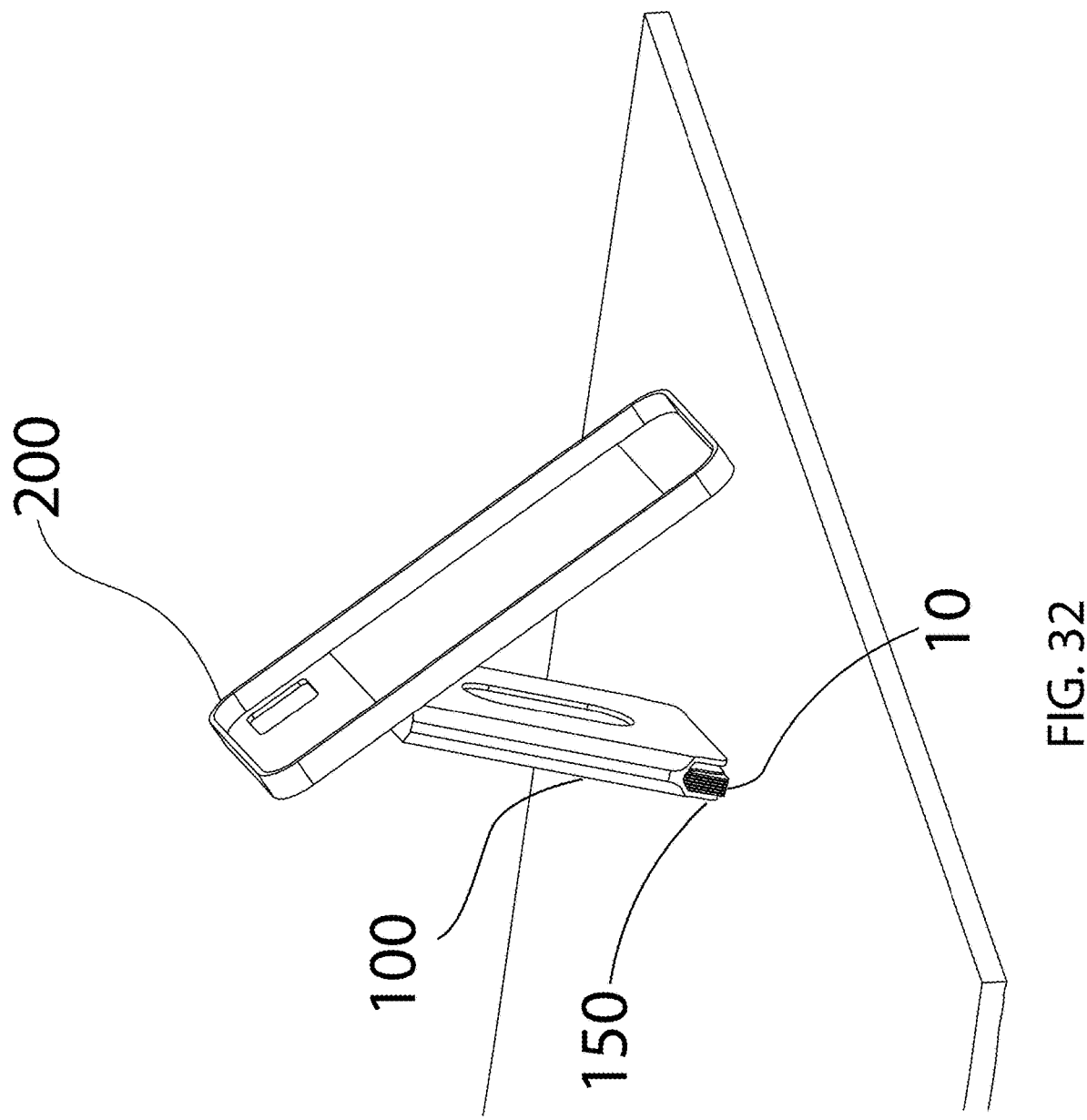

In FIG. 25, an electronic display device case 200 is in a portrait configuration. In FIGS. 26 and 27, an electronic display device case 200 is in a landscape configuration. FIG. 28 is a picture of an electronic display device case 200 is in a portrait configuration on a horizontal surface 600.

FIGS. 29-32 are perspective views of a wallet 100 functioning as an adjustable kickstand to prop up electronic display device case 200, according to embodiments, according to embodiments. In these embodiments, the wallet 100 is inverted such that a bottom portion 160 of wallet 100 is attracted and coupled to electronic display device case magnets (device-side attachments) 210. A plurality of credit cards 10 can be extended through a top portion 150 of wallet 100 to adjust an angle Θ to position electronic display device case 200 in closer to a vertical orientation. The top portion 150 of wallet 100 has sufficient friction to grip a plurality of credit cards 10 and hold them in a partially extended position.

An electronic display device 250 can include a plurality of electric display case magnets (device-side attachments) 210 coupled to the electronic display device case 200 or directly to the electronic display device without using a protective case. The electronic display device 250 can be, for example, cellphone, a tablet computer, a smartphone, a television, or an LCD display. In some embodiments, the electronic display device 400 can be an Apple iPad or iPhone, an Android smartphone, or eBook reader.

Magnets for the surface-side attachment 300, wallet 100, charging device 500, electronic display device case magnets (device-side attachments) 210, and any other accessory configured to attach to these devices are preferably made out of rare earth metals including alloys of neodymium or samarium-cobalt. Rare earth magnets are selected based on their strongly magnetic properties that include a higher maximum energy product (related to magnetic flux per unit volume) than other types of magnets including ferrite and alnico magnets. Neodymium magnets of grade N48 and higher are preferred, and neodymium magnets of grade N52 and higher are more preferred.

Magnets can generally be uniform or different in shape, size, magnetic and/or other properties within surface-side attachment 300, wallet 100, charging device 500, electronic display device case magnets (device-side attachments) 210, and any other accessory configured to attach to these devices. While these magnets can be somewhat different in shape, size, magnetic and/or other properties, it is preferred that when mounted, each magnet is uniform in shape, size, magnetic and/or other properties to its complementary magnet.

The magnets for the surface-side attachment 300, wallet 100, charging device 500, electronic display device case magnets (device-side attachments) 210, and any other accessory configured to attach to these device are arranged to be self-aligning during mounting. The magnets are arranged so that when the attachments are coupled together during mounting, at least one magnet with an outwardly-facing north pole is attracted to a corresponding magnet with an outwardly-facing south pole, and vice versa.

Figure 33:
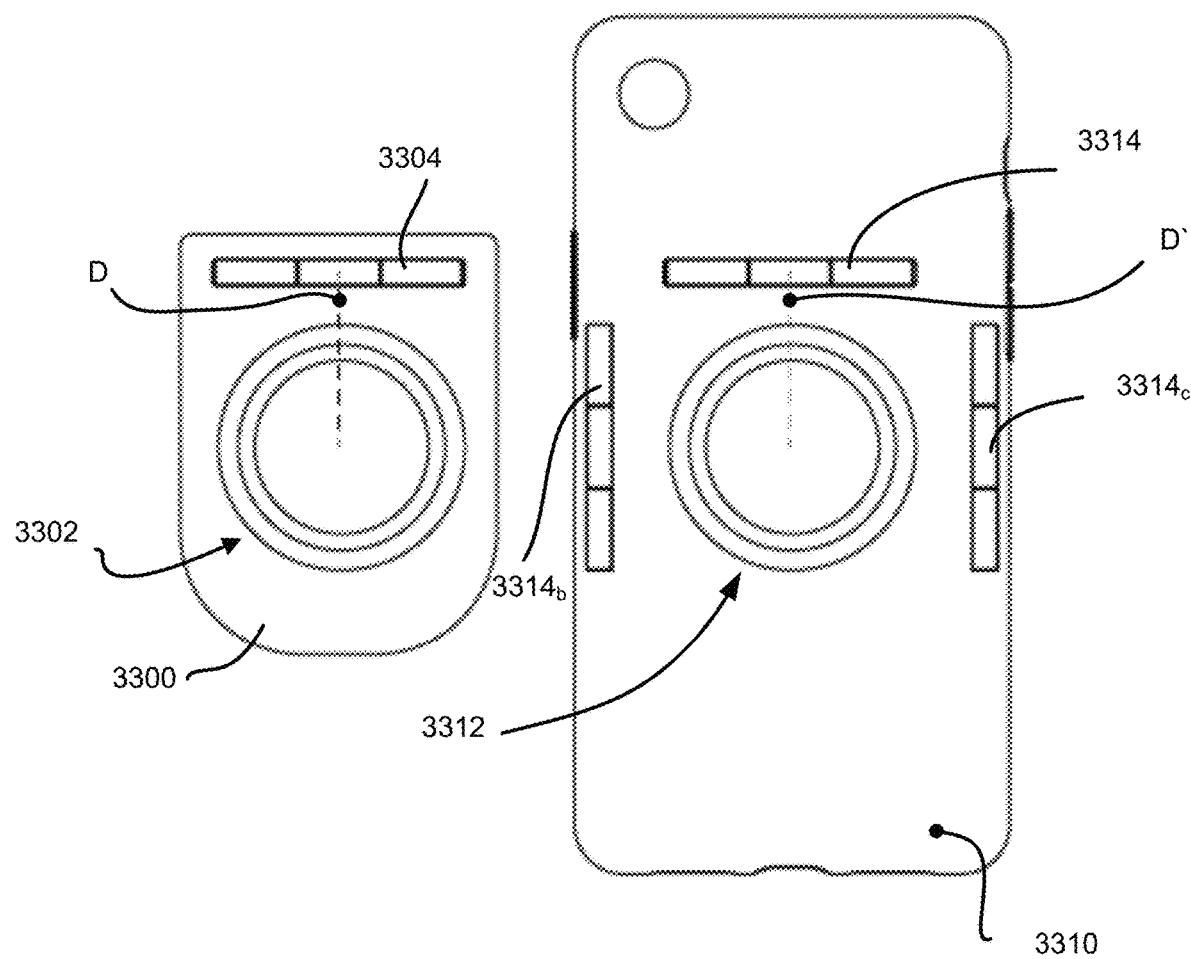
FIGS. 33 and 34 are partially transparent rear views of a battery pack with wireless charging and a protective cover for an electronic device.
Figure 34:
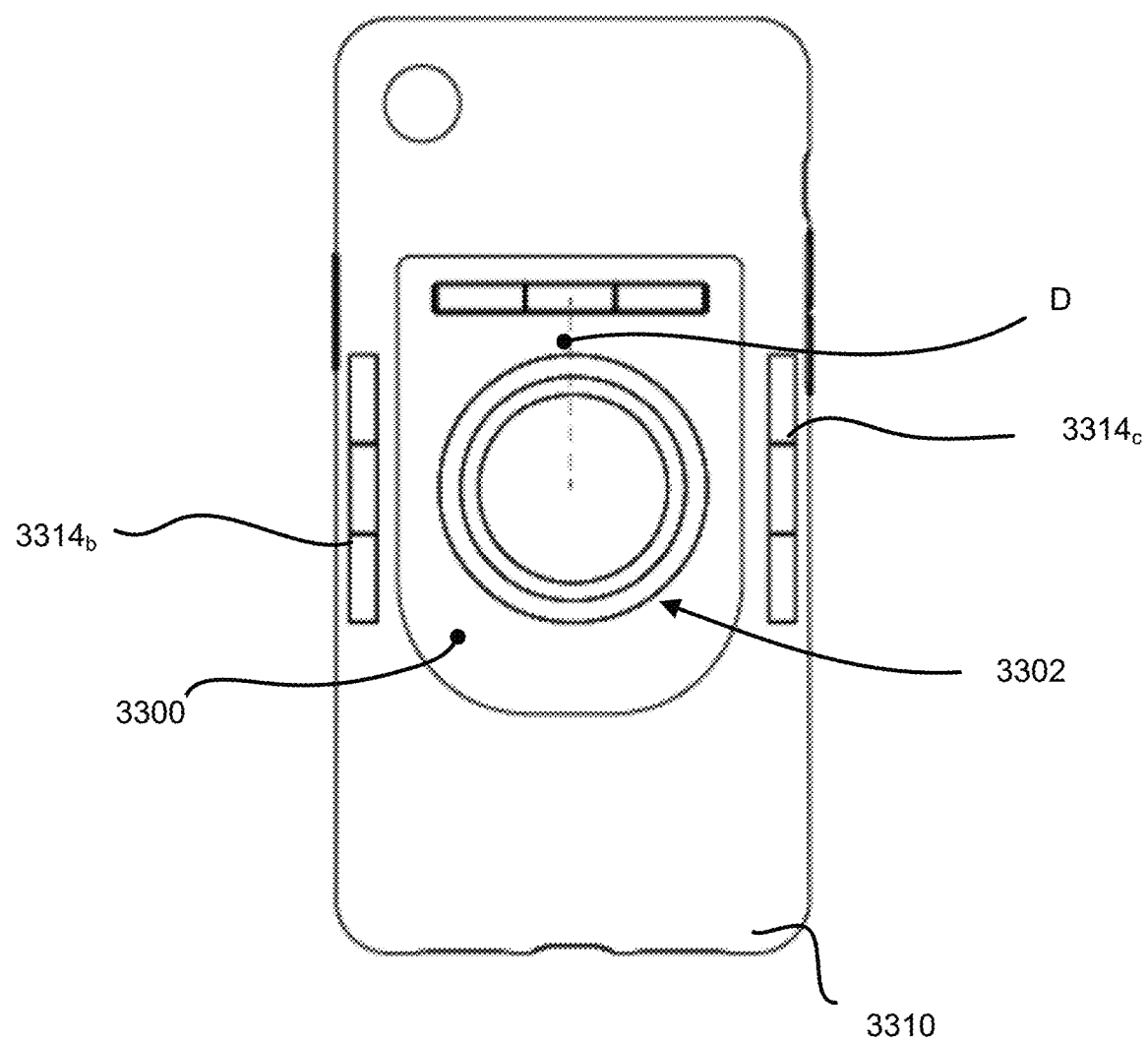

Attention is now directed to FIGS. 33 and 34, which are partially transparent rear views of a battery pack with wireless charging 3300 and a protective cover 3310 for an electronic device. In FIG. 33, the battery pack with wireless charging 3300 is separated from the protective cover 3310. In FIG. 34, the battery pack with wireless charging 3300 is magnetically-coupled to the protective cover 3310 in a portrait mode configuration. For purposes of clarity, only coils 3312 of an electronic device disposed within the protective cover 3310 are illustrated in FIG. 33. The battery pack with wireless charging 3300 can have a configuration similar to wallet 100 meaning that it can have similar physical dimensions as well as similar placement of magnets.

As may be appreciated from FIG. 33, the coils 3302 and magnets 3304 of the battery pack with wireless charging 3300 are preferably configured to mirror the arrangement of the coils 3312 of the electronic device and the magnets 3314 of the protective cover 3310. Specifically, note that a distance D between the coils 3302 and the magnets 3304 of the battery pack with wireless charging 3300 is substantially identical to a distance D' between the coils 3312 of the electronic device and the magnets 3314a of the protective cover 3310 (when the electronic device is disposed within the protective cover 3310). As a consequence, when the battery pack with wireless charging 3300 becomes connected to the protective cover 3310 (FIG. 34), its coils 3302 align with the coils 3312 of the electronic device so that energy may be transmitted through the protective cover 3310 and into the electronic device to recharge its battery.

Figure 36:
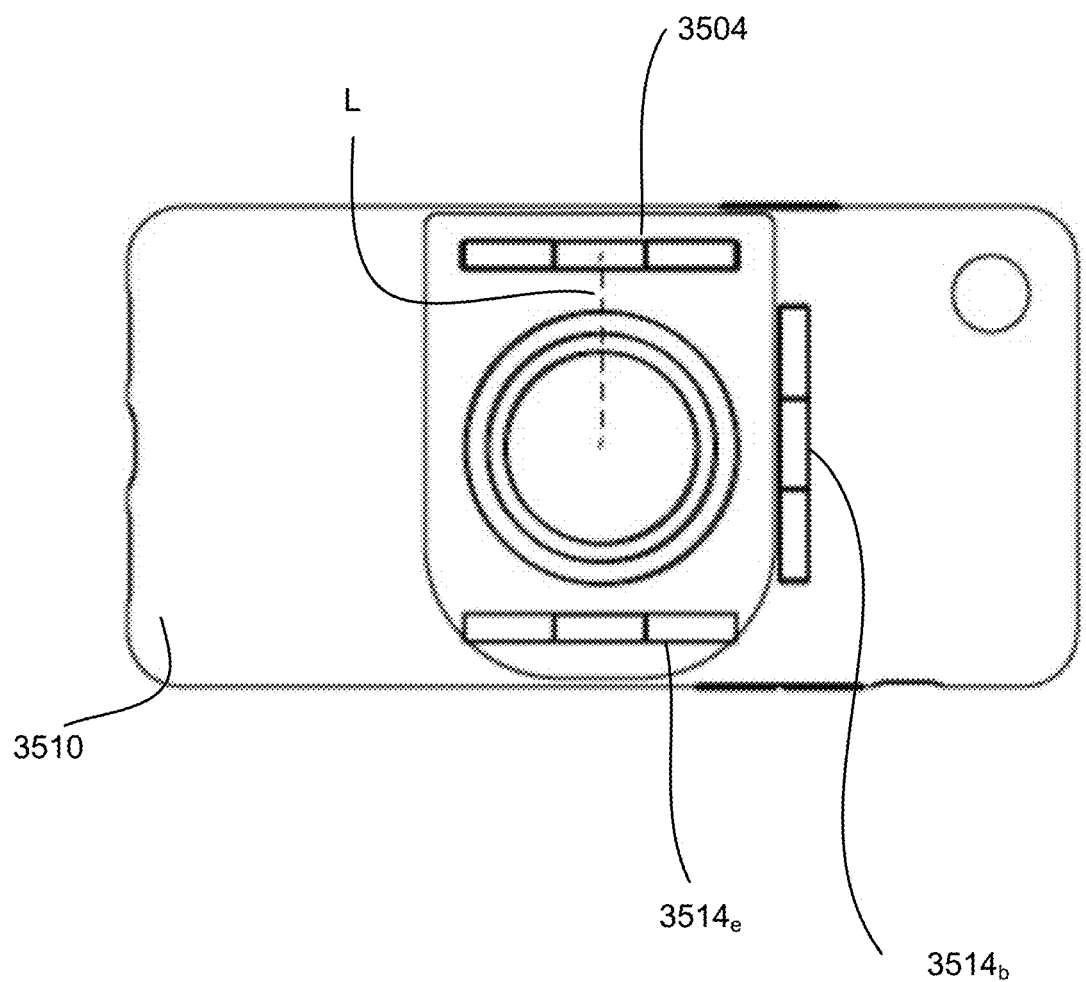

Attention is now directed to FIGS. 35 and 36, which are partially transparent rear views of a battery pack with wireless charging 3500 and a protective cover 3510 for an electronic device. In FIG. 35, the battery pack with wireless charging 3500 is separated from the protective cover 3510. In FIG. 36, the battery pack with wireless charging 3500 is magnetically-coupled to the protective cover 3510 in a landscape mode configuration. For purposes of clarity, only coils 3512 of an electronic device disposed within the protective cover 3510 are illustrated in FIG. 35.

As may be appreciated from FIG. 35, the coils 3502 and magnets 3504 of the battery pack with wireless charging 3500 are preferably configured to mirror the arrangement of the coils 3512 of the electronic device and the magnets 3514 of the protective cover 3510. Specifically, note that a distance L between the coils 3502 and the magnets 3504 of the battery pack with wireless charging 3500 is substantially identical to a distance L' between the coils 3512 of the electronic device and the magnets 3514a of the protective cover 3510 (when the electronic device is disposed within the protective cover 3510). As a consequence, when the battery pack with wireless charging 3500 becomes connected to the protective cover 3510 (FIG. 36), its coils 3502 align with the coils 3512 of the electronic device so that energy may be transmitted through the protective cover 3510 and into the electronic device to recharge its battery.

In one embodiment the battery pack with wireless charging 3500 is implemented as a unitary device. In other embodiments a battery pack may be substituted for the battery pack with wireless charging 3500. In this case the battery pack would be connected by a cable or the like to the electronic device. In still other embodiments the battery pack with wireless charging 3500 may be implemented as a battery pack mechanically or magnetically coupled to a wireless charger.

Figure 37:
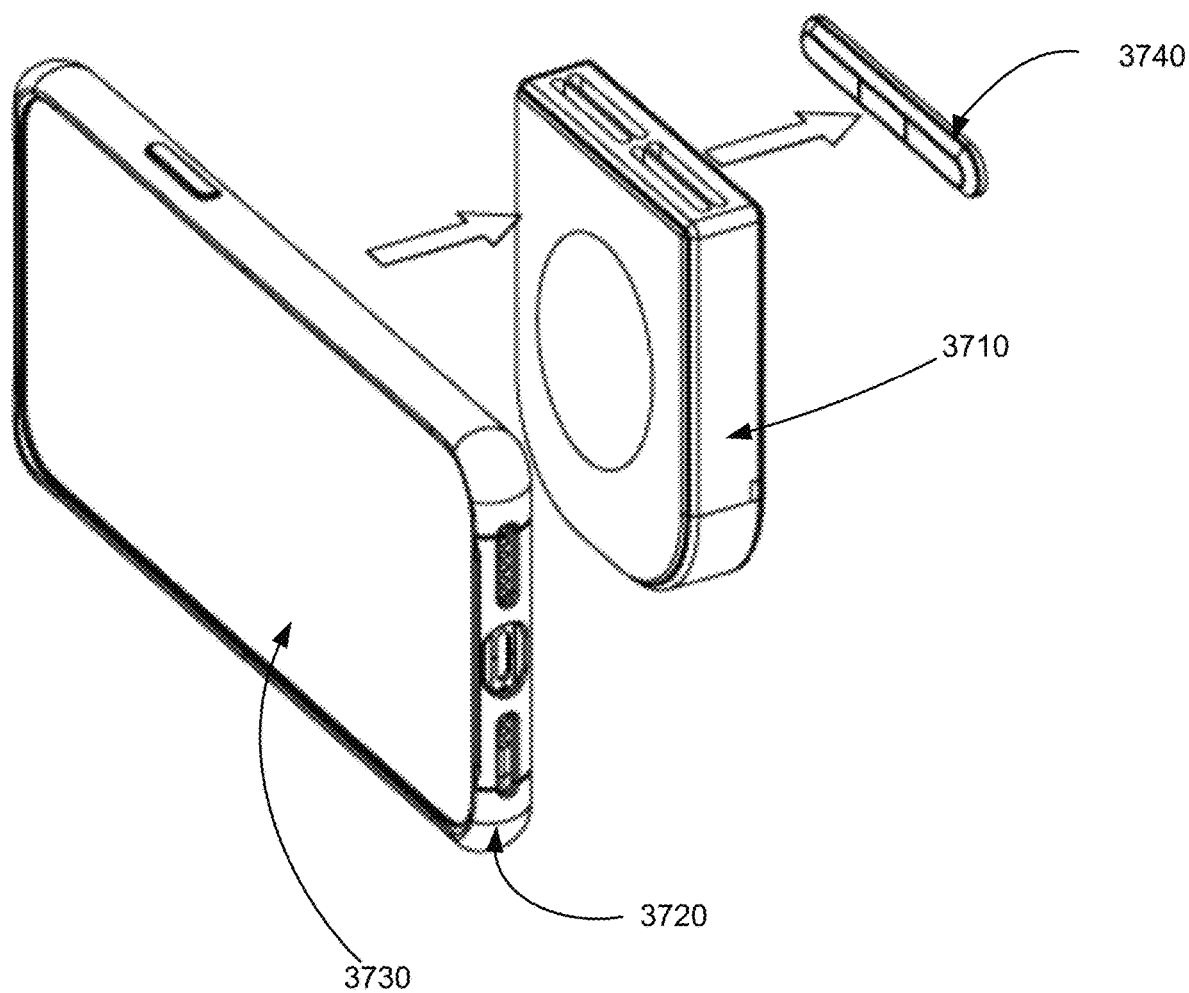
FIGS. 37 and 38 are perspective views of a charging device interposed between a protective case for a mobile device and a surface-side attachment, according to an embodiment.
Figure 38:
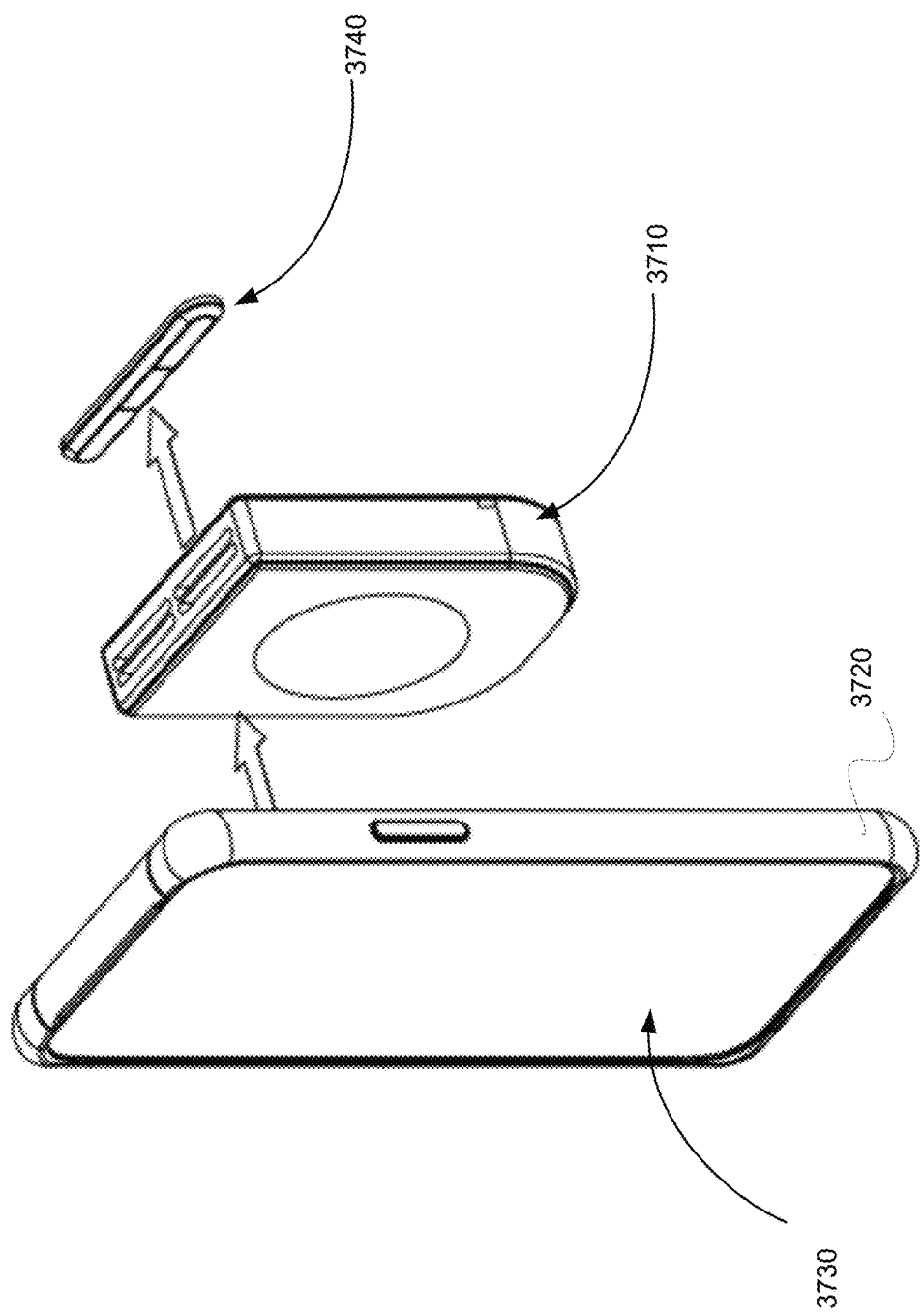

FIGS. 37 and 38 are perspective views of a charging device 3710 interposed between a protective case 3720 for a mobile device 3730 and a surface-side attachment 3740, according to an embodiment. In the embodiment of FIGS. 37 and 38, the charging device is coupled magnetically to the protective case 3720 and to the surface-side attachment 3740 using arrangements of alternating polarity magnets of the type disclosed herein. As shown, in the embodiment of FIG. 37 the charging device 3710 is arranged in a landscape orientation relative to a direction of the surface-side attachment 3740. In the embodiment of FIG. 38, the charging device 3710 is arranged in a portrait orientation relative to a direction of the surface-side attachment 3740.

Figure 39:
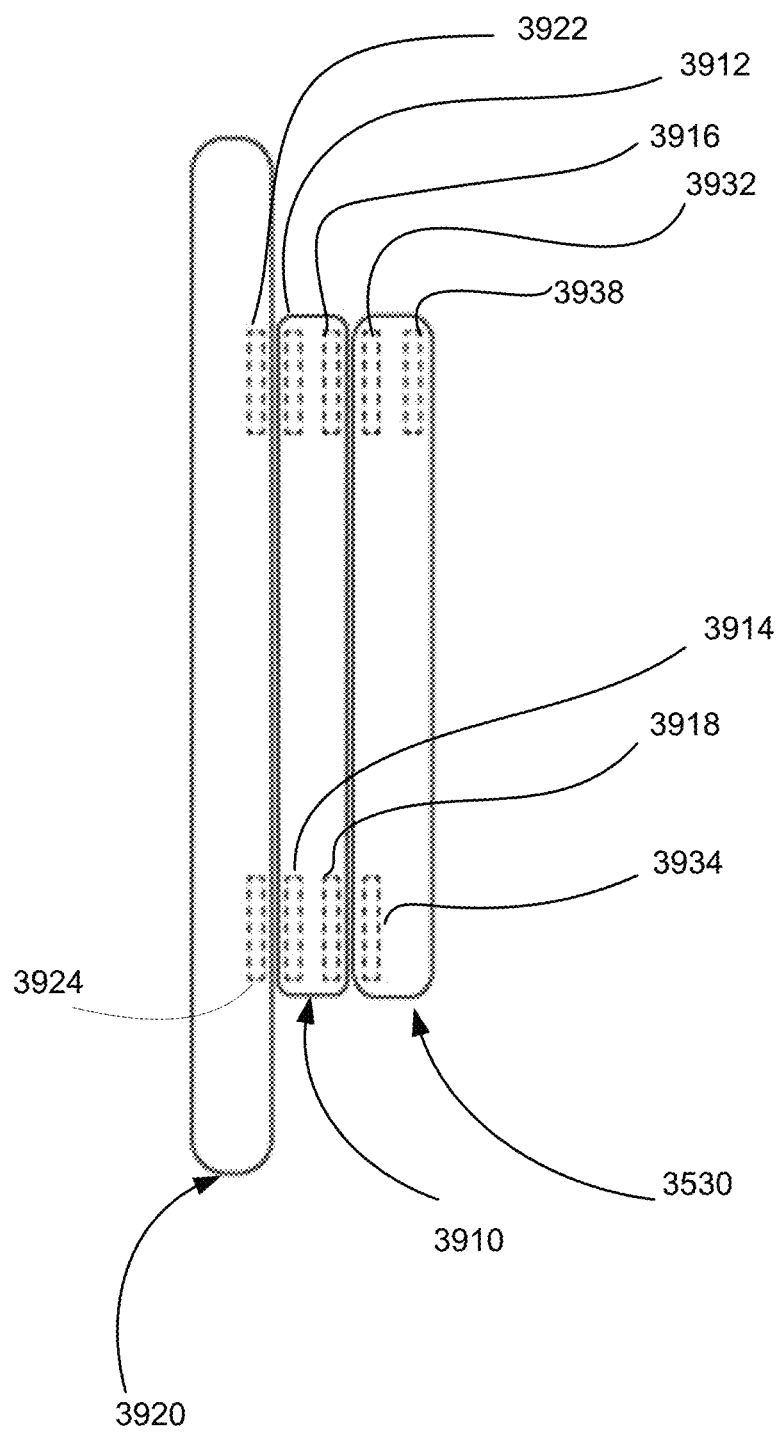
FIG. 39 is a side view of a stacked arrangement of magnetically-coupled accessories for a mobile device, according to an embodiment.

FIG. 39 is a side view of a stacked arrangement of magnetically-coupled accessories for a mobile device, according to an embodiment. In the embodiment of FIG. 39 a first accessory device 3910 includes first set of magnets of alternating polarity 3912 positioned proximate the top of a front surface of the device 3910 and a second set of magnets of alternating polarity 3914 positioned proximate the bottom of the front surface of the device 3910. The first accessory device 3910 also includes third set of magnets of alternating polarity 3916 positioned proximate the top of a back surface of the device 3910 and a fourth set of magnets of alternating polarity 3918 positioned proximate the bottom of the back surface of the device 3910. The first set of magnets of alternating polarity 3912 are magnetically coupled to a fifth set of magnets of alternating polarity 3922 positioned on or within a protective case 3920 for a mobile device. The second set of magnets of alternating polarity 3914 are magnetically coupled to a sixth set of magnets of alternating polarity 3924 positioned on or within the protective case 3920. In other embodiments the fifth set of magnets of alternating polarity 3922 and the sixth set of magnets of alternating polarity 3924 are embedded within or attached to a mobile device. The first accessory device 3910 may comprise, for example, a battery pack with a wireless charger.

The third set of magnets of alternating polarity 3916 are magnetically coupled to a seventh set of magnets of alternating polarity 3932 positioned on or within a top front portion of a second accessory device 3930. The fourth set of magnets of alternating polarity 3918 are magnetically coupled to an eighth set of magnets of alternating polarity 3934 positioned on or within a bottom front portion of the second accessory device 3930. In one embodiment the second accessory device 3930 may further include a ninth set of magnets of alternating polarity 3938, which may be coupled to, for example, an additional accessory device or a surface-side attachment including an additional plurality of magnets of alternating polarity. In one embodiment the second accessory device 3930 may comprise, for example, a magnetically-coupleable wallet defining a compartment of the type described herein.

By utilizing arrangements of pluralities of magnets of alternating polarity as described herein, the protective cover 3920, first accessory device 3910 and second accessory device 3930 may be automatically aligned upon being magnetically coupled to each other. In addition, the stack comprises of the protective cover 3920, first accessory device 3910 and second accessory device 3930 may be secured to ferrous metal surfaces or to other surfaces via use of a surface-side attachment including an additional set of magnets.

It should be understood that in other embodiments the first accessory device 3910 and the second accessory device 3930 may comprise various different magnetically-coupleable accessories for a mobile device. These accessories include, for example, magnetically-coupleable wallets, wireless chargers, battery packs, wireless chargers in combination with battery packs, kickstands, finger loops, and combinations of any of these. In general, these accessories may be configured in a stacked arrangement such as is shown in FIG. 39. However, in certain embodiments (e.g., in embodiments including a magnetically-coupleable kickstand) not all of the accessories will be arranged in a stack.

The following discussion with reference to FIGS. 40-48, describes various magnet arrangements which may be utilized within the systems for facilitating the attachment of add-on devices to mobile devices described with reference to FIGS. 1-39. See also U.S. Pat. No. 10,134,517, the content of which is incorporated by reference herein.

Figure 40A:
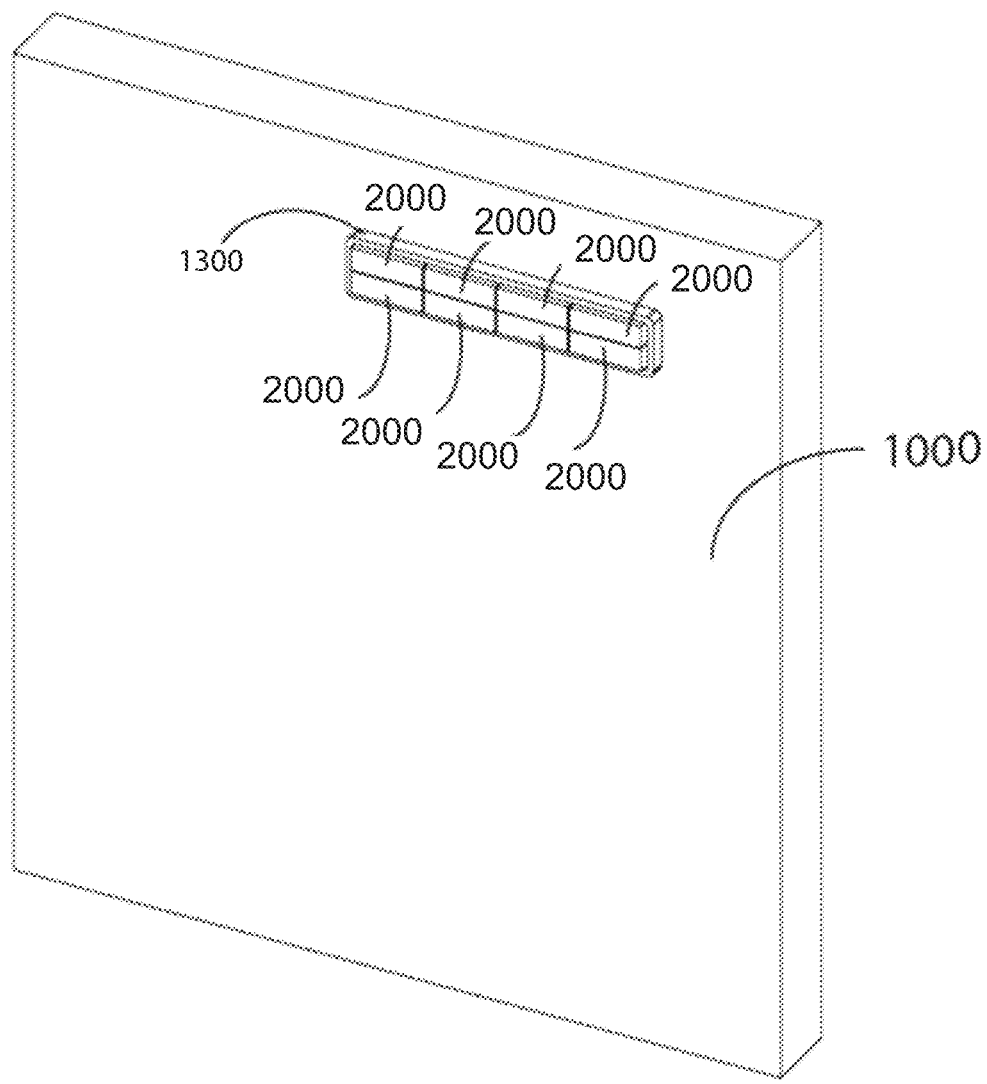
FIGS. 40A, 40C, and 40E are perspective views of a surface with a surface-side attachment, according to an embodiment.
Figure 40B:
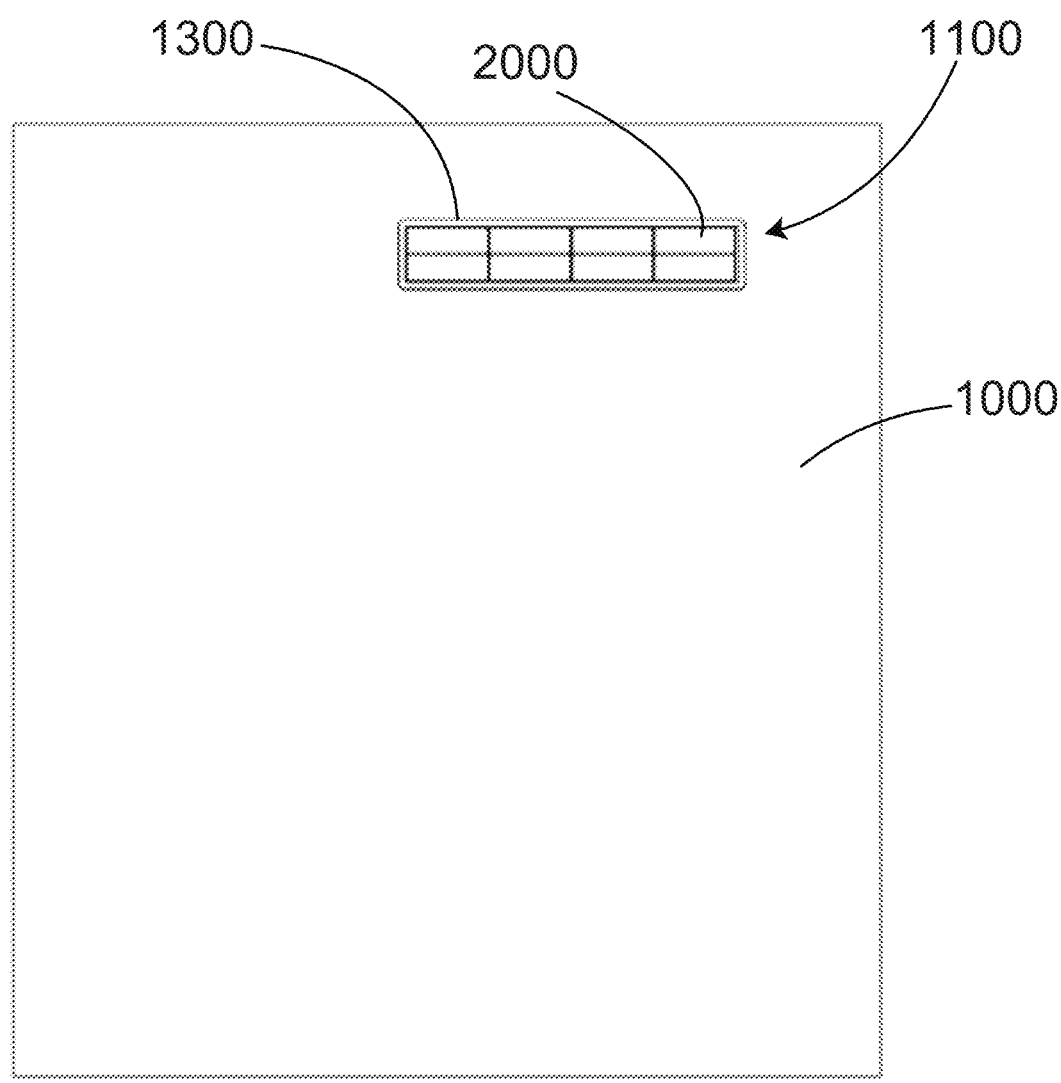
FIGS. 40B, 40D, and 40F show front views of a surface-side attachment.
Figure 40C:
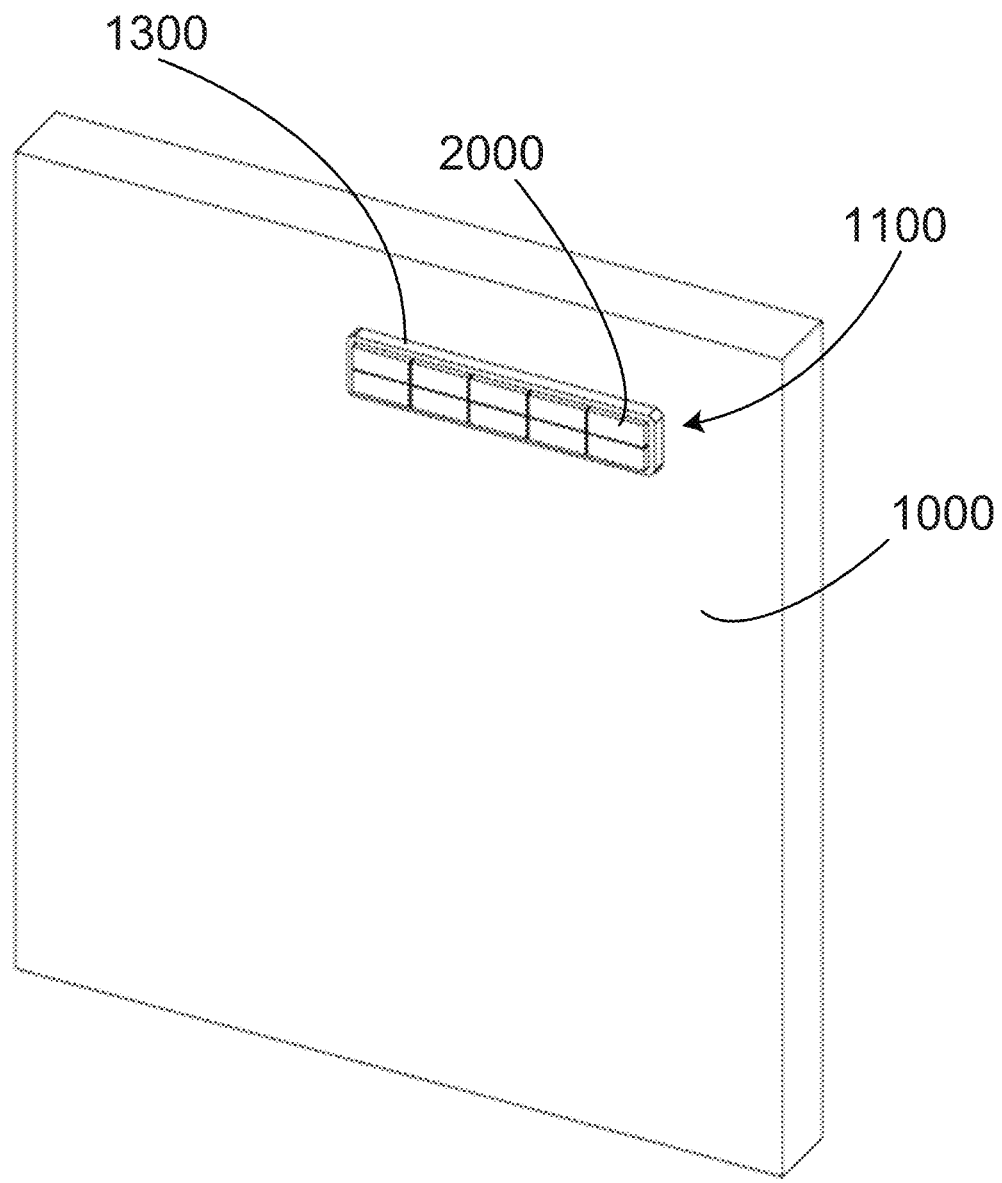
Figure 40D:
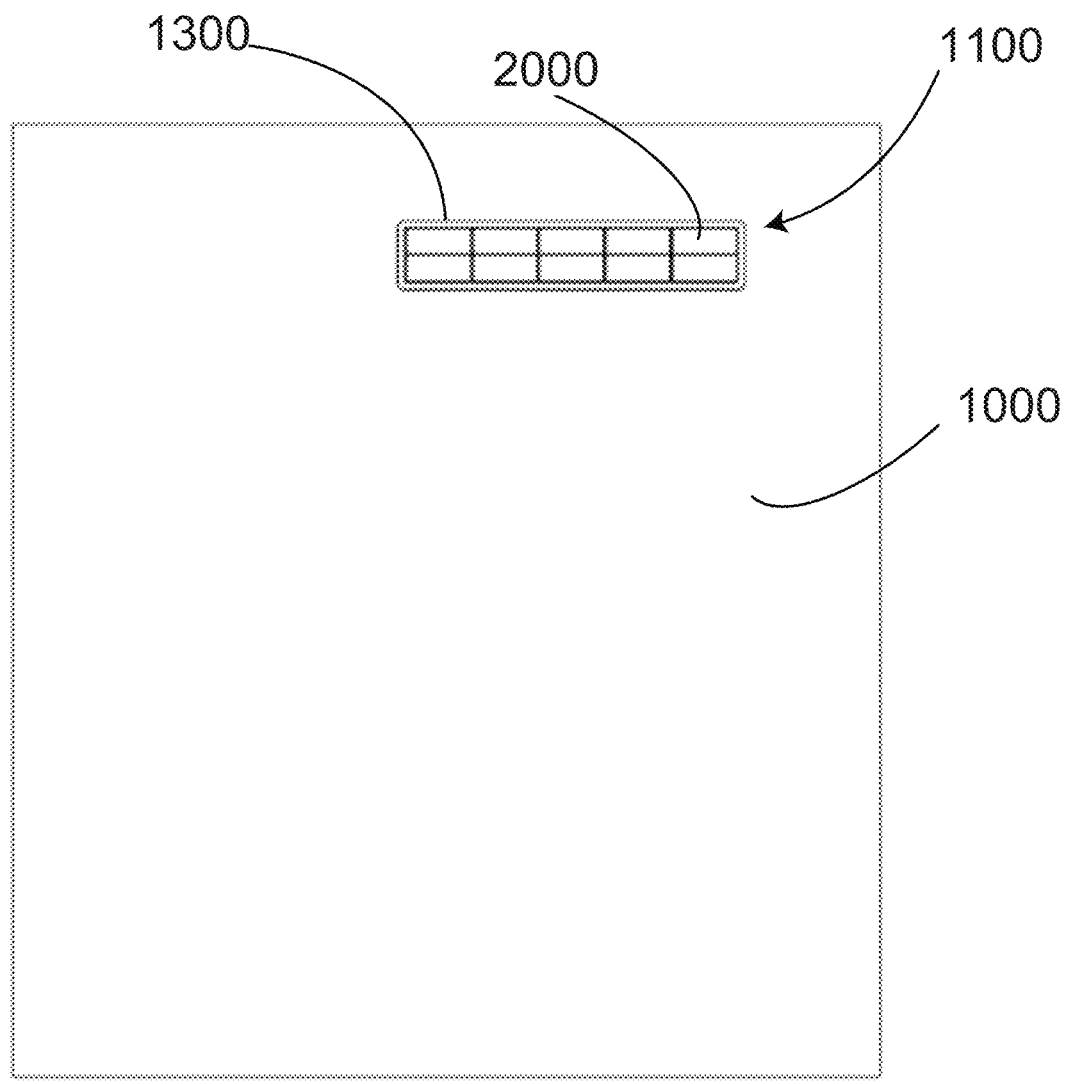
Figure 40E:
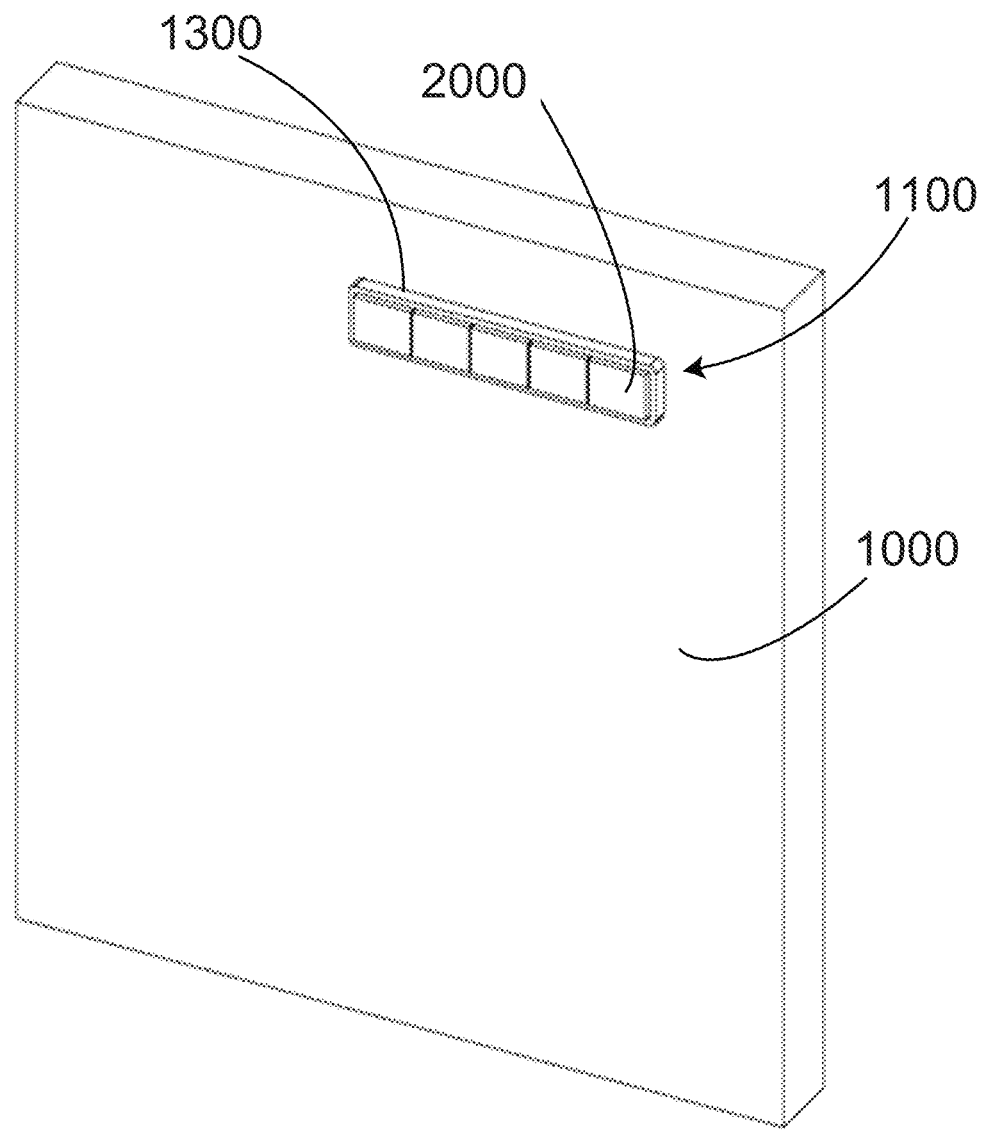
Figure 40F:
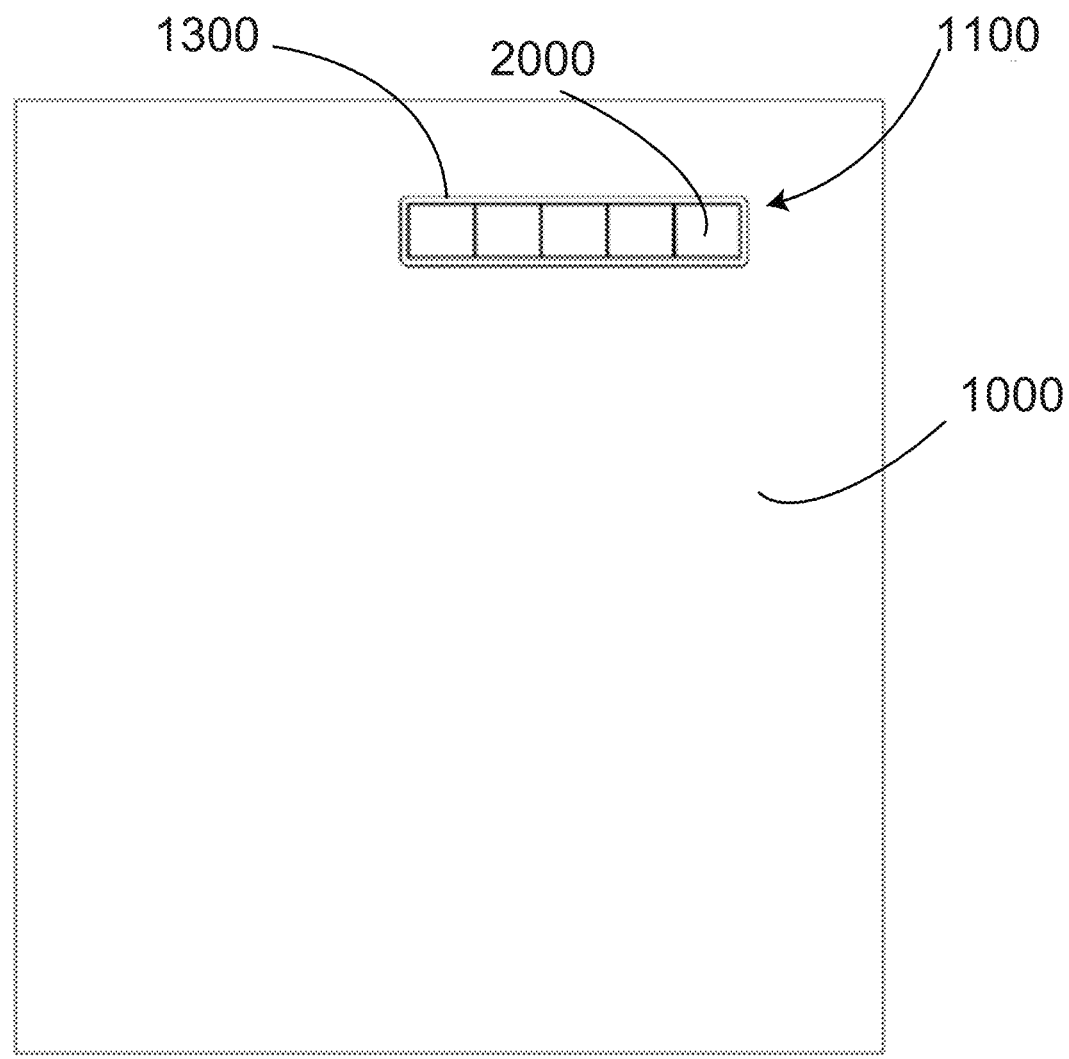

FIGS. 40A, 40C, and 40E are perspective views of a surface 1000 with a surface-side attachment 1100 according to an embodiment, and FIGS. 40B, 40D, and 40F show front views of the surface-side attachment 110. Surface-side attachment 1100 can include a surface-side attachment housing 1300 containing a plurality of magnets 2000. As shown in FIGS. 40A and 40B, the surface-side attachment 1100 can include two linear rows, with each linear row containing four individual magnets 2000. As shown in FIGS. 40C and 40D, the surface-side attachment 1100 can include two linear rows, with each linear row containing five individual magnets 2000. As shown in FIGS. 40E and 40F, the surface-side attachment 1100 can include a single linear row containing five individual magnets 2000. It should be recognized that any number of magnets greater than two can be used in surface-side attachment 110, and that FIGS. 40A to 40F are merely exemplary embodiments.

Surface-side attachment housing 1300 is preferably made out of a metal such as aluminum, or alternately, it can be made out of polymer or a combination of metal and polymer. Magnets 2000 can be permanently bonded to the surface-side attachment housing 1300 using adhesive or mechanical fasteners. In one embodiment, the edges of surface-side attachment housing 1300 are crimped to retain magnets 2000.

The surface-side attachment 1100 refers to a plurality of magnets 2000 coupleable to a surface. Surface-side attachment 1100 can be affixed to surface 1000 with adhesive or by using a mechanical fastener. For example, double-sided adhesive tape can be used to permanently or temporarily affix surface-side attachment 1100 to surface 1000. Alternatively, adhesive glue can be selected based on the surface 1000 characteristics and desired bond characteristics to affix surface-side attachment 1100 to surface 1000. In one example, the surface-side attachment 1100 is affixed to the dash of an automobile using double-sided adhesive tape. In another example, the surface-side attachment 1100 is affixed to the bezel of a computer monitor using double-sided adhesive tape.

Surface 1000 can be any solid surface including nonmagnetic surfaces and nonferrous surfaces. For example, surface 1000 can be polymer, wood, glass, metal and combinations thereof. Generally, nonporous surfaces provide for greater adhesion of the surface-side attachment 1100, though surface-side attachment 1100 can be bonded to porous surfaces by using a suitable adhesive or mechanical fastener.

Figure 41A:
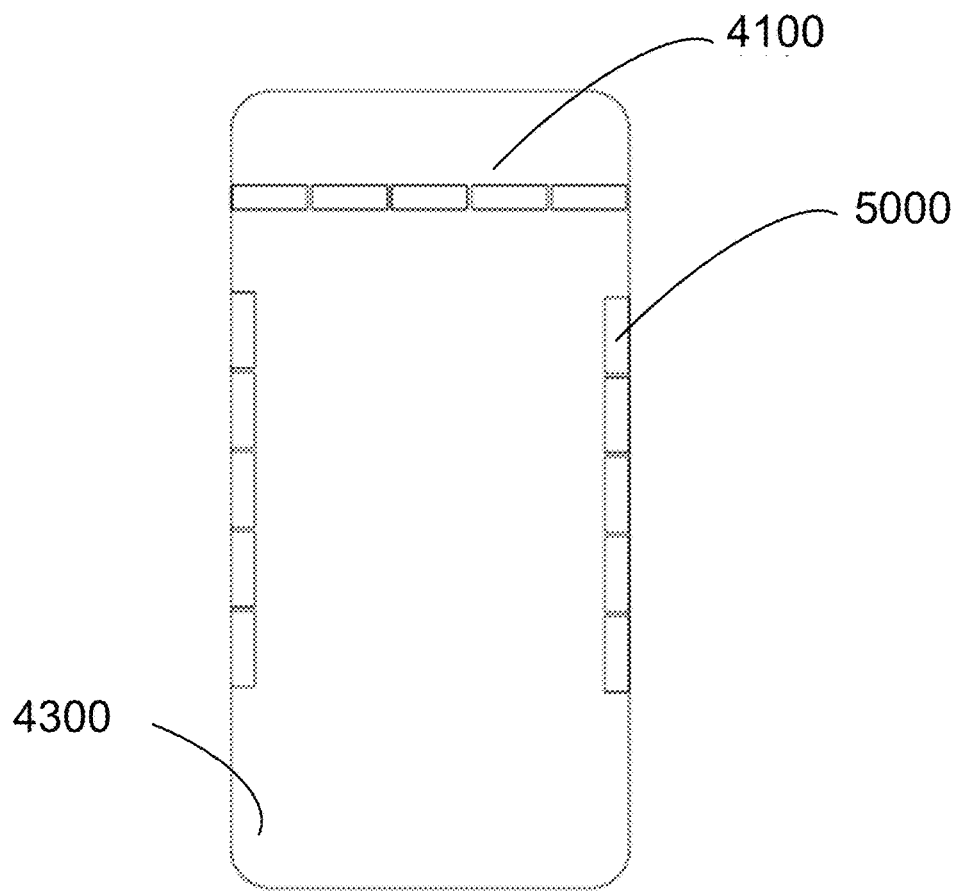
FIGS. 41A to 41D are front views of multiple device-side attachments embedded in the interior of a protective case for an electronic display device, according to an embodiment.
Figure 41B:
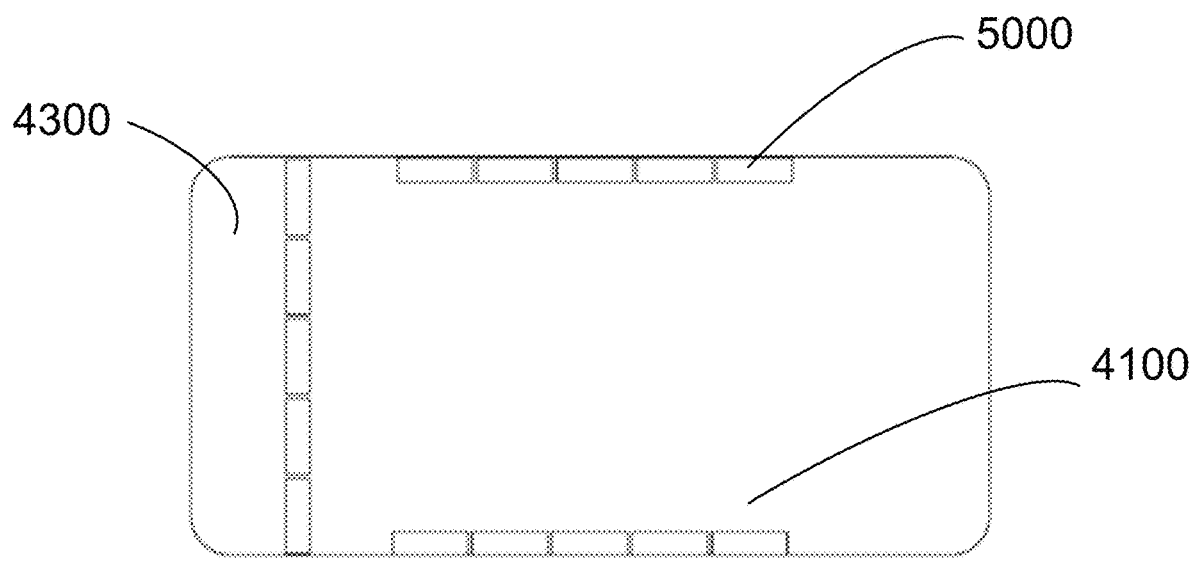
Figure 41C:
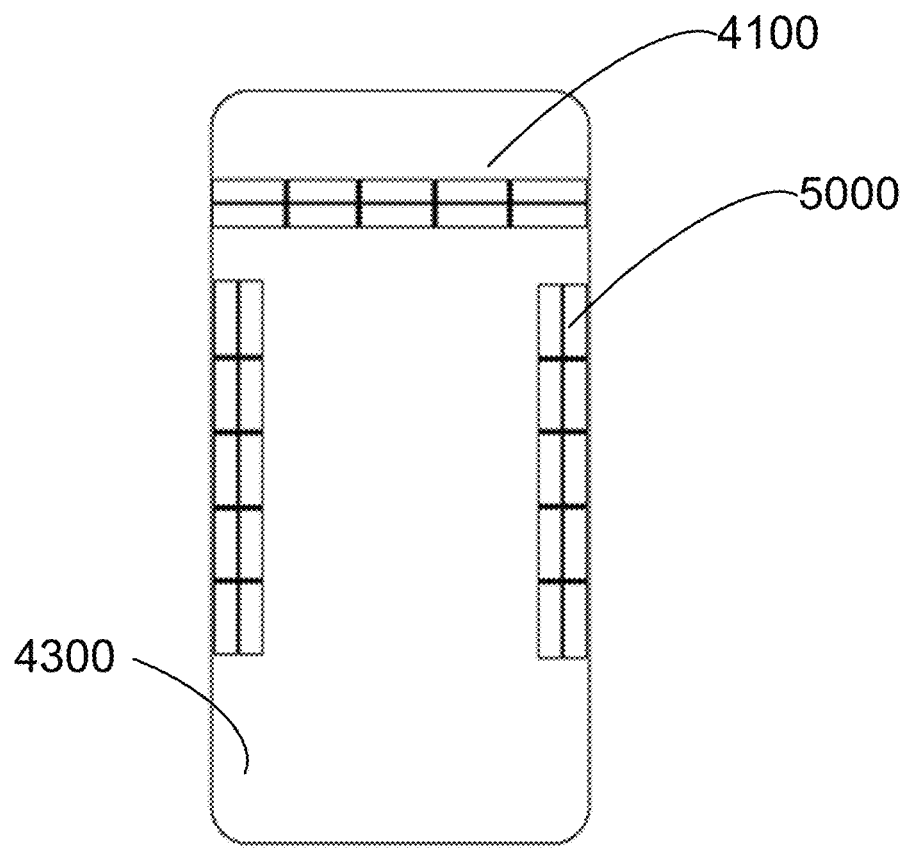
Figure 41D:
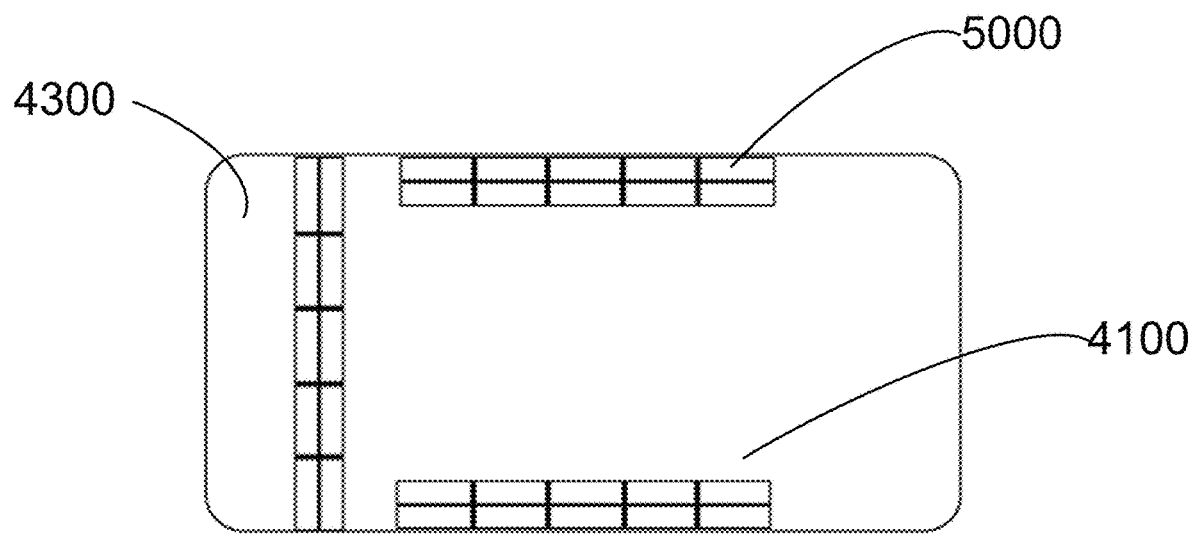

FIGS. 41A to 41D are front views of multiple device-side attachments 4100 embedded in the interior of a protective case 4300 for an electronic display device, according to an embodiment. The device-side attachments 4100 are embedded in the perimeter of the protective case 4300 to allow the electronic display device to be hung in either a portrait orientation, as shown in FIG. 41A, or a landscape orientation, as shown in FIG. 41B. As shown in FIGS. 41A and 41B, the device-side attachments 4100 can include a single linear row containing five individual magnets 5000. As shown in FIGS. 41C and 41D, the device-side attachment 4100 can include two linear rows, with each linear row containing five individual magnets 500. It should be recognized that any number of magnets greater than two can be used in device-side attachment 4100, and that FIGS. 41A to 41D are merely exemplary embodiments. The device-side attachment 4100 refers to a plurality of magnets 5000 coupleable to an electronic display device.

Protective case 4300 is preferably made out of a polymer, or alternately, it can be made out of metal, cellulosic material, and combinations thereof. Device-side attachment 4100 can be permanently embedded within protective case 4300 or bonded to the protective case 4300 using an adhesive. Mechanical fasteners can also be used to secure device-side attachment 4100 to the protective case 4300, are especially suitable for applications with require a high strength connection.

Figure 42A:
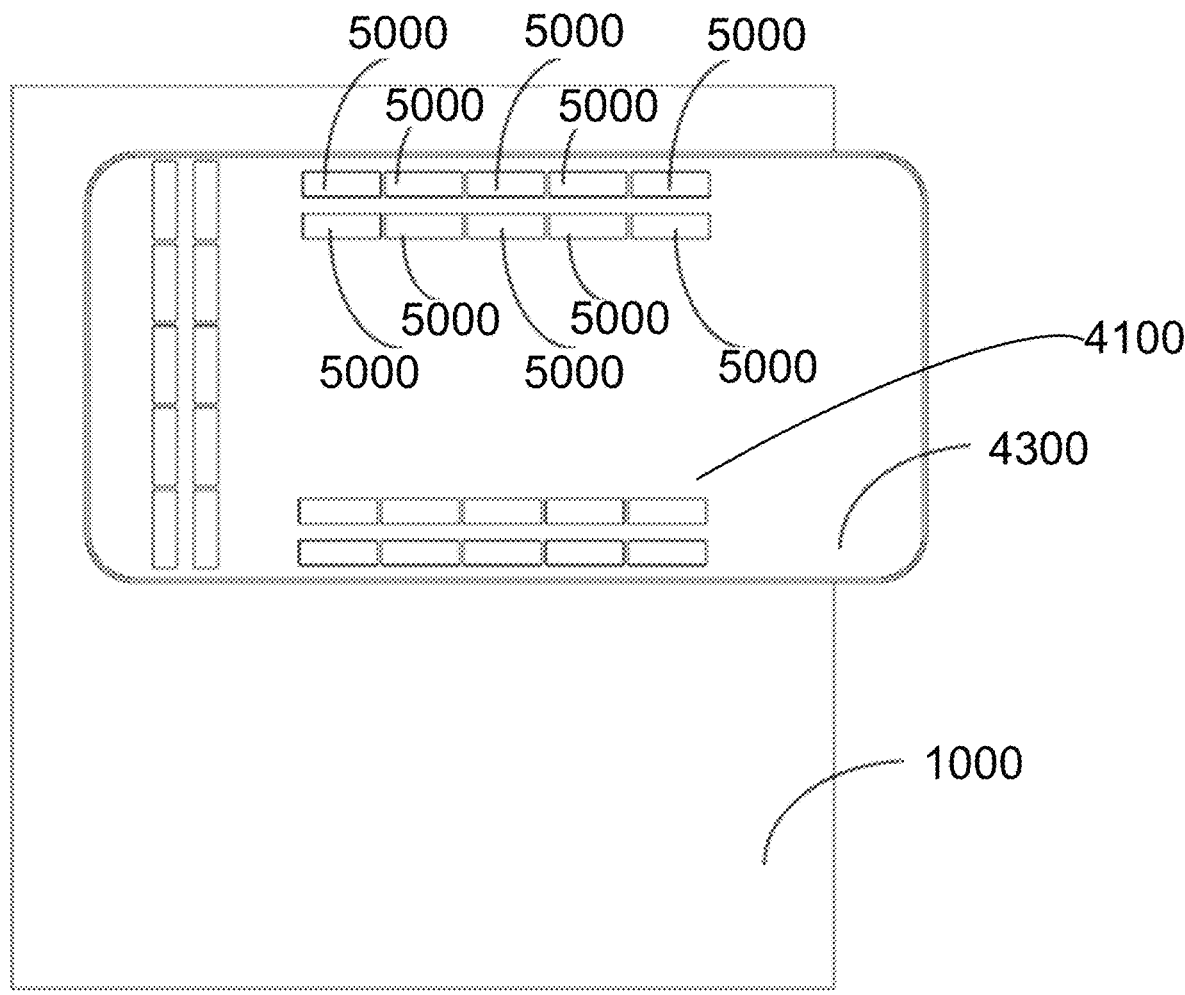
FIGS. 42A to 42D show multiple views of an embodiment of a protective case mounted in a landscape orientation.
Figure 42B:
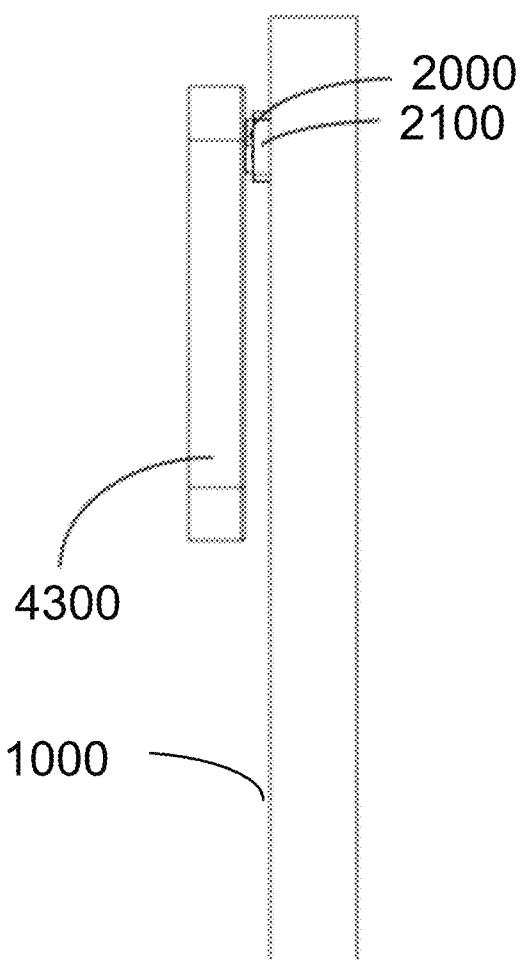
Figure 42C:
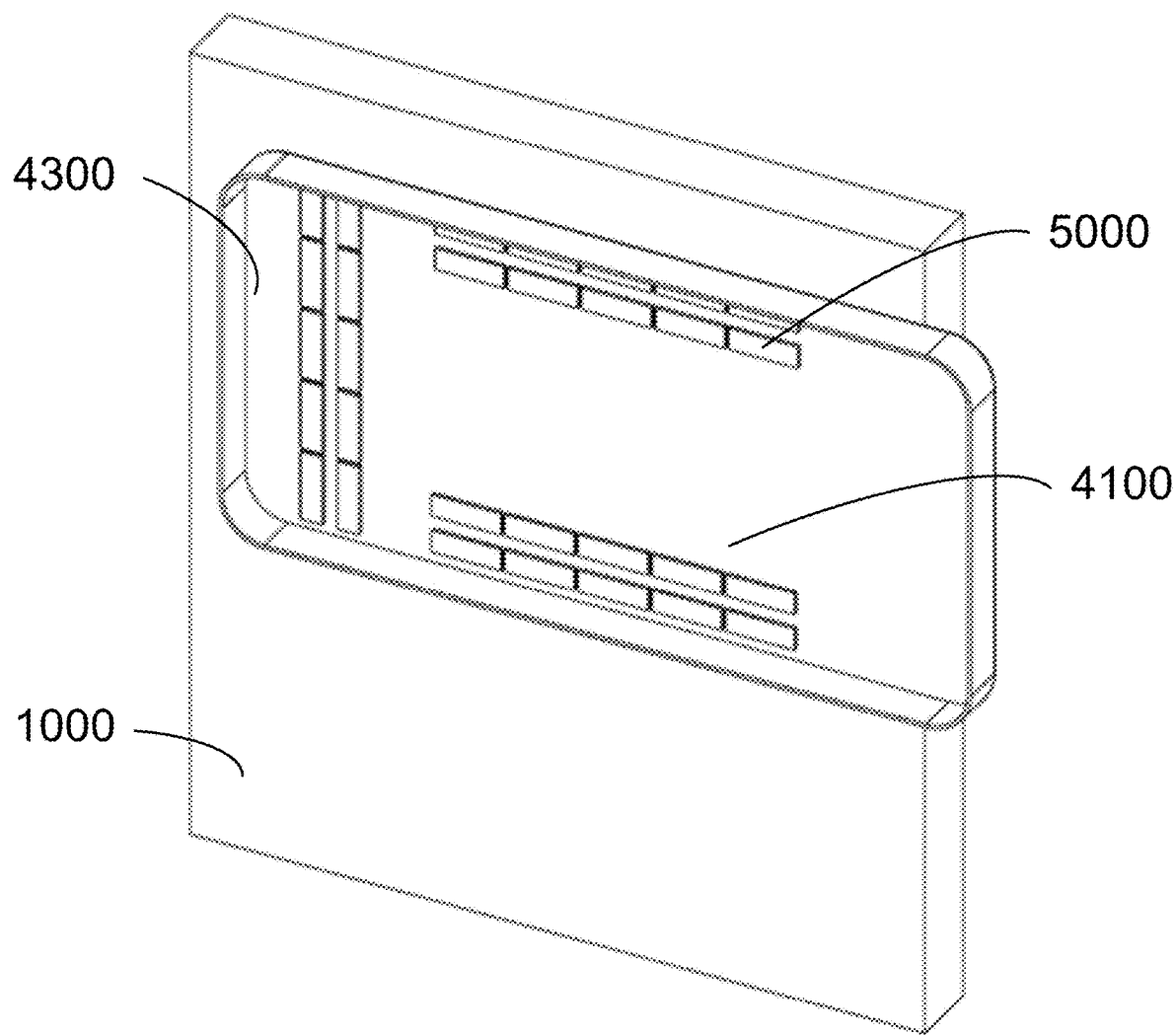
Figure 42D:
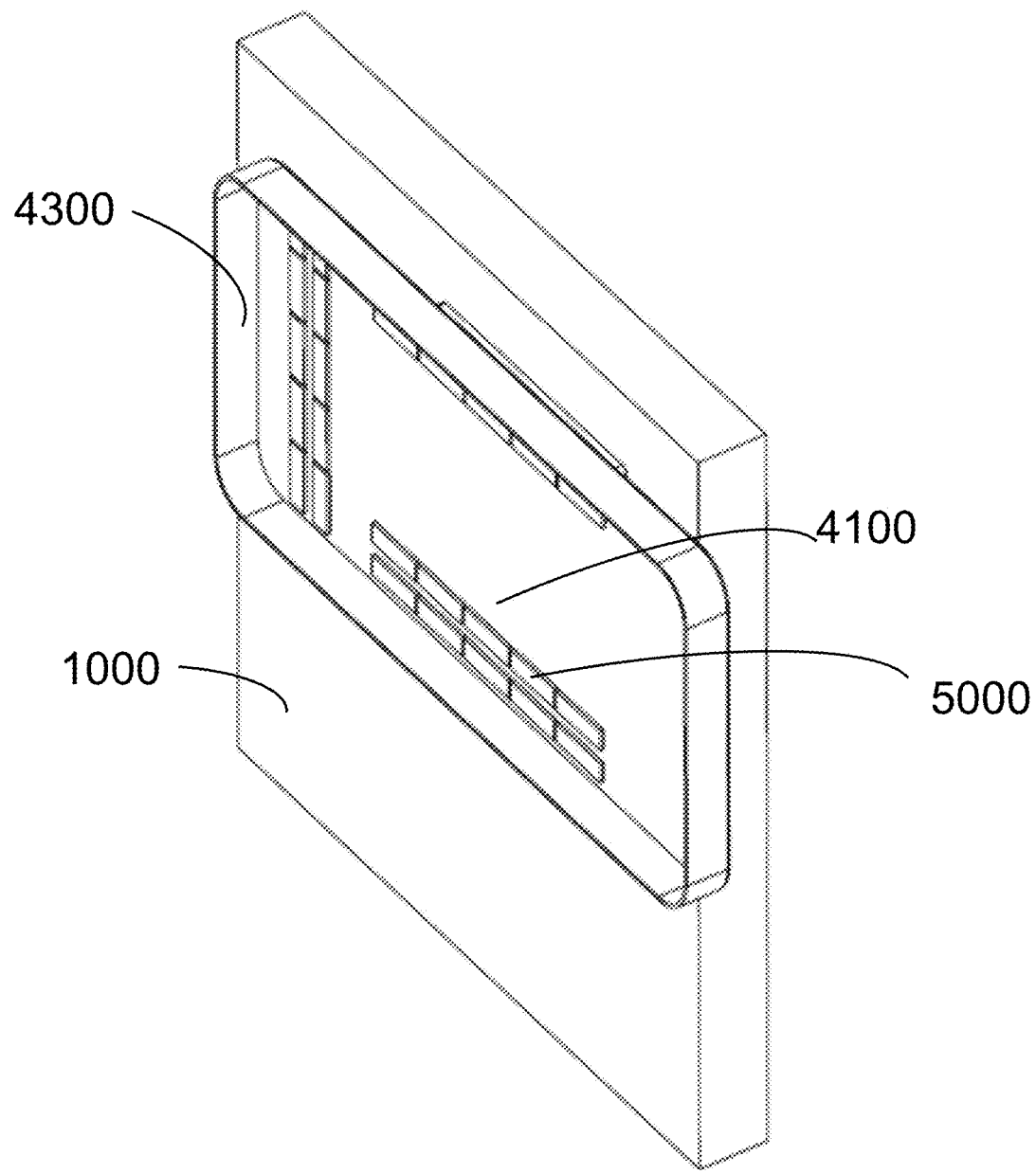

FIGS. 42A to 42D show multiple views of an embodiment of a protective case 4300 mounted in a landscape orientation. FIG. 42A is a front view of multiple device-side attachments 4100 attached to the interior of a protective case 4300 for an electronic display device that is mounted to a surface 1000. FIG. 42B is a profile view of multiple device-side attachments 4100 affixed to the interior of a protective case 4300 for an electronic display device that is mounted to a surface 100. FIG. 42C is a perspective view of multiple device-side attachments 4100 affixed to the interior of a protective case 4300 for an electronic display device that is mounted to a surface 100. FIG. 42D is another perspective view of multiple device-side attachments 4100 affixed to the interior of a protective case 4300 for an electronic display device that is mounted to a surface 1000.

Figure 42E:
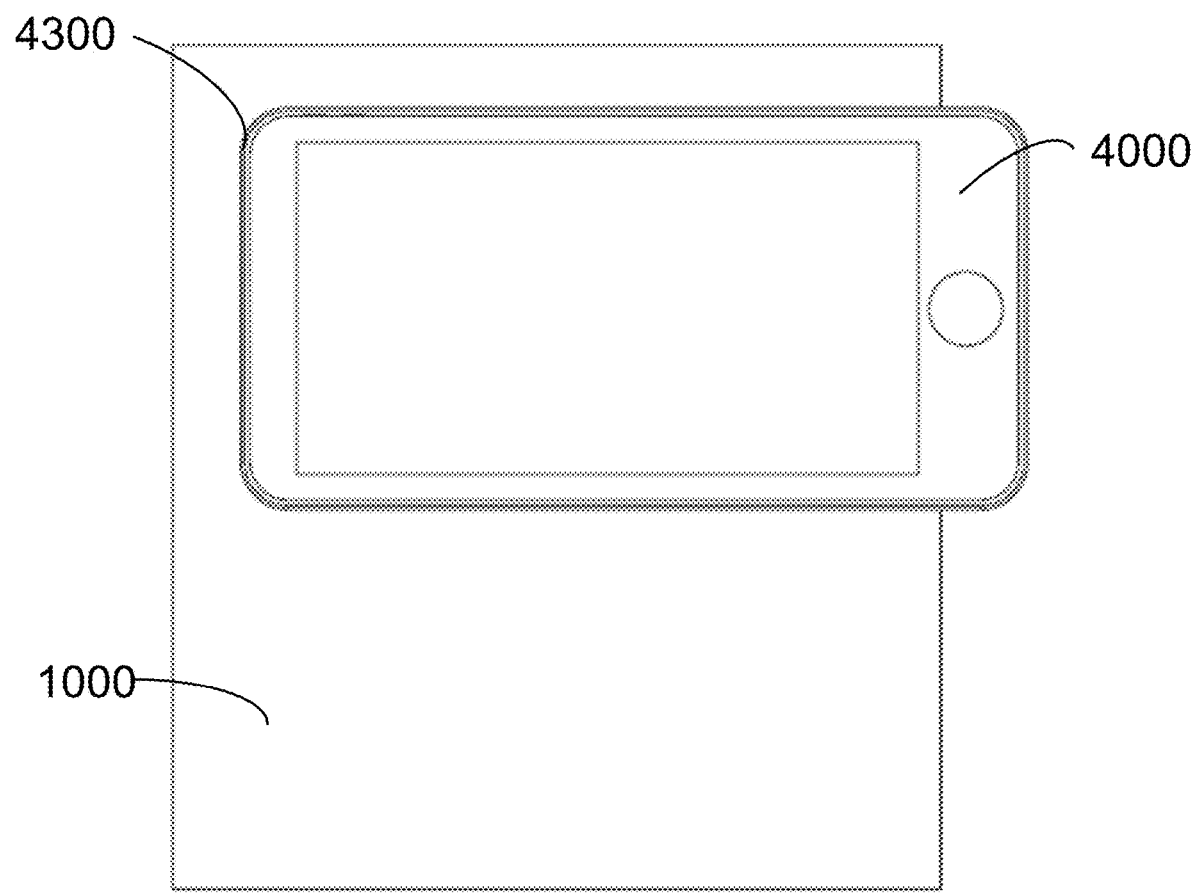
FIGS. 42E to 42F show multiple views of an embodiment of an electronic display device mounted in a landscape orientation.
Figure 42F:
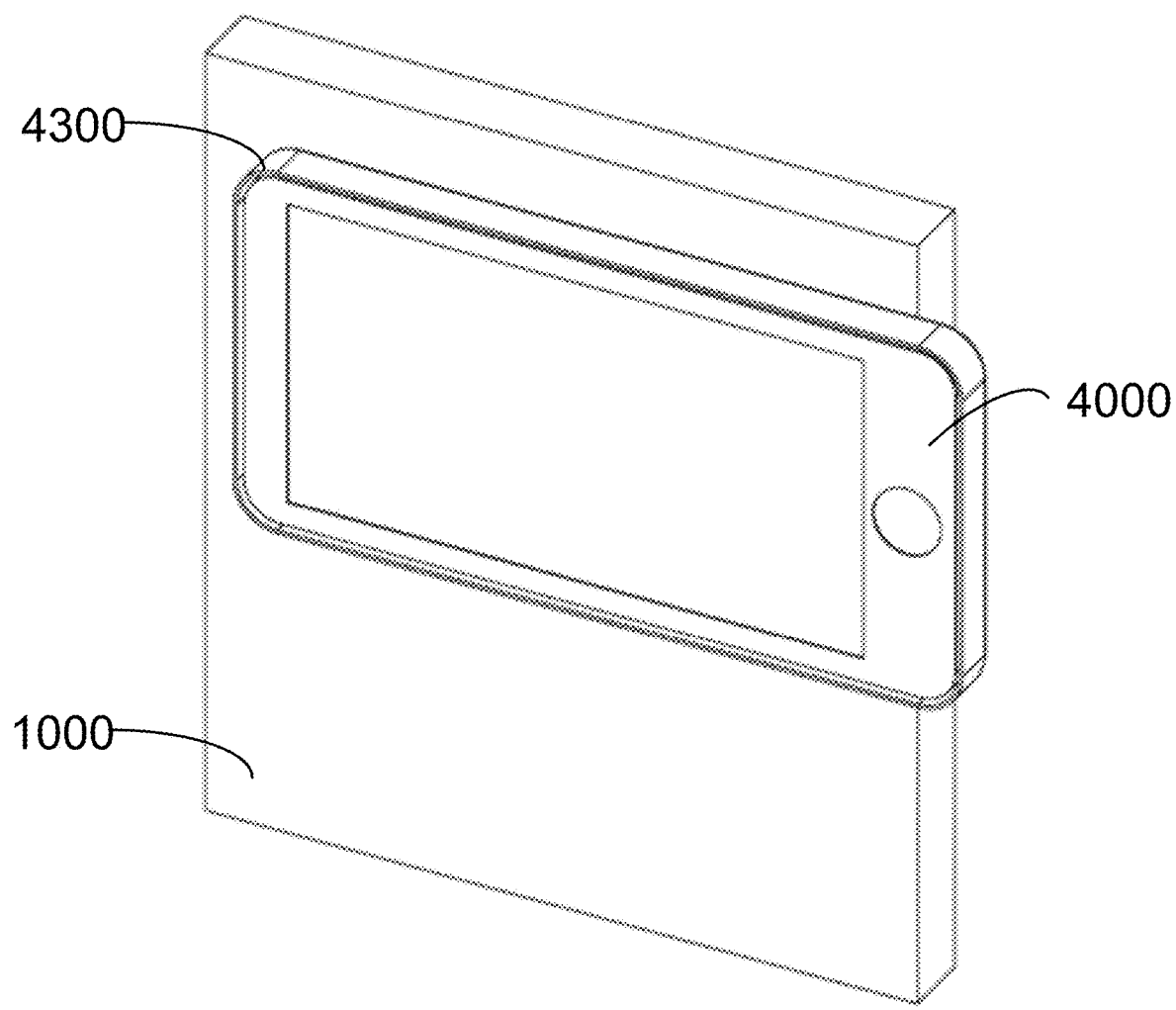
Figure 42G:
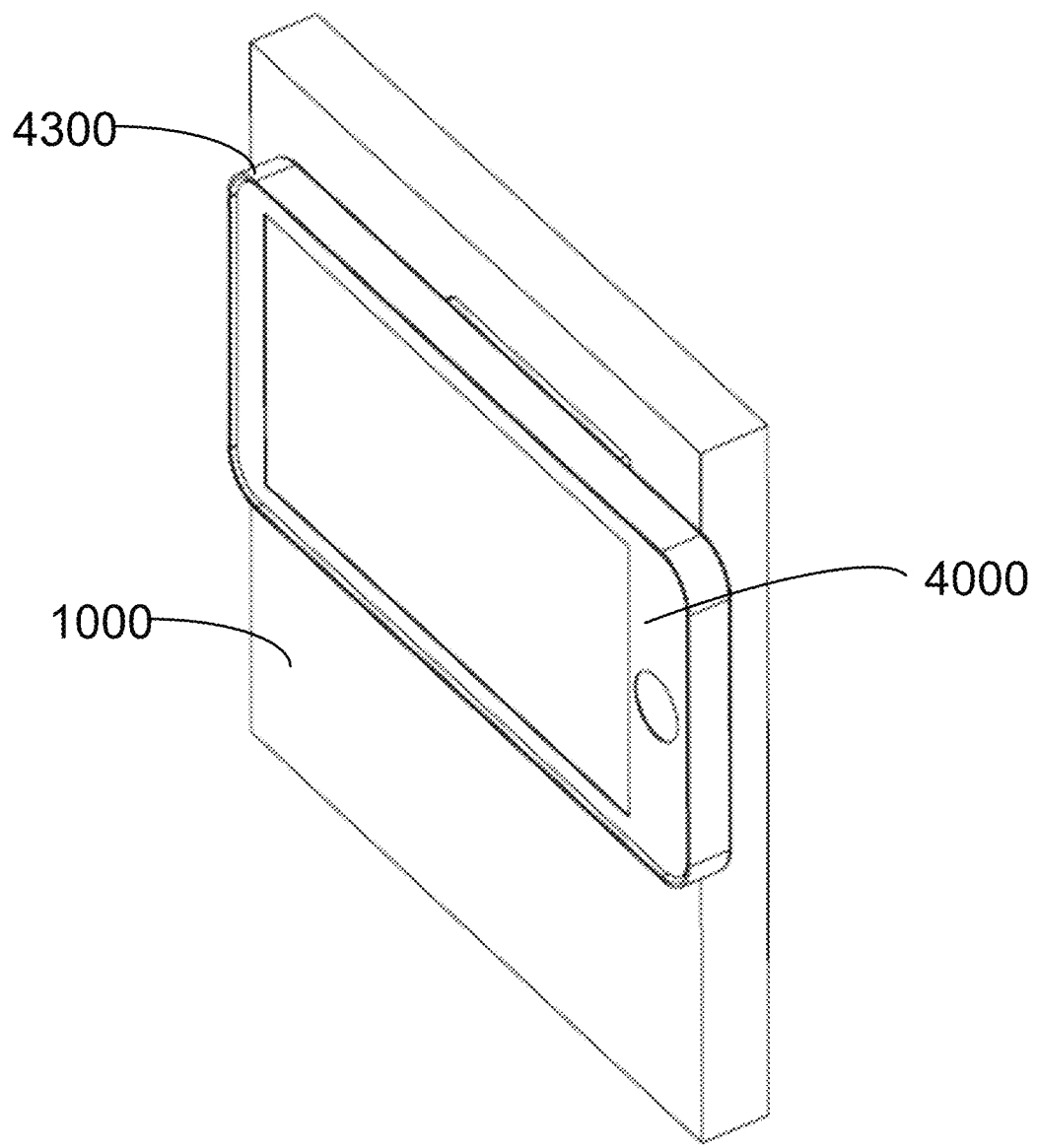
FIG. 42G is another prospective view of electronic display device within a protective case that is mounted to a surface.

FIGS. 42E to 42F show multiple views of an embodiment of an electronic display device 4000 mounted in a landscape orientation. FIG. 42E is a front view of electronic display device 4000 within a protective case 4300 that is mounted to a surface 1000. FIG. 42F is a prospective view of electronic display device 4000 within a protective case 4300 that is mounted to a surface 1000. FIG. 42G is another prospective view of electronic display device 4000 within a protective case 4300 that is mounted to a surface 1000. The mounting system described herein can provide a temporary method of attaching an electronic display device to a surface while providing a low profile. In other words, when mounted to the surface, the mounting system does not add significant thickness to the electronic display device. The device-side attachment 4100 can be coupled in such a way that it does not add significant thickness to the electronic display device 4000 (see, e.g., FIGS. 42B and 42G). The surface-side attachment 1100 can be affixed in such a way that it is integrated with the styling and design of surface 1000. Surface-side attachment 1100 can be colored to match the surface 1000 and/or mimic the features already present on surface 1000. For example, surface-side attachment 1100 can have a brushed aluminum finish and include magnets 2000 that resemble buttons on the dash of a vehicle.

An electronic display device 4000 can include a device-side attachment 4100 coupled to a back side of the electronic display device 4000 without using a protective case 4300 (not shown). In some embodiments, the magnets 5000 can be coupled to the electronic display device 4000 with, for example, a double-sided adhesive tape. Other attachment methods such as glues, mechanical latches, hinges, or elastic grip can alternatively be used. The device-side attachment 4100 can be used to mount the electronic display device 4000 to a surface 1000 by coupling with a surface-side attachment 1100. The electronic display device 4000 can be, for example, a tablet computer, a smartphone, a television, or an LCD display. In some embodiments, the electronic display device 4000 can be an Apple iPad or iPhone, an Android smartphone, or eBook reader.

In some embodiments, the device-side attachment has a thickness from about 0.5 to about 6.5 mm, from about 0.5 to about 4 mm, from about 0.5 to about 2 mm, from about 0.5 to about 1.5 mm, or from about 1 to about 2 mm, and including all subranges therebetween each of the ranges. In some embodiments, the device-side attachment has a thickness of about 0.5 mm, about 1.0 mm, about 1.5 mm, about 2.0 mm, about 2.5 mm, about 3.0 mm, about 3.5 mm, about 4.0 mm, about 4.5 mm, about 5.0 mm, about 5.5 mm, about 6.0 mm, or about 6.5 mm. In some embodiments, the device-side attachment has a thickness of less than 0.5 mm, less than 1.0 mm, less than 1.5 mm, less than 2.0 mm, less than 2.5 mm, less than 3.0 mm, less than 3.5 mm, less than 4.0 mm, less than 4.5 mm, less than 5.0 mm, less than 5.5 mm, less than 6.0 mm, or less than 6.5 mm.

In some embodiments, the device-side attachment including the protective cover has a thickness from about 0.5 to about 6.5 mm, from about 0.5 to about 4 mm, from about 0.5 to about 2 mm, from about 0.5 to about 1.5 mm, or from about 1 to about 2 mm, and including all subranges therebetween each of the ranges. In some embodiments, the device-side attachment including the protective cover has a thickness of about 0.5 mm, about 1.0 mm, about 1.5 mm, about 2.0 mm, about 2.5 mm, about 3.0 mm, about 3.5 mm, about 4.0 mm, about 4.5 mm, about 5.0 mm, about 5.5 mm, about 6.0 mm, or about 6.5 mm. In some embodiments, the device-side attachment including the protective cover has a thickness of less than 0.5 mm, less than 1.0 mm, less than 1.5 mm, less than 2.0 mm, less than 2.5 mm, less than 3.0 mm, less than 3.5 mm, less than 4.0 mm, less than 4.5 mm, less than 5.0 mm, less than 5.5 mm, less than 6.0 mm, or less than 6.5 mm.

The magnets 5000 of the device-side attachment 4100 are attracted to the magnets 2000 of the surface-side attachment 1100. When the device-side attachment 4100 is placed in close proximity to the surface-side attachment 1100, the magnetic attractive forces draw the attachments together to mount electronic display device 400. The magnetic attractive forces between magnets 5000 and magnets 2000 are great enough to overcome the force of gravity on the electronic display device 4000 within the protective case 4300 when mounted to the surface-side attachment 1100. This force of friction between magnets 5000 and magnets 2000 can be proportional to the normal force and friction coefficient of the materials. The normal force is the magnetic attractive pull force between the magnets 5000 and magnets 2000. This normal force, in addition to the friction coefficient between the faces of the magnets, produce an overall force of friction high enough to hold the electronic display device 4000 in place when mounted to the surface 1000.

Magnets 2000 and magnets 5000 are preferably made out of rare earth metals including alloys of neodymium or samarium-cobalt. Rare earth magnets are selected based on their strongly magnetic properties that include a higher maximum energy product (related to magnetic flux per unit volume) than other types of magnets including ferrite and alnico magnets. Neodymium magnets of grade N48 and higher are preferred, and neodymium magnets of grade N52 and higher are more preferred.

The magnets 2000 and the magnets 5000 are permanent magnets that retain their magnetic properties once magnetized. Every magnet has a south pole and a north pole axially situated across opposite faces of the magnet. The north pole of a first magnet is attracted to the south pole of a second magnet, and vice versa. The north pole of a first magnet is repulsed by the north pole of a second magnet, and vice versa. The device-side attachment 4100 and the surface-side attachment 1100 each include at least one magnet with an outwardly-facing north pole, and at least one magnet with an outwardly-facing south pole.

Magnets can generally be uniform or different in shape, size, magnetic and/or other properties within the device-side attachment 4100 or within the surface-side attachment 110. While the device-side attachment 4100 and the surface-side attachment 1100 can be somewhat different in shape, size, magnetic and/or other properties, it is preferred that when mounted, each magnet 5000 in device-side attachment 4100 is uniform in shape, size, magnetic and/or other properties to its complementary magnet 2000 in surface-side attachment 110. However, the magnets 5000 of the device-side attachment 4100 can be smaller than the magnets 2000 of the surface-side attachment 1100. It is also preferred that the relative positions (centerlines) of each magnet 5000 within a device-side attachment 4100 are the same as the relative positions of each complementary magnet 2000 within the surface-side attachment 1100 when the attachments are coupled during mounting.

The magnets 5000 and the magnets 2000 within the device-side attachment 4100 and the surface-side attachment 1100 are arranged to be self-aligning during mounting. The magnets 5000 and the magnets 2000 are arranged so that when the attachments are coupled together during mounting, at least one magnet with an outwardly-facing north pole of the device-side attachment 4100 is attracted to a corresponding magnet with an outwardly-facing south pole of the surface-side attachment 1100, and vice versa. If during mounting the magnet with an outwardly-facing north pole of the device-side attachment 4100 lines up with a magnet with an outwardly-facing north pole of the surface-side attachment 1100, the like poles repulse each other. If during mounting the magnet with an outwardly-facing north pole of the device-side attachment 4100 lines up with a magnet with an outwardly-facing south pole of the surface-side attachment 1100, the opposite poles attract each other. The magnetic forces of attraction and repulsion, along with the predetermined arrangement of the outwardly-facing poles of the magnets within each attachment, provide for self-alignment of the coupled attachments.

FIGS. 43A to 43I depict examples of self-aligning arrangements of outwardly-facing magnet poles for use in device-side attachments 4100 and in surface-side attachments 1100. For each magnet having an outwardly-facing north pole "N" on a given attachment, the complementary attachment will have a magnet with outwardly-facing south pole "S" positioned to align when the attachments are coupled. FIGS. 43A, 43F, and 43H are examples of symmetrical self-aligning magnet pole arrangements whereby the electronic display device can be mounted in either of two positions that are 180 degrees of each other. FIGS. 43B, 43E, 43G and 43I are examples of asymmetrical self-aligning magnet pole arrangements whereby the electronic display device can be mounted in only one position.

Figure 43J:
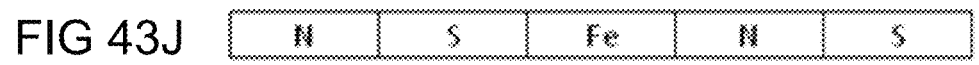
FIGS. 43J to 43L depict examples of self-aligning arrangements of magnets for device-side attachments and for surface-side attachments including ferrous inserts "Fe"
Figure 43K:
Figure 43L:
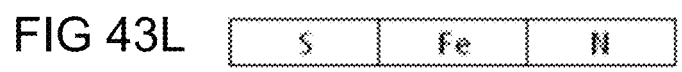

FIGS. 43J to 43L depict examples of self-aligning arrangements of magnets for device-side attachments 4100 and for surface-side attachments 1100 including ferrous inserts "Fe". Ferrous inserts can be used in device-side attachments 4100 in situations when the positioning of a magnet 5000 would interfere with the operation of the electronic display device 4000. For example, positioning a magnet over the location of an internal antenna of an electronic display device may interfere with the reception. By placing a ferrous insert within the device-side attachment 4100, problems associated with reception can be avoided while allowing the magnets 2000 of the surface-side attachment 1100 a ferrous surface to attractively couple to.

Ferrous inserts can also be used in surface-side attachments 1100 to reduce product costs. Rare earth magnets 2000 tend to be expensive. A surface-side attachment 1100 that includes at least one magnet with an outwardly-facing north pole and at least one magnet with an outwardly-facing south pole can still provide for self-alignment, while other magnets 2000 in the surface-side attachment 1100 can be replaced with ferrous inserts that allow the magnets 5000 in the device-side attachment 4100 a ferrous surface to attractively couple to. The device-side attachment 4100 within the mounting system still retains all of the magnets 5000 and the ability to attractively couple to any ferrous surface. By incorporating the ferrous inserts into the surface-side attachment 1100, the overall cost of the mounting system can be reduced while affording the same level of functionality.

Figure 44A:
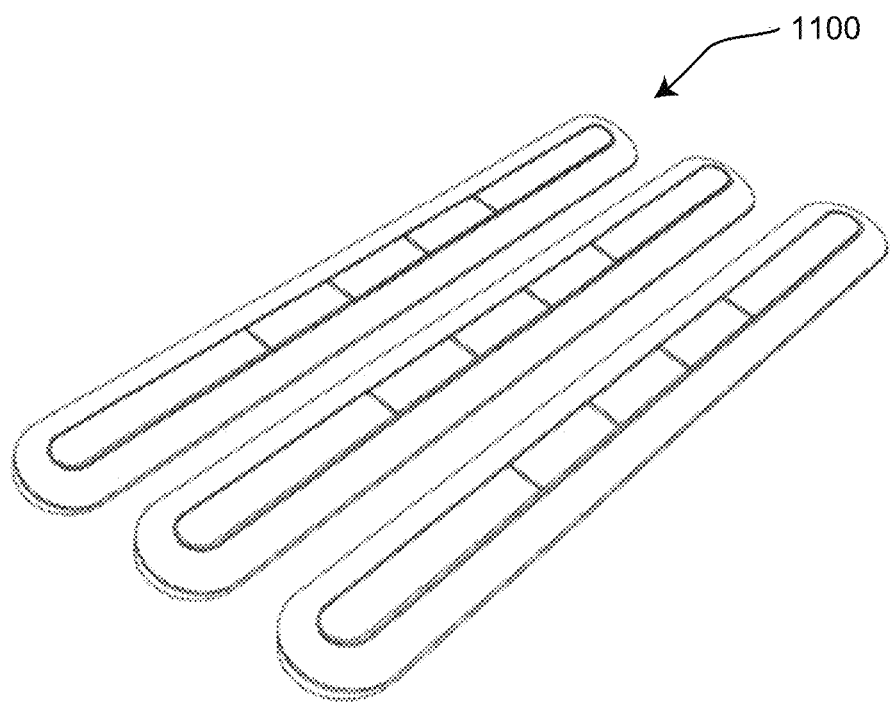
FIG. 44A is a prospective view of three surface-side attachments.

FIG. 44A is a prospective view of three surface-side attachments 1100. In this example, the plurality of magnets is permanently affixed to an aluminum housing.

Figure 44B:
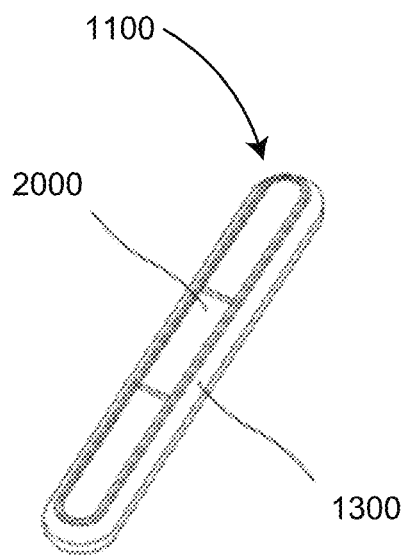
FIG. 44B is a prospective view of a surface-side attachment including three magnets within a surface-side attachment housing.

FIG. 44B is a prospective view of a surface-side attachment 1100 including three magnets 2000 within a surface-side attachment housing 1300. In this example, the plurality of magnets is permanently affixed to an aluminum housing.

Figure 44C:
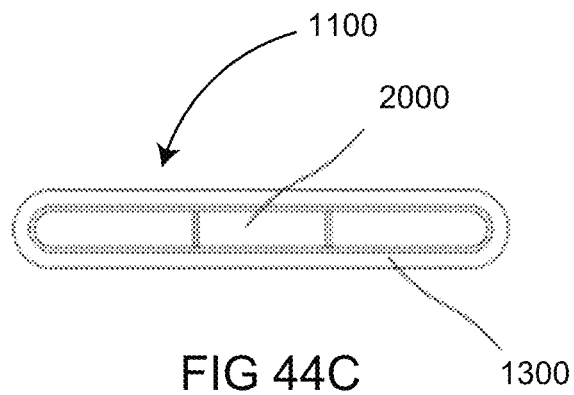
FIG. 44C is a front view of a surface-side attachment including three magnets within a surface-side attachment housing.

FIG. 44C is a front view of a surface-side attachment 1100 including three magnets 2000 within a surface-side attachment housing 1300. In this example, the plurality of magnets is permanently affixed to an aluminum housing.

Figure 45:
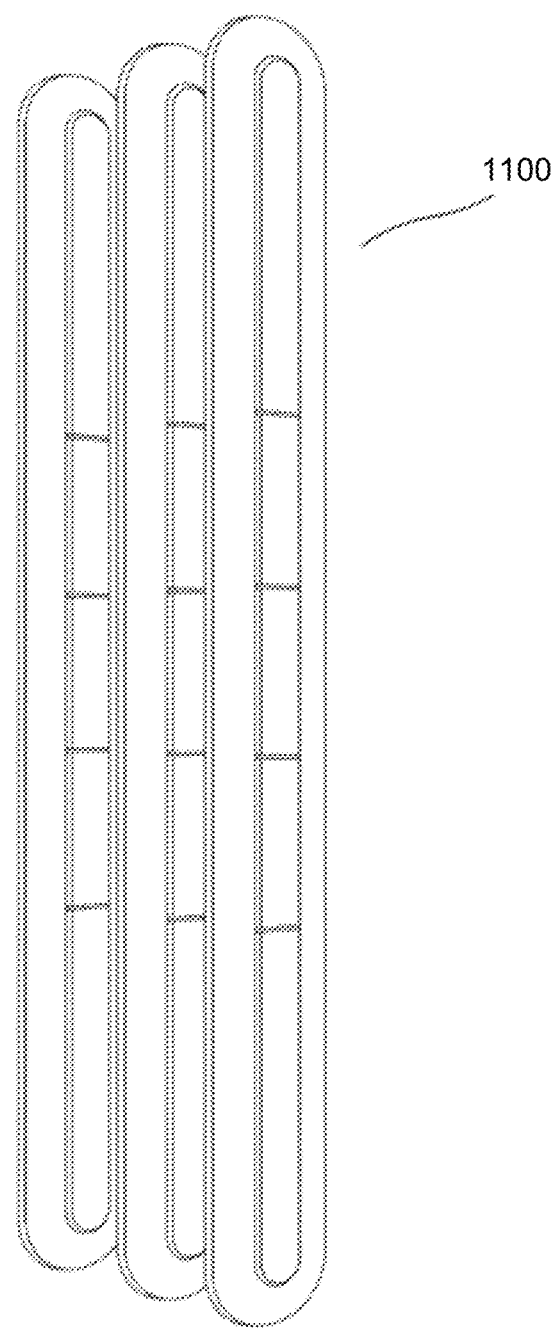
FIG. 45 is a prospective view of three surface-side attachments.

FIG. 45 is a prospective view of three surface-side attachments 1100.

In some embodiments, the surface-side attachment has a thickness from about 0.5 to about 6.5 mm, from about 0.5 to about 4 mm, from about 0.5 to about 2 mm, from about 0.5 to about 1.5 mm, or from about 1 to about 2 mm, and including all subranges therebetween each of the ranges. In some embodiments, the surface-side attachment has a thickness of about 0.5 mm, about 1.0 mm, about 1.5 mm, about 2.0 mm, about 2.5 mm, about 3.0 mm, about 3.5 mm, about 4.0 mm, about 4.5 mm, about 5.0 mm, about 5.5 mm, about 6.0 mm, or about 6.5 mm. In some embodiments, the surface-side attachment has a thickness of less than 0.5 mm, less than 1.0 mm, less than 1.5 mm, less than 2.0 mm, less than 2.5 mm, less than 3.0 mm, less than 3.5 mm, less than 4.0 mm, less than 4.5 mm, less than 5.0 mm, less than 5.5 mm, less than 6.0 mm, or less than 6.5 mm.

Figure 46:
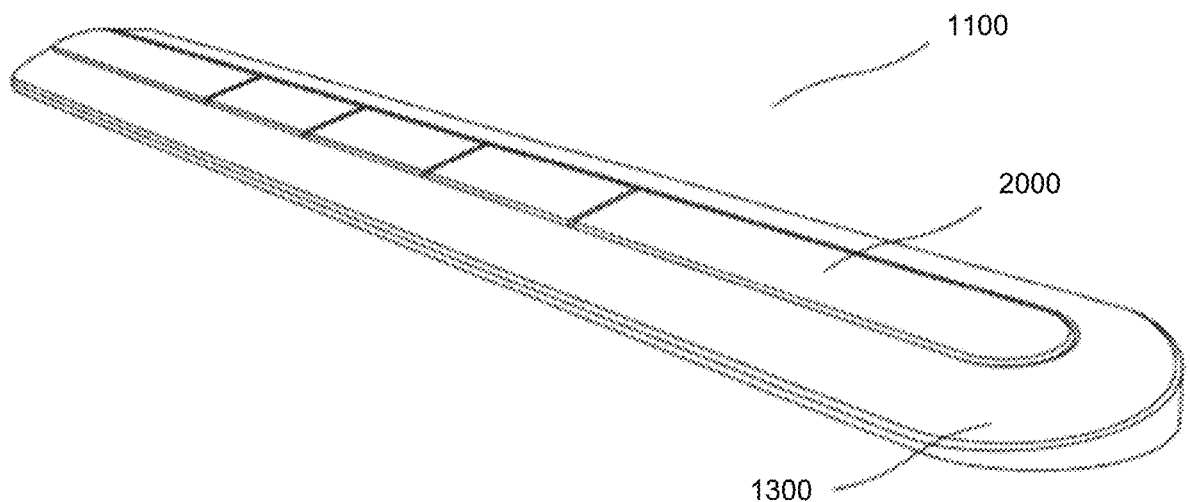
FIG. 46 is a prospective view of a surface-side attachment including five magnets and a surface-side attachment housing further including an angled face.

FIG. 46 is a prospective view of a surface-side attachment 1100 including five magnets 2000 and a surface-side attachment housing 1300 further including an angled face. The angled face of surface-side attachment 1100 can provide increased coupling strength by the angled face supporting a portion of the weight of the electronic display device 400. The angled face can also improve the coupling strength of the mounting system by positioning the lower end of the electronic display device 4000 against the surface 1000 which reduces the tendency of the electronic display device 4000 to rotate about the bottom edge of surface-side attachment 1100 and separate from the top edge of surface-side attachment 1100.

Figure 47:
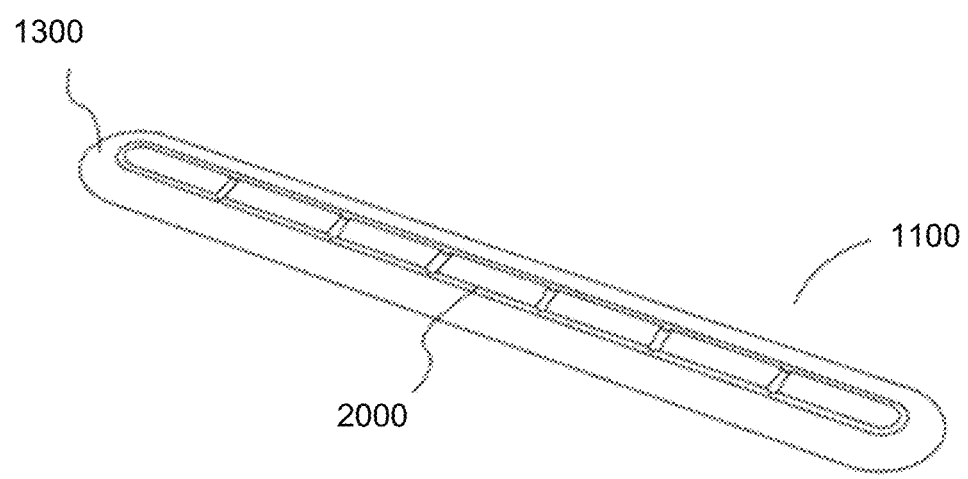
FIG. 47 is a prospective view of a surface-side attachment including seven magnets within a surface-side attachment housing.

FIG. 47 is a prospective view of a surface-side attachment 1100 including seven magnets 2000 within a surface-side attachment housing 1300.

Figure 48:
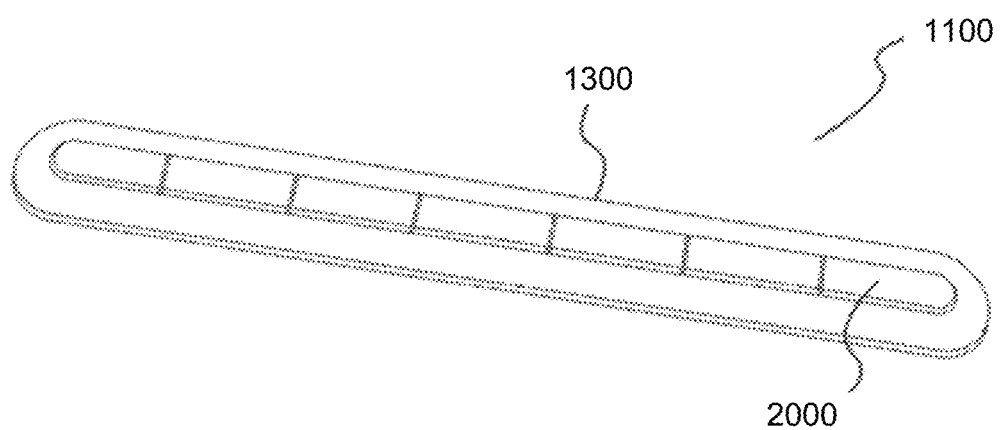
FIG. 48 is a prospective view of a surface-side attachment including seven magnets within a surface-side attachment housing.

FIG. 48 is a prospective view of a surface-side attachment 1100 including seven magnets 2000 within a surface-side attachment housing 1300.

As may be appreciated from FIGS. 40-48, a self-aligning mounting system for mounting an electronic display device to a surface or attached the electronic display device to an object (e.g., a magnetically-coupleable wallet) may include a device-side attachment containing a first plurality of magnets disposed in a protective cover for the electronic display device. The first plurality of magnets includes at least one magnet with an outwardly-facing north pole of a magnet and at least one magnet with an outwardly-facing south pole. The protective cover can include a high friction surface covering the first plurality of magnets. The mounting system also includes a surface-side attachment that includes a second plurality of magnets disposed in a housing and configured to attach to the surface; alternatively, the second plurality of magnets are disposed within or upon an object to which the electronic display device is to be attached. The second plurality of magnets includes at least one magnet with an outwardly-facing north pole and at least one magnet with an outwardly-facing south pole. The at least one outwardly-facing north pole of the first plurality of magnets is arranged to attractively couple with the at least one outwardly-facing south pole of the second plurality of magnets. The at least one outwardly-facing south pole of the first plurality of magnets is arranged to couple with the at least one outwardly-facing north pole of the second plurality of magnets. The high friction surface covering the first plurality of magnets is configured to be disposed between the first plurality of magnets when coupled to the second plurality of magnets.

In one implementation, a mounting system for mounting an electronic display device to a surface or attaching the electronic display to an object includes a protective case defining an interior surface conforming to an exterior surface of an electronic display device. A first plurality of magnets contacts the protective case and configured to couple to the electronic display device. The first plurality of magnets including at least one magnet with an outwardly-facing north pole and at least one magnet with an outwardly-facing south pole. The at least one magnet with an outwardly-facing north pole of the first plurality of magnets is arranged to couple with at least one magnet with an outwardly-facing south pole of a second plurality of magnets included within a surface-side attachment attached to the surface or included within or upon the object. The at least one magnet with an outwardly-facing south pole of the first plurality of magnets is arranged to couple with at least one magnet with an outwardly-facing north pole of the second plurality of magnets.

The first plurality of magnets and the second plurality magnets may be made from rare earth metals. The rare earth metals may include alloys of neodymium or samarium-cobalt. The first plurality of magnets and the second plurality magnets can be grade N48 or higher. The first plurality of magnets and the second plurality magnets may each comprise two linear rows of magnets.

The first plurality of magnets may be affixed to the interior of the protective cover. The first plurality of magnets may be embedded in the protective cover or the protective case. The first plurality of magnets is affixed to an exterior surface of the protective cover or the protective case. The protective cover may include a high friction surface covering the first plurality of magnets.

The shear force between the surface-side attachment and the device-side attachment may be in a direction substantially parallel to the first outward face and parallel to the second outward face. The shear force may be a direction perpendicular to an attractive force between the first plurality of magnets and the second plurality of magnets.

While various embodiments have been described above, it should be understood that they have been presented by way of example only, and not limitation. For example, wallet 100 and charging device 500 could be any accessory including a combination of a wallet and a battery pack. Also for example, the surface-side attachment 300 can be attached to any surface such as a wall, computer monitor, inside a backpack, vehicle headrest, refrigerator, etc., not just a vehicle dashboard 400. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. A mobile device accessory, comprising:
an accessory device having a surface;
an arrangement of magnets of alternating polarity wherein the arrangement of magnets are at least one of included within the accessory device or attached to the surface;
wherein the arrangement of magnets are magnetically coupleable to a device-side attachment including a plurality of magnets, and
wherein the plurality of magnets includes a first plurality of magnets arranged in a first direction and a second plurality of magnets arranged in a second direction, thereby enabling the accessory device to be disposed in different orientations when magnetically coupled to the device-side attachment.

2. The mobile device accessory of claim 1 wherein the device-side attachment is at least one of attached to a mobile device or part of a protective case for the mobile device.

3. The mobile device accessory of claim 1 wherein the device-side attachment part of a protective case for a mobile device, the different orientations including a portrait orientation and a landscape orientation relative to the mobile device.

4. The mobile device accessory of claim 1 wherein the surface is a front surface, the accessory device further including a back surface wherein the arrangement of magnets of alternating polarity include a first set of magnets of alternating plurality attached to the front surface and a second set of magnets of alternating plurality attached to the back surface.

5. The mobile device accessory of claim 1 wherein the accessory device has a top end and a bottom end, the arrangement of magnets are arranged linearly proximate the top end, and the device-side attachment is included in a protective case for a mobile device;
   wherein the accessory device is magnetically coupleable to the protective case in a kickstand configuration such that the top end contacts the protective case or in a stacked configuration in which the surface of the accessory device is substantially parallel to a planar surface of the protective case.

6. A mobile device accessory system, the system comprising:
   a first accessory device having a first front side and a first back side, the first accessory device having a first plurality of alternating polarity magnets on the first front side and a second plurality of alternating polarity magnets on the first back side;
   a second accessory device having a second front side and a second back side, the second accessory device having a third plurality of alternating polarity magnets on the second front side and a fourth plurality of alternating polarity magnets on the second back side;
   wherein the first accessory device is magnetically coupled to a device-side attachment associated with a mobile device and is interposed between the device-side attachment and the second accessory device.

7. The system of claim 6 wherein the second plurality of alternating polarity magnets are aligned with and magnetically coupled to the third plurality of alternating polarity magnets.

8. The system of claim 6 wherein the second accessory device is interposed between the first accessory device and a surface-side attachment including a fifth plurality of alternating polarity magnets and wherein the fourth plurality of alternating polarity magnets are magnetically coupled to the fifth plurality of alternating polarity magnets.

9. The system of claim 6 wherein the device-side attachment is attached to a protective cover within which the mobile device is disposed.

10. The system of claim 6 wherein the device-side attachment is attached to the mobile device.

11. The system of claim 6 wherein the first accessory device comprises at least one of a battery pack and a wireless charger and the second accessory device comprises a wallet defining a compartment.

12. The system of claim 6 wherein the first accessory device comprises at least one of a battery pack, a wireless charger and a wallet and the second accessory device comprises at least one of a kickstand and a finger loop.

13. The system of claim 6 further a third accessory device having a third front side and a third back side, the third accessory device having a fifth plurality of alternating polarity magnets on the third front side and a sixth plurality of alternating polarity magnets on the third back side;
   wherein the fifth plurality of alternating polarity magnets are magnetically coupled to the fourth plurality of alternating polarity magnets and wherein the second accessory device is interposed between the first accessory device and the third accessory device.

14. A system, comprising:
   a first plurality of alternating plurality magnets attached to a protective case for a mobile device;
   a first accessory device having a first front side and a first back side, the first accessory device having a second plurality of alternating polarity magnets on the first front side and a third plurality of alternating polarity magnets on the first back side wherein the second plurality of alternating polarity magnets are magnetically coupled to the first plurality of alternating polarity magnets;
   a second accessory device having a second front side and a second back side, the second accessory device having a fourth plurality of alternating polarity magnets on the second front side and a fifth plurality of alternating polarity magnets on the second back side wherein the fourth plurality of alternating polarity magnets are magnetically coupled to the third plurality of alternating polarity magnets.

15. The system of claim 14 further including a third accessory device having a third front side and a third back side, the third accessory device having a sixth plurality of alternating polarity magnets on the third front side and a seventh plurality of alternating polarity magnets on the third back side wherein the sixth plurality of alternating polarity magnets are magnetically coupled to the fifth plurality of alternating polarity magnets.

16. The system of claim 15 wherein the first accessory device, the second accessory device and the third accessary device are configured in a stack.

17. The system of claim 16 wherein ones of the first accessory device, the second accessory device and the third accessary device are configured to be able to be moved to different positions in the stack.

18. The system of claim 15 wherein the first accessory device and the second accessory device are configured in a stack and the third accessory device is configured as a kickstand.

19. The mobile accessory device of claim 1 wherein ones of the magnets of alternating polarity are positioned immediately adjacent other ones of the magnets of alternating polarity.

20. The mobile accessory device system of claim 6 wherein ones of the second plurality of alternating polarity magnets are positioned immediately adjacent other ones of the second plurality of alternating polarity magnets and ones of the third plurality of alternating polarity magnets are positioned immediately adjacent other ones of the third plurality of alternating polarity magnets.

21. The system of claim 14 wherein ones of the first plurality of alternating polarity magnets are positioned immediately adjacent other ones of the first plurality of alternating polarity magnets and wherein ones of the second plurality of alternating polarity magnets are positioned immediately adjacent other ones of the second plurality of alternating polarity magnets.

* * * * *